US012352976B1

(12) United States Patent
Oskui

(10) Patent No.: US 12,352,976 B1
(45) Date of Patent: Jul. 8, 2025

(54) COMPUTER-IMPLEMENTED SYSTEM AND METHOD FOR PROVIDING VR/AR VISUAL EXPERIENCES TO USERS BY PUPIL-DIRECTED RETINAL PROJECTION IN NEAR-EYE DISPLAYS

(71) Applicant: Ali Mizani Oskui, Zug (CH)

(72) Inventor: Ali Mizani Oskui, Zug (CH)

(73) Assignee: Ali Mizani Oskui (CH)

( * ) Notice: Subject to any disclaimer, the term of this patent is extended or adjusted under 35 U.S.C. 154(b) by 0 days.

(21) Appl. No.: 19/083,529

(22) Filed: Mar. 19, 2025

Related U.S. Application Data

(60) Provisional application No. 63/693,824, filed on Sep. 12, 2024.

(51) Int. Cl.
| | | |
|---|---|---|
| G02B 27/01 | (2006.01) | |
| G02C 7/10 | (2006.01) | |
| G06F 3/01 | (2006.01) | |
| G06F 3/0488 | (2022.01) | |
| G06F 40/58 | (2020.01) | |
| G10L 21/0216 | (2013.01) | |

(Continued)

(52) U.S. Cl.
CPC .......... *G02B 27/0172* (2013.01); *G02C 7/101* (2013.01); *G06F 3/013* (2013.01); *G06F 3/015* (2013.01); *G06F 3/0488* (2013.01); *G06F 40/58* (2020.01); *G10L 21/0216* (2013.01); *H04N 23/11* (2023.01); *H04R 1/028* (2013.01); *G02B 2027/0178* (2013.01); *G10L 2021/02166* (2013.01); *H04R 2499/15* (2013.01)

(58) Field of Classification Search
CPC ........ G02B 27/0172; G02B 2027/0178; G02C 7/101; G06F 3/013; G06F 3/015; G06F 3/0488; G06F 40/58; G10L 21/0216; G10L 2021/02166; H04N 23/11; H04R 1/028; H04R 2499/15
See application file for complete search history.

(56) References Cited

U.S. PATENT DOCUMENTS

| | | | |
|---|---|---|---|
| 2010/0097580 A1* | 4/2010 | Yamamoto | G02B 26/101 353/69 |
| 2010/0149073 A1* | 6/2010 | Chaum | G02B 27/0075 345/8 |

(Continued)

*Primary Examiner* — Matthew A Eason
*Assistant Examiner* — Chayce R Bibbee
(74) *Attorney, Agent, or Firm* — Jason C. Cameron

(57) ABSTRACT

A computer-implemented system and method for pupil-directed retinal projection in near-eye displays are disclosed. The computer-implemented system provides smart glasses with directed physical pixels that project light beams/signals directly onto a user's retina based on pupil position and size. The glasses comprise a frame, lenses with directed pixel layers, and sensors for tracking pupil movement. Each directed pixel may generate multiple virtual pixels by rapidly changing its emission angle. The glasses function as prescription lenses, virtual reality displays, and augmented reality devices without traditional optical systems. Additional features include depth sensors, cameras, and connectivity to peripheral devices. The glasses enable a seamless blend of virtual and real-world experiences, creating an immersive "Mixverse" environment. Various input methods, including gesture recognition and brain-computer interfaces, allow for intuitive control and interaction.

30 Claims, 20 Drawing Sheets

(51) Int. Cl.
*H04N 23/11* (2023.01)
*H04R 1/02* (2006.01)

(56) References Cited

U.S. PATENT DOCUMENTS

2014/0043320 A1* 2/2014 Tosaya ............... G02B 27/0172
　　　　　　　　　　　　　　　　　　　　　345/419
2017/0336641 A1* 11/2017 von und zu Liechtenstein ...........
　　　　　　　　　　　　　　　　　　　　　G06T 19/006

* cited by examiner

1800

1802: GENERATE, USING ONE OR MORE LIGHT SOURCES, ONE OR MORE LIGHT SIGNALS, WHEREIN THE ONE OR MORE LIGHT SIGNALS ARE TRANSMITTED TO ONE OR MORE DIRECTED PHYSICAL PIXELS USING ONE OR MORE LIGHT TRANSMISSION TECHNIQUES COMPRISING AT LEAST ONE OF: RADIATION AND OPTICAL FIBERS AND WAVEGUIDES

1804: ADJUST, A LIGHT INTENSITY MODULATOR, AN INTENSITY OF THE ONE OR MORE LIGHT SIGNALS BY CHANGING A VOLTAGE

1806: DIRECT, A BEAM STEERER AND GUIDANCE MODULE, THE ONE OR MORE LIGHT SIGNALS AT ONE OR MORE ANGLES ONTO ONE OR MORE EYES OF THE ONE OR MORE USERS FOR PROJECTING THE NUMBER OF VIRTUAL PIXELS OF THE ONE OR MORE VIRTUAL IMAGES ONTO THE PUPIL OF THE ONE OR MORE EYES OF THE ONE OR MORE USERS.
ALSO DIRECT, A BEAM STEERER AND GUIDANCE MODULE, THE ONE OR MORE LIGHT SIGNALS FROM TWO OR MORE DIRECTED PHYSICAL PIXELS AT ONE OR MORE ANGLES ONTO ONE OR MORE SUB-AREAS OF A PUPIL FOR PROJECTING A SINGLE VIRTUAL PIXEL ON A RETINA, WHICH CAUSES CHANGING A FOCAL EFFORT IN LENS MUSCLES TO SIMULATE NATURAL ACCOMMODATION CUES AND MITIGATE VERGENCE-ACCOMMODATION CONFLICT IN VIRTUAL REALITY (VR) AND AUGMENTED REALITY (AR) ENVIRONMENTS (A)

FIG. 18 (CONTINUED)

COMPUTER-IMPLEMENTED SYSTEM AND METHOD FOR PROVIDING VR/AR VISUAL EXPERIENCES TO USERS BY PUPIL-DIRECTED RETINAL PROJECTION IN NEAR-EYE DISPLAYS

CROSS REFERENCE TO RELATED APPLICATION(S)

This application claims the priority to incorporate by reference the entire disclosure of U.S. provisional patent application No. 63/693,824 filed on Sep. 12, 2024, titled "SYSTEM AND METHOD FOR PUPIL-DIRECTED RETINAL PROJECTION IN NEAR-EYE DISPLAYS".

TECHNICAL FIELD

Embodiments of the present disclosure relate to near-eye display systems and more particularly relate to a computer-implemented system and method utilizing pupil-directed retinal projection for virtual reality (VR), augmented reality (AR), and vision correction applications. The computer-implemented system and method provide optimized visual experiences to one or more users by projecting one or more virtual images onto one or more eyes in near-eye displays.

BACKGROUND

Near-eye display systems have been an area of significant research and development in recent years, with applications in virtual reality (VR), augmented reality (AR), and vision correction. The near-eye systems aim to provide immersive visual experiences and enhance real-world vision by projecting images directly in front of user's eyes.

History of near-eye displays is traced back to 1960s with development of first head-mounted displays (HMDs). Since then, the field has seen tremendous growth and innovation, driven by advancements in display technology, optics, and computing power.

Traditional VR and AR headsets rely on optical systems involving lenses and mirrors to produce high-quality images from small displays. The optical systems use either Organic Light Emitting Diode (OLED) screens or Liquid-crystal display (LCD) screens placed close to the user's eyes, with lenses that focus and magnify the image to create a wide field of view. While the traditional VR and AR headsets have achieved significant commercial success, the traditional VR and AR headsets may be bulky and heavy, leading to user discomfort during extended use. Additionally, the use of optical elements introduces visual artifacts such as chromatic aberration, distortion, and screen door effect.

To address these limitations, various alternative technologies have been explored. One such approach is the use of waveguide displays, which allow for thinner and lighter devices. The alternative technologies use a series of optical elements to guide light from a display engine to the user's eyes, allowing for a more compact form factor. However, the waveguide displays suffer from a limited field of view and may struggle with image quality and brightness.

Retinal projection technology has emerged as a promising alternative to conventional display methods. The retinal projection technology involves projecting the light directly onto the retina, potentially providing higher resolution and reduced eye strain. Early attempts at retinal projection include a virtual retinal display developed in the 1990s. More recently, companies have developed retinal scanning display technology for use in consumer electronics and automotive applications.

However, existing retinal projection systems suffer from the limited field of view and may struggle to provide a natural, full-view experience as the user's eyes move. Addressing these challenges has been a focus of ongoing research and development efforts.

Several major technology companies have made significant investments in the near-eye display space. The companies have released several generations of VR headsets and working on photorealistic avatars for more immersive experiences and the development of AR glasses. The companies have built a framework for creating AR experiences on communication devices. Many companies have since focused on the AR experiences through smartphones and have developed a platform for building AR applications. The headsets may use a combination of waveguide optics and spatial computing to deliver mixed-reality experiences. Many companies produce smart glasses for both consumer and enterprise markets.

Many companies are developing the AR glasses with a focus on Artificial Intelligence (AI) integration. Few companies have introduced their own smart glasses products. Some are specializing in waveguide optics for the AR displays. Many companies develop holographic waveguide technology for AR and automotive head-up displays. Many companies developed Focals smart glasses.

Some companies are producing lightweight AR glasses that connect to smartphones. Research institutions have also made significant contributions to the field. The research institutions have been investigating integrated optical phased arrays for beam forming and steering, which may have applications in next-generation display systems. Some research institutions have been working on combining integrated optics and holography for the AR applications. Some research institutions have conducted research on holographic displays for VR and AR applications. Some research institutions have explored the use of light field displays to address vergence-accommodation conflict in near-eye displays.

Despite these advancements, challenges remain in creating the near-eye displays that are lightweight, providing the wide field of view, and providing high-quality images without causing discomfort or visual artifacts. Issues including vergence-accommodation conflict, where the brain receives conflicting depth cues, continue to pose problems for many existing systems.

The vergence-accommodation conflict occurs because most current VR and AR systems present images at a fixed focal distance, while the user's eyes may be converging on the objects at different virtual distances. This mismatch may lead to visual discomfort and fatigue. Various solutions have been proposed, including varifocal and multifocal displays, as well as light field displays that present multiple focal planes simultaneously.

Another significant challenge is achieving the wide field of view while maintaining image quality and device compactness. Human peripheral vision extends to approximately 210 degrees horizontally, but most current VR headsets provide a field of view of around 100-110 degrees. Expanding the field of view requires larger optics and displays, which may increase the size and weight of the device.

Eye tracking has become an increasingly important component of the near-eye display systems. Accurate eye tracking allows for foveated rendering, where image quality is prioritized in the area where the user is looking, reducing computational requirements. The eye tracking also enables more natural interaction in the VR and AR environments and is used to adjust a display output based on the user's pupil position.

The integration of vision correction into AR and VR devices remains an area of active development. Many current systems require the users to wear prescription lenses in addition to the headset, which may be cumbersome and reduce comfort. Some companies are exploring ways to incorporate vision correction directly into the display system, potentially eliminating the need for additional eyewear.

Power consumption and battery life are ongoing concerns for standalone near-eye display devices. The high computational requirements of rendering complex 3D environments, combined with the power needs of displays and other sensors, may lead to short battery life and heat generation issues.

As the field of near-eye displays continues to evolve, there is ongoing research into technologies including at least one of: (a) holographic displays, which may potentially provide more realistic 3D images with correct focus cues, (b) advanced beam steering methods, including Micro-Electro-Mechanical System (MEMS)-based systems and non-mechanical approaches such as liquid crystal on silicon (LCoS) devices, (c) improved eye-tracking systems with higher accuracy and lower latency, (d) novel optical materials and fabrication techniques to create more efficient and compact display systems, (e) integration of haptic feedback and other sensory inputs to enhance immersion in the VR and AR experiences, and (f) development of more sophisticated rendering techniques and display algorithms to improve visual quality and reduce computational requirements.

These efforts aim to overcome current limitations and bring more natural, comfortable, and immersive visual experiences to the users across a range of applications, including gaming, education, healthcare, industrial design, remote collaboration, and the like.

Nevertheless, none of these approaches fully address the challenges of providing the wide field of view, the high resolution, and natural focus cues in a compact, lightweight form factor. Additionally, the above said approaches may not adequately solve the vergence-accommodation conflict or integrate seamlessly with the vision correction needs. Furthermore, many of these technologies face significant hurdles in terms of manufacturing scalability and cost-effectiveness for mass-market adoption.

With the advancement of artificial intelligence, concerns about the falsification of digital content are becoming increasingly serious. New technologies are being developed to combat face and video forgery (known as Deepfake), and some mobile platforms are already implementing these technologies. Methods including at least one of: Deepfake detection, Digital Fingerprinting, Steganography, Digital Watermarking, and Chain Tracking on Blockchain, are mechanisms that help fight content forgery and enhance users' trust in the authenticity of content.

When a video is recorded by a device, these methods may ensure that the video has not been altered. However, a new issue may arise: the possibility that an image was manipulated beforehand and then recorded off a monitor using an original device. In such a case, the digital signature might appear valid, but the image itself was already fake.

This issue represents one of the complex challenges in the field of video authenticity verification. In such cases, even if a digital signature or digital fingerprint is correctly generated, the video content could have been manipulated beforehand and then recorded off a monitor or display, making it much harder to detect that the video is fake. To address this challenge, several approaches and technologies are being developed and explored.

Detection of optical and electronic characteristics, flicker detection (slight vibration in the refresh rate), metadata analysis, and deep learning are methods that may help to solve the problem. However, at present, no solution may fully and completely detect all cases of forgery.

These smart glasses are equipped with a global positioning system (GPS) for outdoor positioning. However, many AR and Mixed Reality applications occur indoors. For instance, the user may be in a store and ask the AI Assistant Virtual Avatar to show the user a specific item on the shelves, or the user may have a meeting with a friend in a large multi-story mall. These scenarios require a highly accurate indoor positioning system.

Current systems, including at least one of: Local Positioning System (LPS) and Indoor Positioning System (IPS), lack precision and may not determine the user's movement direction. The current systems also require building infrastructure like Wireless-Fidelity (Wi-Fi) or Bluetooth, which not always available, and there are no established standards in this area.

The motion sickness caused by motion that is felt but not seen i.e. terrestrial motion sickness. The motion sickness may be caused by motion that is seen but not felt i.e. space motion sickness. The motion sickness is also caused when systems detect motion but they do not correspond i.e. either terrestrial or space motion sickness. It has also been proposed that the motion sickness may function as a defense mechanism against neurotoxins. An area postrema in the brain is responsible for inducing vomiting when poisons are detected, and for resolving conflicts between vision and balance. When feeling motion but not seeing it (for example, in the cabin of a ship with no portholes), the inner ear transmits to the brain that it senses motion, but the eyes tell the brain that everything is still. As a result of the incongruity, the brain concludes that the user is hallucinating and further concludes that the hallucination is due to poison ingestion. The brain responds by inducing vomiting, to clear the supposed toxin.

Introducing a static frame of reference (independent visual background) may reduce simulation sickness. A technique called Nasum Virtualis shows a virtual nose as a fixed frame of reference for the VR headsets. Other techniques for reducing the nausea involve simulating ways of displacement that may not create or reduce discrepancies between the visual aspects and body movement, including at least one of: reducing rotational motions during navigation, dynamically reducing the field of view, teleportation, movement in zero gravity, and the like. Galvanic vestibular stimulation, which creates an illusion of motion by electric stimulation of the vestibular system, is another technique being explored for its potential to mitigate or eliminate the visual-vestibular mismatch. To alleviate these symptoms, methods including gradual adaptation to VR, the use of natural remedies like ginger, and wearing acupressure bracelets are effective. Choosing VR games designed to minimize motion sickness may also reduce nausea and improve the user experience. Nevertheless, these approaches fail to accurately eliminate the motion sickness.

Therefore, there is a need for a computer-implemented system and method for providing optimized visual experiences to one or more users by projecting one or more virtual images onto one or more eyes in near-eye displays, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented system for providing optimized visual experiences to one or more users by projecting one or more virtual images onto one or more eyes in near-eye displays, is disclosed. The computer-implemented system includes one or more light sources configured to generate one or more light signals. The one or more light signals are transmitted to one or more directed physical pixels using one or more light transmission techniques. The one or more transmission techniques comprise at least one of: radiation and optical fibers and waveguides.

The computer-implemented system further includes a light intensity modulator configured to adjust an intensity of the one or more light signals by changing a voltage. The computer-implemented system further includes a beam steerer and guidance module configured to direct the one or more light signals at one or more angles onto one or more sub-areas of a pupil for projecting a number of virtual pixels of the one or more virtual images onto a pupil of the one or more eyes of the one or more users.

The computer-implemented system further includes the one or more directed physical pixels arranged on one or more glasses. Each directed physical pixel of the one or more directed physical pixels is configured to scan a pre-defined area of the one or more virtual images covering a number of virtual pixels at a pre-determined rate per second. The one or more glasses with the one or more directed physical pixels, are configured to be act as one or more prescription glasses for at least one of: providing one or more views of AR and VR images, and correcting at least one of: farsightedness, nearsightedness, astigmatism, strabismus, and one or more refractive errors. The one or more directed physical pixels are configured to be synchronized with the pre-defined area of the one or more virtual images using one or more processors to project the one or more virtual images onto the one or more eyes in near-eye displays by covering one or more areas corresponding to a position and size of, the pupil of the one or more eyes of the one or more users.

In an embodiment, each directed physical pixel of the one or more directed physical pixels is configured to project a corresponding virtual pixel of the one or more virtual images based on one or more factors. The one or more factors comprise at least one of: a position of the number of virtual pixels in a space, an area of the one or more virtual images that the one or more directed physical pixels cover, a position of the one or more directed physical pixels on the one or more glasses, a position and distance of the pupil relative to the one or more glasses, a diameter of open area of the pupil of the one or more eyes of the one or more users. The one or more directed physical pixels are formed using nanoscale Optical Phased Arrays (OPAs) integrated with one or more transparent circuits, providing lightweight and compact display hardware with optimized transparency for optimized user comfort.

In another embodiment, the one or more glasses comprise one or more layers, wherein the one or more layers comprise at least one of: (a) an electrochromic layer configured to adjust transparency of the one or more glasses by applying the voltage, wherein the electrochromic layer is an electrochromic dimming layer configured to switch the one or more glasses between clear and shared modes, wherein the electrochromic layer is configured to selectively dim one or more portions of user views behind virtual elements, for optimizing contrast for an AR content while maintaining overall transparency and situational awareness; (b) a transparent color display layer configured to be act as a display for at least one of: displaying one or more contents and adapting the one or more users to share the one or more contents, wherein the transparent color display layer is transparent when the near-eye display is at least one of: inactive and AR transparent layer mode, and the transparent color display layer is configured as an opaque display when the near-eye display is active; and (c) a touchpad layer configured to adapt the one or more glasses to function as one or more electronic devices when the near-eye display is not worn by the one or more users.

In yet another embodiment, the one or more glasses comprise one or more frames, wherein the one or more frames of the one or more glasses comprise at least one of: one or more visible light cameras, one or more infrared (IR) cameras, one or more light projectors, one or more depth sensing sensors, one or more microphones, one or more communication and networking elements, one or more magnetic parts, one or more headphones, and one or more speakers, and one or more touchpads. The one or more glasses are configured to mitigate a motion sickness in virtual reality environments by at least one of: (a) adding vestibular stimulation mechanisms within the smart wearables to simulate realistic motion cues; (b) dynamically adjusting a field of view of the one or more users and reducing rotational visual artifacts during navigation; and (c) adding environmental references comprising a virtual static frame, to stabilize perception of the one or more users.

In yet another embodiment, the computer-implemented system further includes optical phased array-based imaging and sensing systems that are integrated into the one or more frames and one or more lens, of the one or more glasses. The optical phased array-based imaging and sensing systems comprise at least one of: (a) one or more Optical Phased Array (OPA) cameras mounted on at least one of: the one or more lens and the one or more frames of the one or more glasses, wherein the one or more OPA cameras are configured to capture one or more images using at least one of: sparse, dense, and sparse-dense distribution topologies, for optimizing transparency, reducing weight, and improving optical clarity; (b) one or more OPA-based Light Detection and Ranging (LiDAR) sensors integrated into at least one of: a glass layer and the one or more frames, wherein the one or more OPA-based LiDAR sensors are configured to perform at least one of: depth sensing, object recognition, and environmental mapping for augmented reality (AR) applications, hand gesture recognition, and enhanced eye tracking; (c) one or more OPA-based eye trackers integrated into at least one of: the one or more lens and the one or more frames of the one or more glasses, wherein the one or more OPA-based eye trackers are configured to provide at least one of: real-time tracking of pupil movement, gaze direction, and inter-pupillary distance (IPD) computation for adaptive focus correction and interactive AR experiences; (d) a Sparse-Dense OPA architecture comprising a combination of sparsely distributed sensors and densely arranged sensing elements, which provides an optimal balance between cost-efficiency, high resolution, and minimal visual obstruction; and (e) a control module configured to process one or more signals from the OPA imaging and sensing components, dynamically adjusting beam steering, scanning resolution, and power consumption based on real-time user activity and one or more environmental conditions.

In yet another embodiment, the one or more visible light cameras comprise at least one of: one or more forward based visible light cameras and one or more face based visible light cameras. The one or more forward based visible light cameras comprise at least one of: (a) one or more telephoto cameras configured on sides of the one or more frames, wherein the one or more telephoto cameras comprise one or more adjustable long-focus lenses for utilizing the one or more glasses as binoculars with one or more user gesture operations comprising widening the one or more eyes of the one or more users; (b) one or more ultra-wide cameras configured in a center of a forehead of the one or more frames, wherein the one or more ultra-wide cameras comprise one or more adjustable close-focus lenses for utilizing the one or more glasses as binocular microscopes for one or more objects proximity to the one or more adjustable close-focus with the one or more user gesture operations comprising winking followed by half-closed eyes; and (c) one or more high-resolution cameras arranged at least one of: along an upper edge of each frame and around the one or more frames of each glass, wherein the one or more high-resolution cameras are arranged by at least one of: parallel to each high-resolution camera, perpendicular to a glass surface, and an angle closely perpendicular to an eyeball, for providing one or more perspectives, and wherein one or more images captured from the one or more high-resolution cameras are combined using the one or more processors based on the position of the pupil.

The one or more face based visible light cameras are facing the one or more users, wherein the one or more face based visible light cameras are configured for at least one of: generating one or more photorealistic avatars and displaying one or more faces of the one or more users during one or more video calls.

In yet another embodiment, the IR cameras comprise at least one of: (a) one or more forward based IR cameras arranged above the one or more frames, wherein the one or more forward based IR cameras are configured to optimize visibility in low-light ambient; and (b) one or more face based IR cameras arranged at least one of: below the one or more frames and sides of the one or more frames. The one or more face based IR cameras are configured to provide an accurate and real-time measurement of a location and the diameter of the open area of the pupil of the one or more eyes of the one or more users and degree of eye openness. The one or more face based IR cameras are configured to perform Inter-Pupillary Distance (IPD) computation to prevent strain in the one or more eyes by automatically adjusting near-eye displays to the IPD associated with the one or more users.

In yet another embodiment, the one or more light projectors comprise at least one of: (a) one or more standard light projectors are positioned at a center of the forehead of the one or more glasses to capture photography and night vision; (b) one or more infrared light projectors facing at least one of: the face and the one or more eyes of the one or more users, are positioned around each IR camera, wherein the one or more infrared light projectors are configured to at least one of: detect the face at night, capture one or more facial expressions for one or more avatars, and track the pupil of the one or more users.

In yet another embodiment, the one or more depth sensing sensors comprise at least one of: (a) one or more forward depth sensing sensors configured to at least one of: detect depth, assist in navigation and artificial intelligence assisted (AI-assisted) Global and Local Positioning System (AIPS), recognize hand movements and one or more gestures, provide optimized integration of real and virtual worlds by the AI, optimizing augmented reality (AR), track a position of at least one of: one or more hands, one or more fingers, and one or more foot, for interactive applications, generating one or more bokeh effects in portrait photography, and generating accurate three-dimensional maps and measuring distances, wherein detecting the depth using the one or more forward depth sensing sensors comprise at least one of: detecting a position of one or more ears of the one or more users for directing sound, generating three-dimensional maps of the surrounding environment, enabling accurate placement and scaling of virtual objects as if coexisting with real-world elements, detecting a surface of a table to turn the table into a virtual keyboard, identifying a position of furniture for virtually placing the one or more users in three dimensional (3D) remote communication, and detecting one or more obstacles while the one or more users are moving; and (b) one or more face depth sensing sensors configured to at least one of: identify the one or more faces of the one or more users, measure a distance between the one or more eyes and facial features relative to the one or more glasses, and the position of the pupil in relation to the one or more glasses, track pupil and eye of the one or more users, capture movements of at least one of: eyelids, eyebrows, and lips to simulate smiles and facial expressions for the one or more avatars, and analyze at least one of: body language, the facial expressions, and emotions to transfer cues to one or more virtual avatars for the visual experiences and gaze commands.

In yet another embodiment, the one or more microphones are configured for optimized quality audio recording and noise reduction during conversation between the one or more users, wherein the one or more microphones comprise at least one of: (a) one or more forward facing microphones configured to filter at least one of: background noise during online translation and noisy environments, and capture optimized audio during video recording; and (b) one or more user microphones configured to determine a speech of the one or more users to be optimized and filter the background noise, and utilize the AI to differentiate a voice of the one or more users from environmental sounds.

In yet another embodiment, the computer-implemented system further comprises one or more linear actuators arranged in at least one of: front side, back side, left side, right side, and top, of a helmet, wherein at least one linear actuator among the one or more linear actuators are placed on a chin strap, which adapts for effective stimulation of an inner ear fluid in one or more directions to simulate one or more virtual movements for reducing motion sickness during the virtual reality (VR) experiences.

In yet another embodiment, the computer-implemented system further comprises an ultrasonic directional speaker mounted on a smart wearables. The ultrasonic directional speaker in the smart wearables is configured to: (a) translate an audio of the one or more users during conversation speaking of the one or more users; (b) send the translated audio of the one or more users directly to one or more ears of one or more second users; and (c) determine that the audio of the one or more users is directed to the one or more second users, managing privacy and optimizing the audio in the noisy environments.

In yet another embodiment, the computer-implemented system is configured to seamlessly transition between one or more AR modes, one or more VR modes, and one or more digital vision correction modes, for dynamically adjusting a visual output based on at least one of: one or more inputs of the one or more users, one or more environmental conditions, and application requirements. The computer-implemented system is further configured to mitigate eye-strain in the near-eye displays by at least one of: (a) continuously changing a projection point of the one or more light signals within an open area of the pupil to prevent long-term focus on a single point and to avoid long-term damage to the eye without sacrificing image clarity, wherein the one or more light signals comprise laser beams; (b) dynamically adjusting the intensity and color of the one or more light signals based on the pupil diameter and movements of the one or more users; and (c) adding a pupil-saver mechanism to simulate one or more natural vision behaviors.

The computer-implemented system is configured to optimize three-dimensional depth perception in AR and VR applications, by at least one of: (a) dynamically adjusting the focal effort required by the lens muscles of the one or more users; (b) aligning depth cues from at least one of: binocular disparity, object size inference, and lens focus effort; and (c) simulating natural depth perception to mitigate user fatigue and optimized immersion.

In yet another embodiment, the near-eye displays comprise a Sparse pixel topology of the one or more directed physical pixels, for cost-effectiveness and transparency of glasses, and a Sparse-Dense pixel topology of the one or more directed physical pixels, which is adapted for a combination of sparse distribution for cost-effectiveness and dense clusters for projecting one or more optimized-resolution images. The near-eye displays further comprise one or more calibration processes to correct the one or more refractive errors comprising at least one of: myopia, hyperopia, and astigmatism, by adjusting one or more projection parameters based on one or more user-specific optical profiles.

The one or more refractive errors causing vision defects of the one or more users, are dynamically corrected, by: (a) detecting the one or more refractive errors by analyzing laser beam reflections from the pupil and retina; (b) adjusting at least one of: intensity, angle, and phase, of the one or more directed physical pixels to emulate a corrective lens effect; and (c) continuously recalibrating beam parameters as the user's gaze shifts, providing personalized, lens-free vision correction.

In yet another embodiment, the one or more light signals from the one or more directed physical pixels, are dynamically adjusted to evade a floater of the one or more eyes for providing optimized and unobstructed images, upon detecting a position of the floater of the one or more eyes, comprising (a) an Infrared optical phased array (OPA) LiDAR to detect a real-time location of floaters in the pupil, (b) a central processing unit to dynamically adjust laser beam paths to avoid interference with floaters, and (c) algorithms to maintain a clear and unobstructed image for the one or more users.

In yet another embodiment, the computer-implemented system further comprises: (a) one or more virtual layers configured to be synchronized across the one or more glasses of the one or more users to exchange information associated with one or more augmented environments for at least one of: group activities, remote instruction, holographic meetings, from one or more locations; (b) one or more digital scent modules configured to provide contextually relevant aromas for virtual experiences, which optimizes realism in VR and AR scenarios comprising at least one of: tourism, culinary exploration, and social scent messaging; and (c) one or more electroencephalogram (EEG) and Magnetoencephalography (MEG) sensors mounted on at least one of: the smart wearables and the one or more frames of the one or more glasses, configured to generate one or more brainwave signals for adjusting one or more displayed contents, which causes at least one of: handsfree control, thought-driven interactions, and personalized adjustments, based on one or more intentions, early diagnosis of neurological disorders comprising Parkinson's.

In yet another embodiment, the computer-implemented system is configured to combine one or more overlapped virtual layers comprising at least one of: one or more property-owner managed layers and one or more optimized Mixverse layers, with media in a real world, to generate complexed multi-tiered augmented experiences. The computer-implemented system is further configured to determine an optimized indoor location and orientation that assist the one or more users in one or more processes comprising at least one of: navigation, item finding, and directionality within interior spaces, based on utilization of at least one of: depth data, visual data, and inertial data and AI.

In yet another embodiment, the computer-implemented system is configured to: (a) detect one or more emotional states through the one or more brainwave signals; and (b) automatically adjust at least one of: one or more AR and VR parameters, brightness, and contrast, to mitigate stress, optimize comfort, and provide one or more supportive recommendations based on health status of the one or more users.

In yet another embodiment, the computer-implemented system is configured to operate in Augmented Reality (AR) mode using: (a) a transparent layer mode, wherein one or more virtual elements are overlaid onto a natural environment while maintaining direct visibility of ambient light; and (b) an opaque layer mode, wherein real-world imagery captured by front-facing cameras, is combined with the one or more virtual elements to generate a mixed-reality experience.

In yet another embodiment, the one or more directed physical pixels are integrated into a contact lens, configured to: (a) project the one or more virtual images directly onto the retina using at least one of: a micro-scale OPA and a beam-steering technology; (b) track the pupil position of the one or more users in real-time by at least one of: an accelerometer or one or more sensors, to dynamically adjust projection angles for optimal image clarity; (c) operate in at least one of: the sparse, dense, and sparse-dense topology, to balance resolution, transparency, and power and cost efficiency; and (d) adapt augmented reality (AR) and vision correction functionality without a need for an external eyewear.

In yet another embodiment, the computer-implemented system further comprises (a) a power-efficient optical projection module for the near-eye displays, configured to: (i) direct the laser beams exclusively toward the pupil for reducing unnecessary light dispersion to minimize energy consumption; and (ii) dynamically adjust beam emission to optimize computational and power resources based on real-time pupil tracking and user gaze direction; and (b) a modular magnetic attachment mechanism for connecting removable components comprising at least one of: one or more external battery packs, additional sensors, one or more smart assistants, and Silicon Light Shield for VR immersion, allowing for customizable configurations.

In yet another embodiment, the computer-implemented system further comprises a nerve impulse detection module integrated into a necklace gadget. The nerve impulse detection module comprises: (a) one or more high-density electrode arrays for detecting motor nerve signals from a spinal cord, wherein the one or more high-density electrode arrays comprise at least one of: the Electroencephalography (EEG) and the Magnetoencephalography (MEG) sensors, to capture neural activity from neck down; (b) one or more Signal processing algorithms to interpret detected nerve impulses for gesture recognition and digital command execution; and (c) an Integration with full-body AI tracking to simulate one or more avatar movements in augmented reality, virtual reality, and metaverse applications.

In yet another embodiment, the computer-implemented system is configured to: (a) receive one or more remote holographic data streams; and (b) integrate the one or more remote holographic data streams into the field of view of the one or more users, for providing telepresence experiences of one or more distant locations through directed physical pixel projection.

In yet another embodiment, the computer-implemented system is configured to determine the authenticity of recorded video and audio, by: (a) hashing LiDAR data frame-by-frame along with video and audio during recording; (b) digitally signing the hashed LiDAR data using a private key of one or more secure elements; (c) employing a chain of a trust model with at least one of: a Certificate Authority (CA) and a Blockchain-based CA for authentication; and (d) verifying the authenticity through multi-level validation using local and central secure elements.

In yet another embodiment, the computer-implemented system is further configured to integrate a biometric authentication through the pupil tracking by analyzing one or more unique iris patterns and micro-movement behaviors, allowing secure user identification without requiring external credentials.

In yet another embodiment, the computer-implemented system further comprises a gesture-controlled smart pen interface, adapting the one or more users to write, draw, and interact with one or more digital surfaces through one or more infrared tracking sensors embedded within the one or more glasses.

In one aspect, a computer-implemented method for providing optimized visual experiences to one or more users by projecting one or more virtual images onto one or more eyes in near-eye displays, is disclosed. The computer-implemented method comprises generating, by one or more light sources, one or more light signals. The one or more light signals are transmitted to one or more directed physical pixels using one or more light transmission techniques. The one or more transmission techniques comprise at least one of: radiation and optical fibers and waveguides.

The computer-implemented method further comprises adjusting, by a light intensity modulator, an intensity of the one or more light signals by changing a voltage. The computer-implemented method further comprises directing, by a beam steerer and guidance, the one or more light signals from two or more directed physical pixels at one or more angles onto one or more sub-areas of a pupil for projecting a single virtual pixels on a retina, which causes changing a focal effort in lens muscles to simulate natural accommodation cues and mitigate vergence-accommodation conflict in virtual reality (VR) and augmented reality (AR) environments.

The computer-implemented method further comprises configuring the one or more directed physical pixels on one or more glasses. Each directed physical pixel of the one or more directed physical pixels is configured to scan a pre-defined area of the one or more virtual images covering several virtual pixels at a pre-determined rate per second. The one or more glasses with the one or more directed physical pixels, are configured to be act as one or more prescription glasses for at least one of: providing one or more views of AR and VR images, and correcting at least one of: farsightedness, nearsightedness, astigmatism, strabismus, and one or more refractive errors. The one or more directed physical pixels are configured to be synchronized with the pre-defined area of the one or more virtual images using one or more processors to project the one or more virtual images onto the one or more eyes in near-eye displays by covering one or more areas corresponding to a position and size of, the pupil of the one or more eyes of the one or more users.

In another aspect, a non-transitory computer-readable storage medium having instructions stored therein that, when executed by a hardware processor, causes the processor to perform method steps as described above.

In an embodiment, the glasses comprise a frame, lenses with directed pixel layers, and sensors for tracking pupil movement. Each directed pixel may generate multiple virtual pixels by rapidly changing its emission angle. The glasses function as prescription lenses, virtual reality displays, and augmented reality devices without traditional optical systems. Additional features include depth sensors, cameras, and connectivity to peripheral devices. The glasses enable a seamless blend of virtual and real-world experiences, creating an immersive "Mixverse" environment. Various input methods, including gesture recognition and brain-computer interfaces, allow for intuitive control and interaction.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
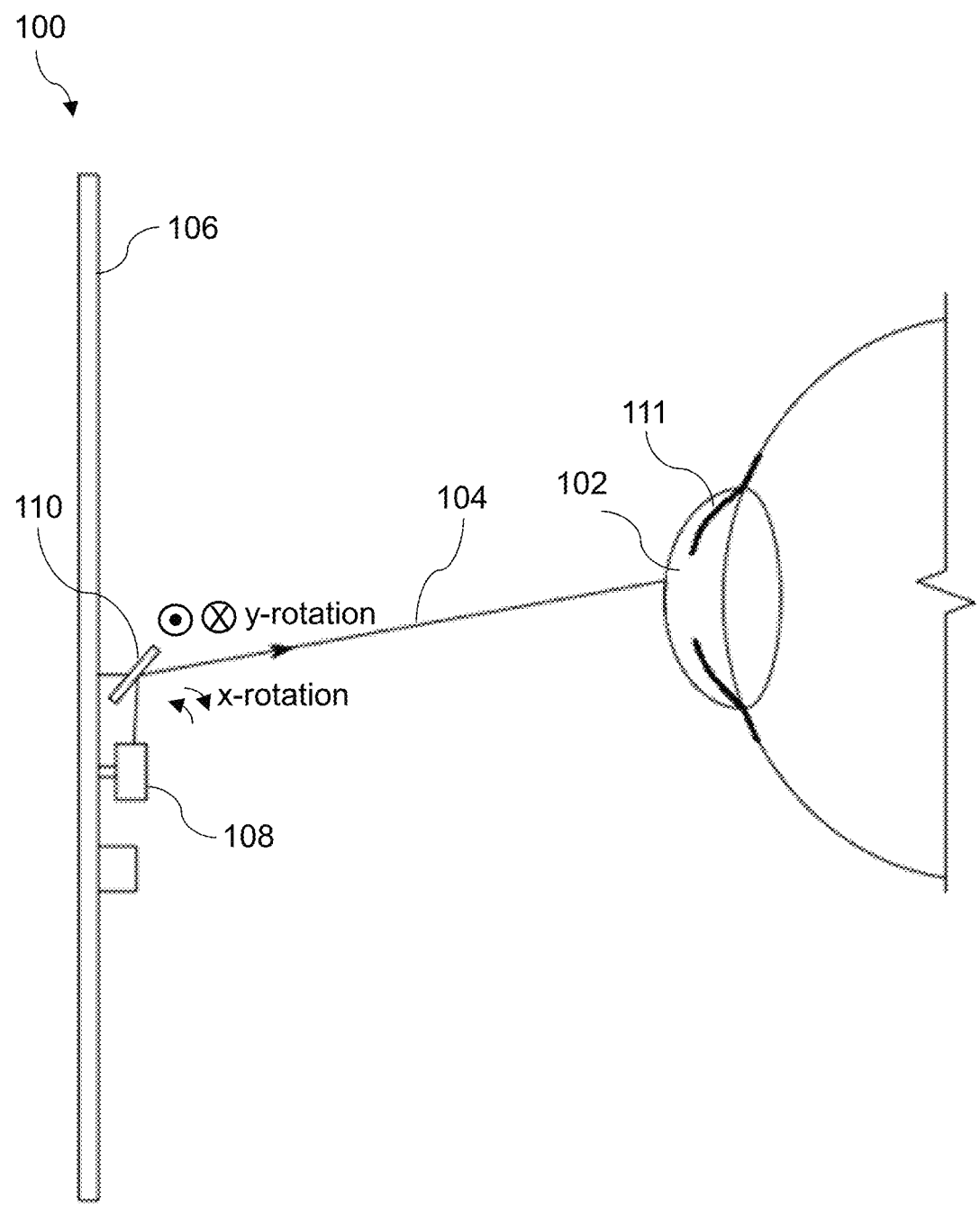
FIG. 1 illustrates an exemplary visual representation depicting a sample configuration of a directed physical pixel, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 18, where similar reference characters denote corresponding features consistently throughout the figures, there are shown preferred embodiments and these embodiments are described in the context of the following exemplary system and/or method.

Figure 2:
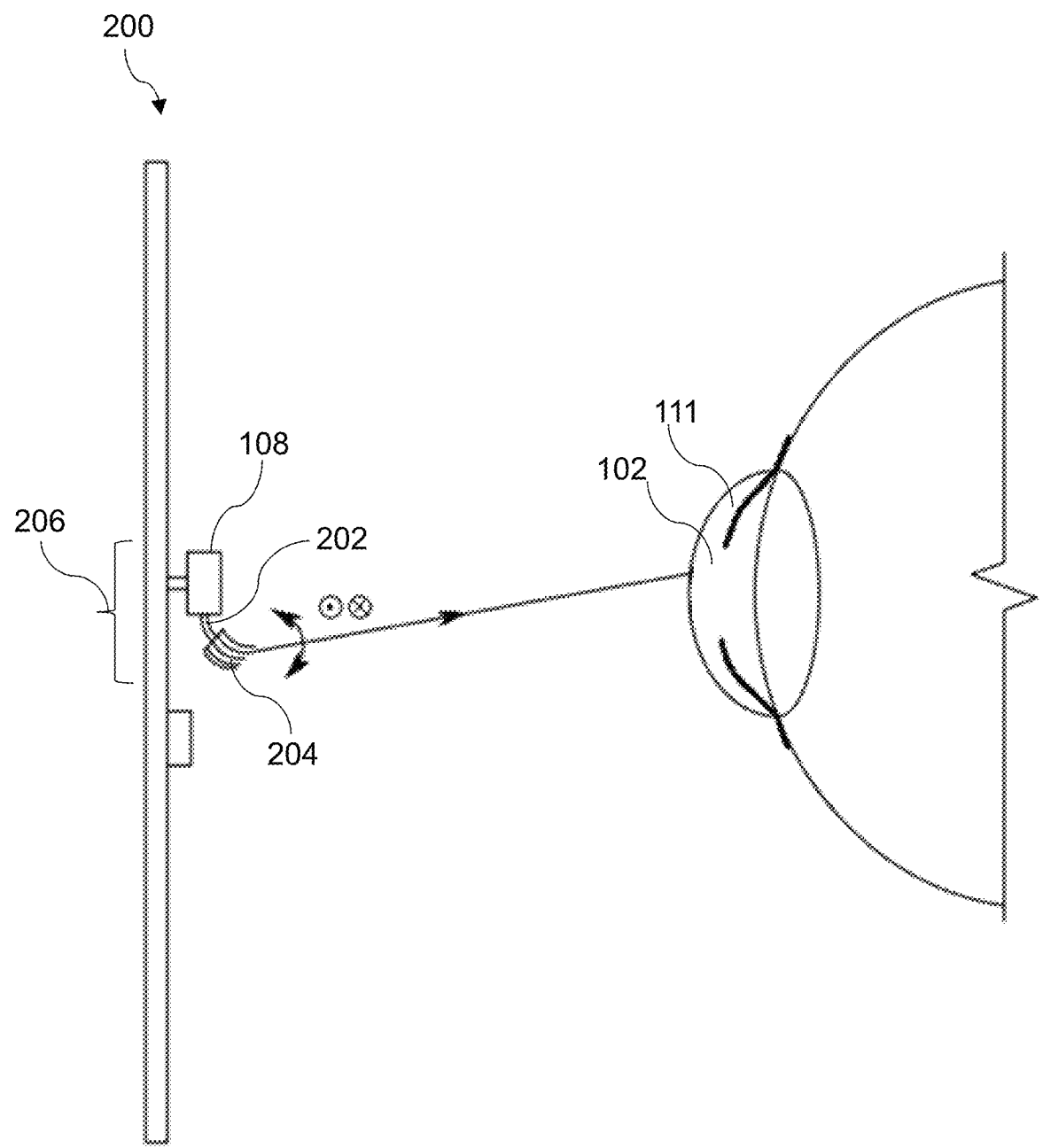
FIG. 2 illustrates an exemplary visual representation depicting the sample configuration of the directed physical pixel, in accordance with an embodiment of the present disclosure.
Figure 4A:
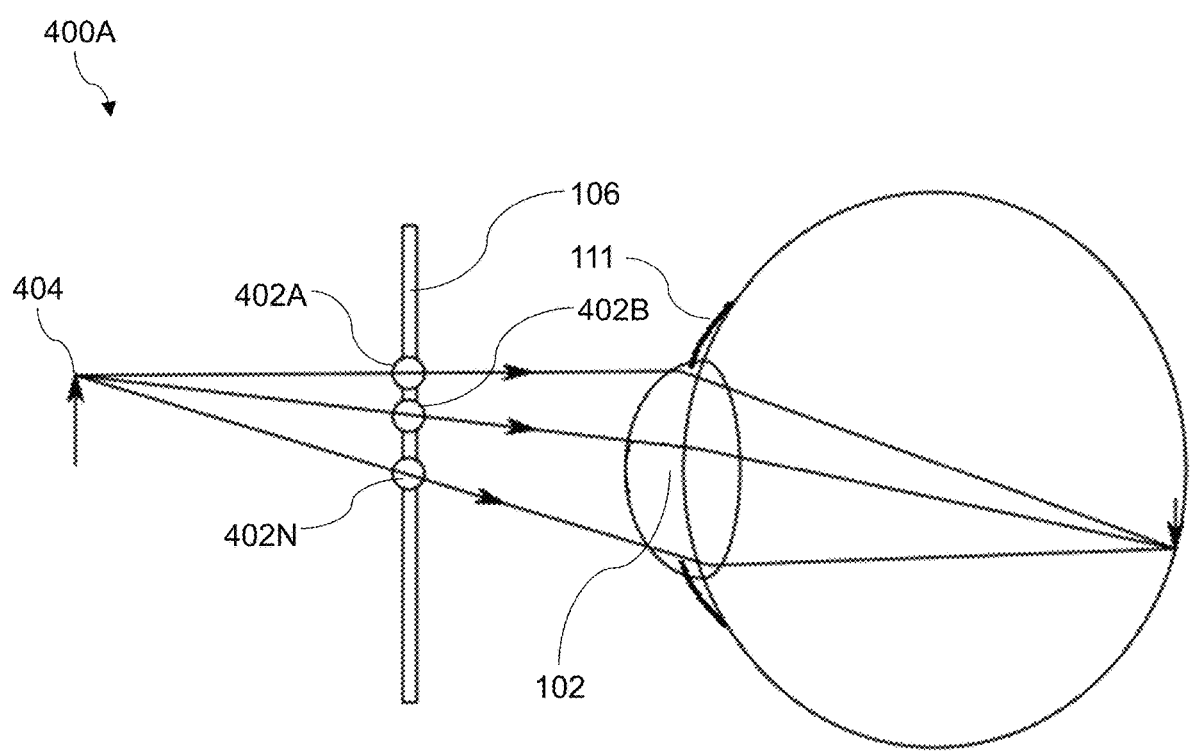
FIG. 4A illustrates an exemplary visual representation depicting one virtual pixel, in accordance with an embodiment of the present disclosure.
Figure 4B:
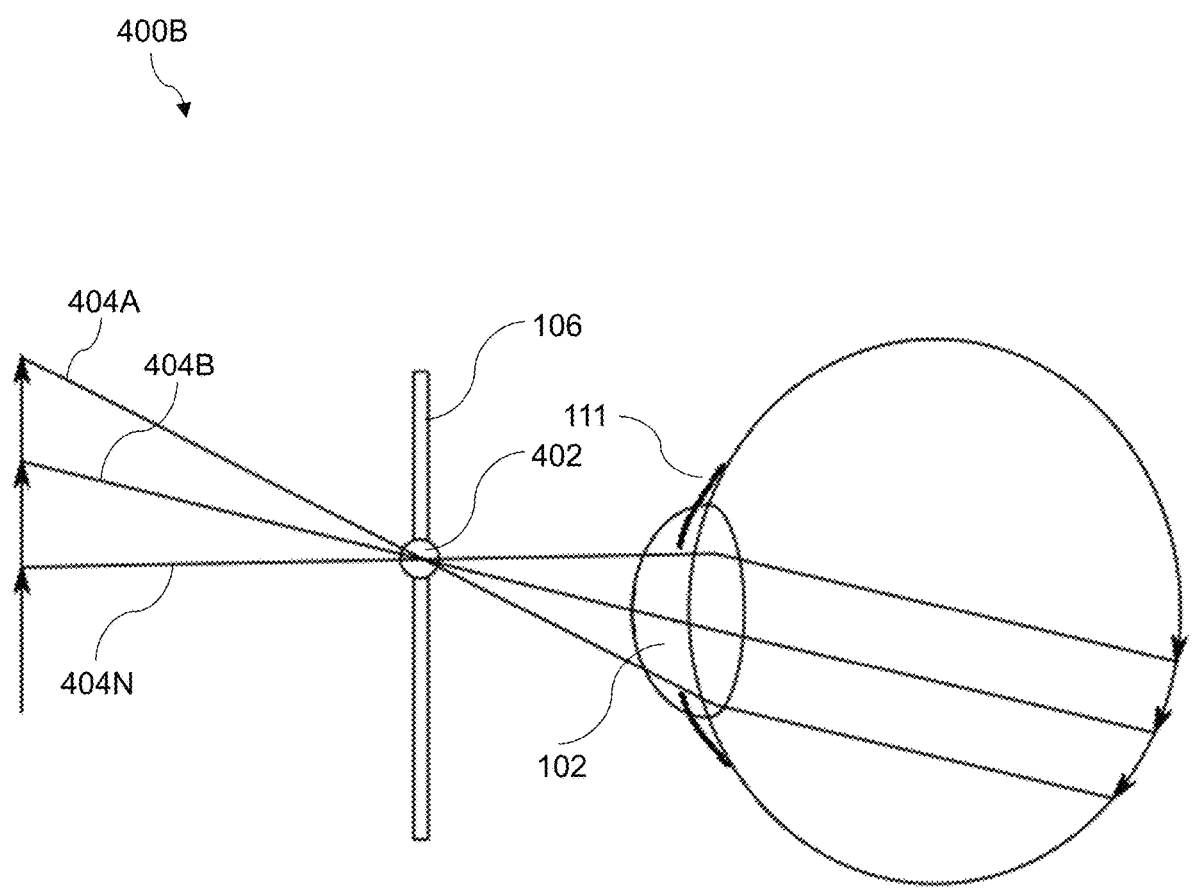
FIG. 4B illustrates an exemplary visual representation depicting multiple virtual pixels, in accordance with an embodiment of the present disclosure.
Figure 5A:
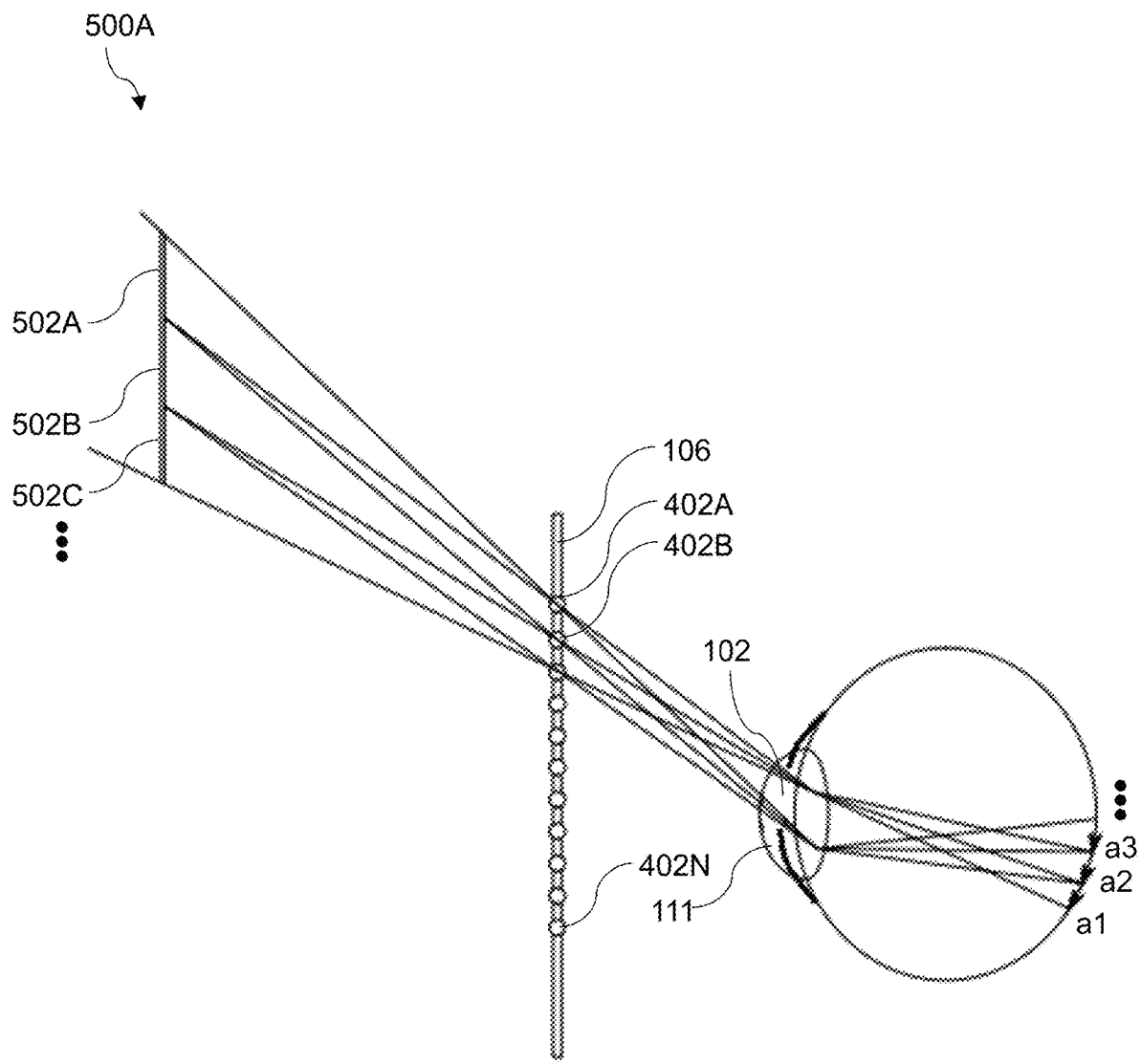
FIG. 5A illustrates an exemplary visual representation depicting a Sparse topology, in accordance with an embodiment of the present disclosure.
Figure 5B:
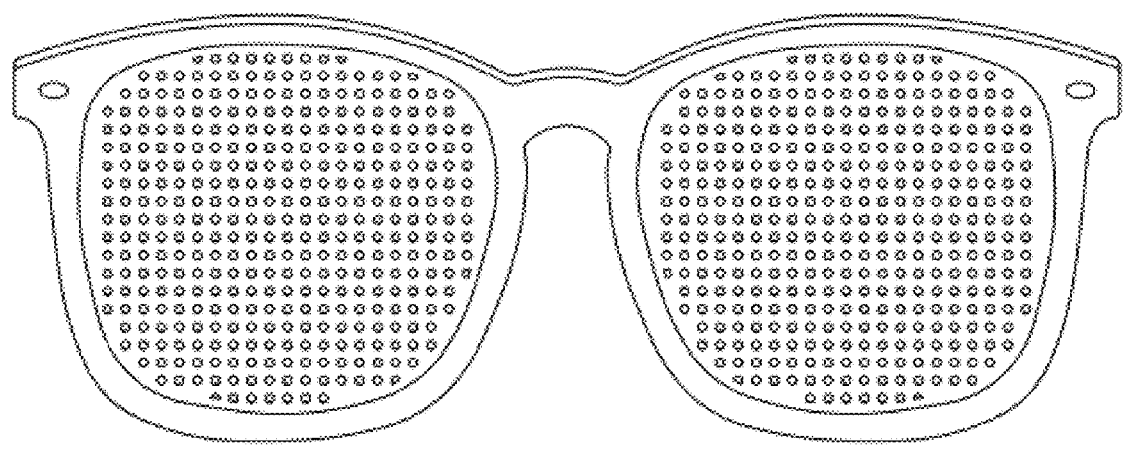
FIG. 5B illustrates an exemplary visual representation depicting multiple physical pixels, in accordance with an embodiment of the present disclosure.
Figure 5C:
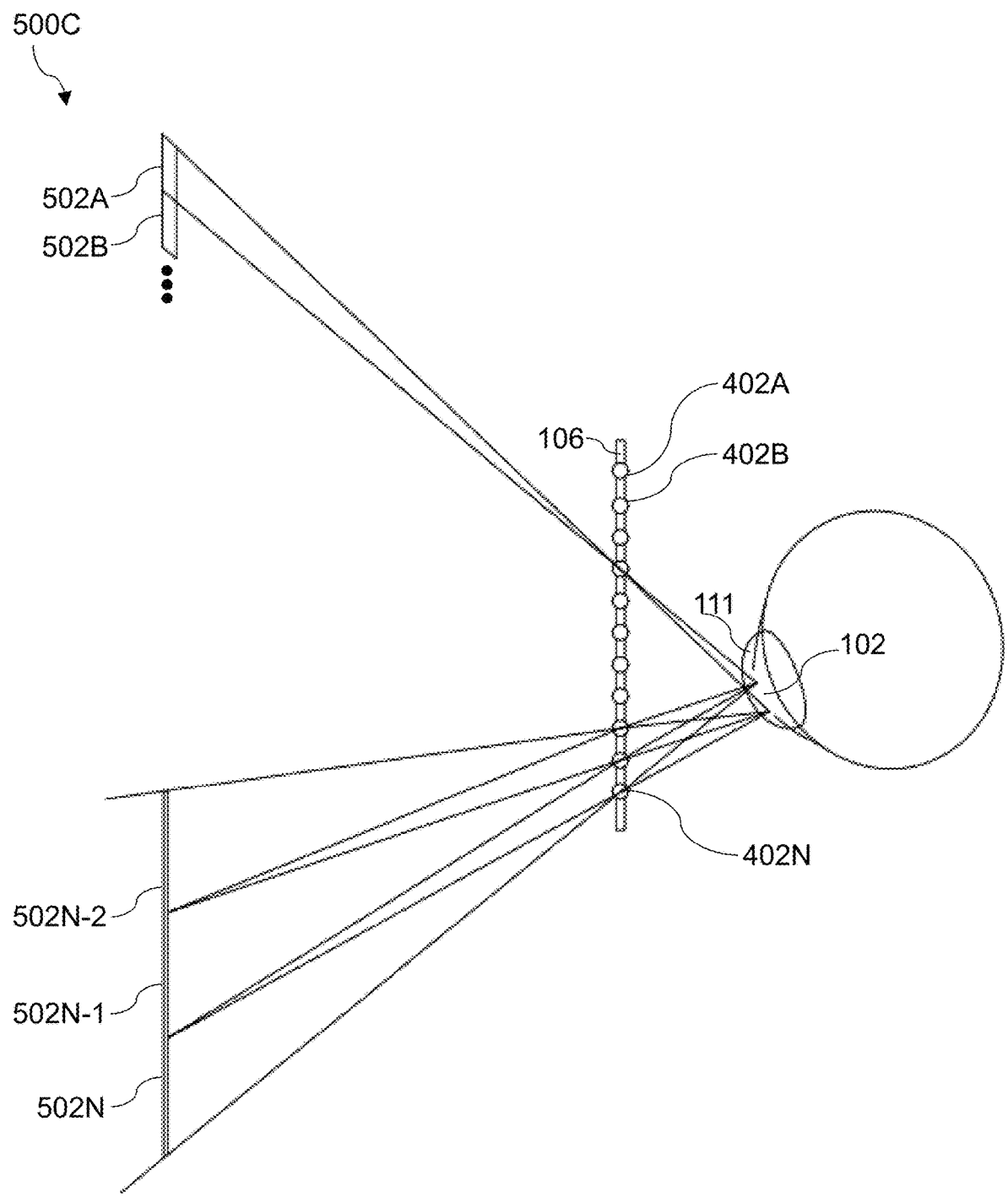
FIG. 5C illustrates an exemplary visual representation depicting a virtual region, in accordance with an embodiment of the present disclosure.
Figure 6A:
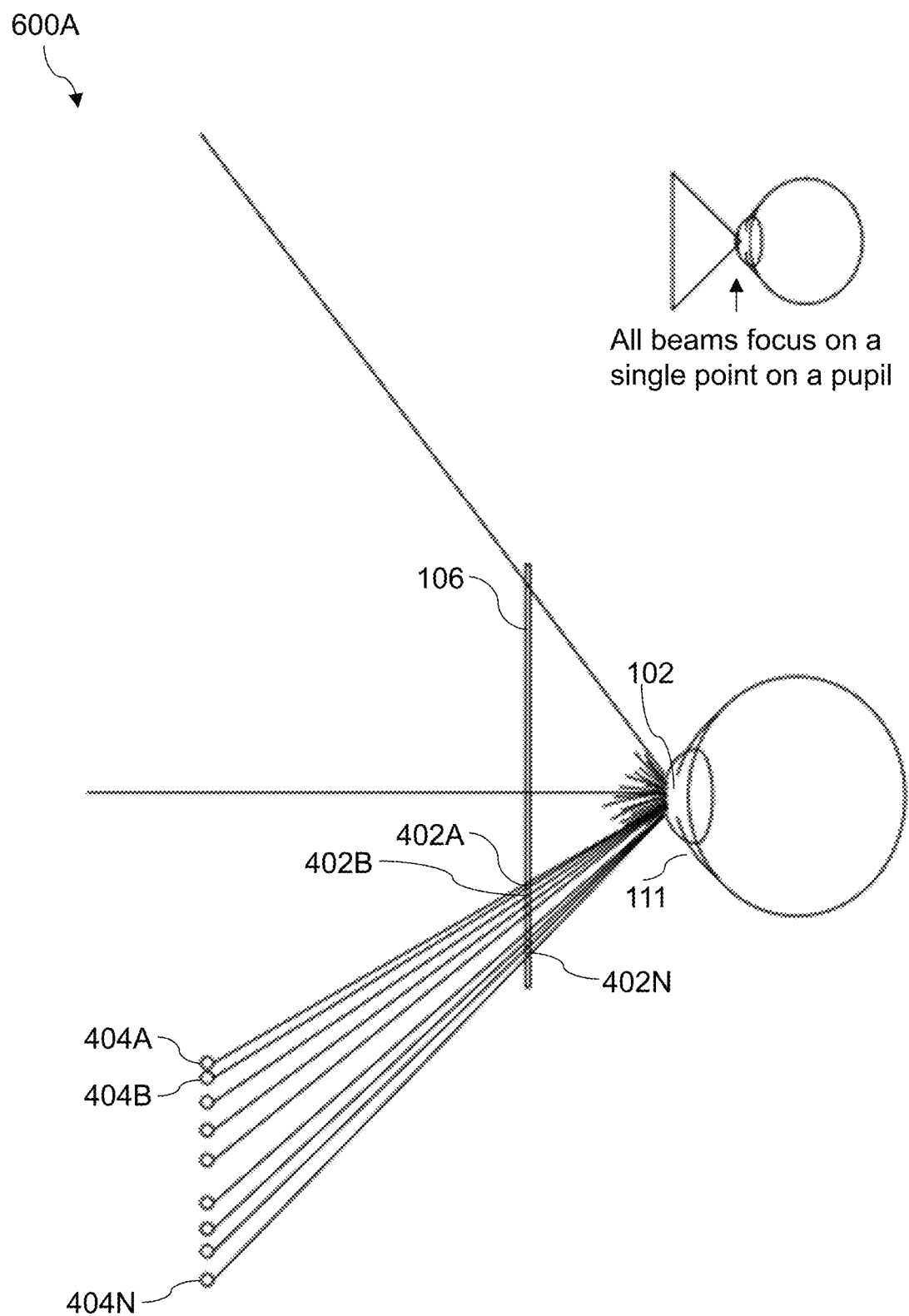
FIGS. 6A-6B illustrate exemplary visual representations depicting a Dense topology, in accordance with an embodiment of the present disclosure.
Figure 6B:
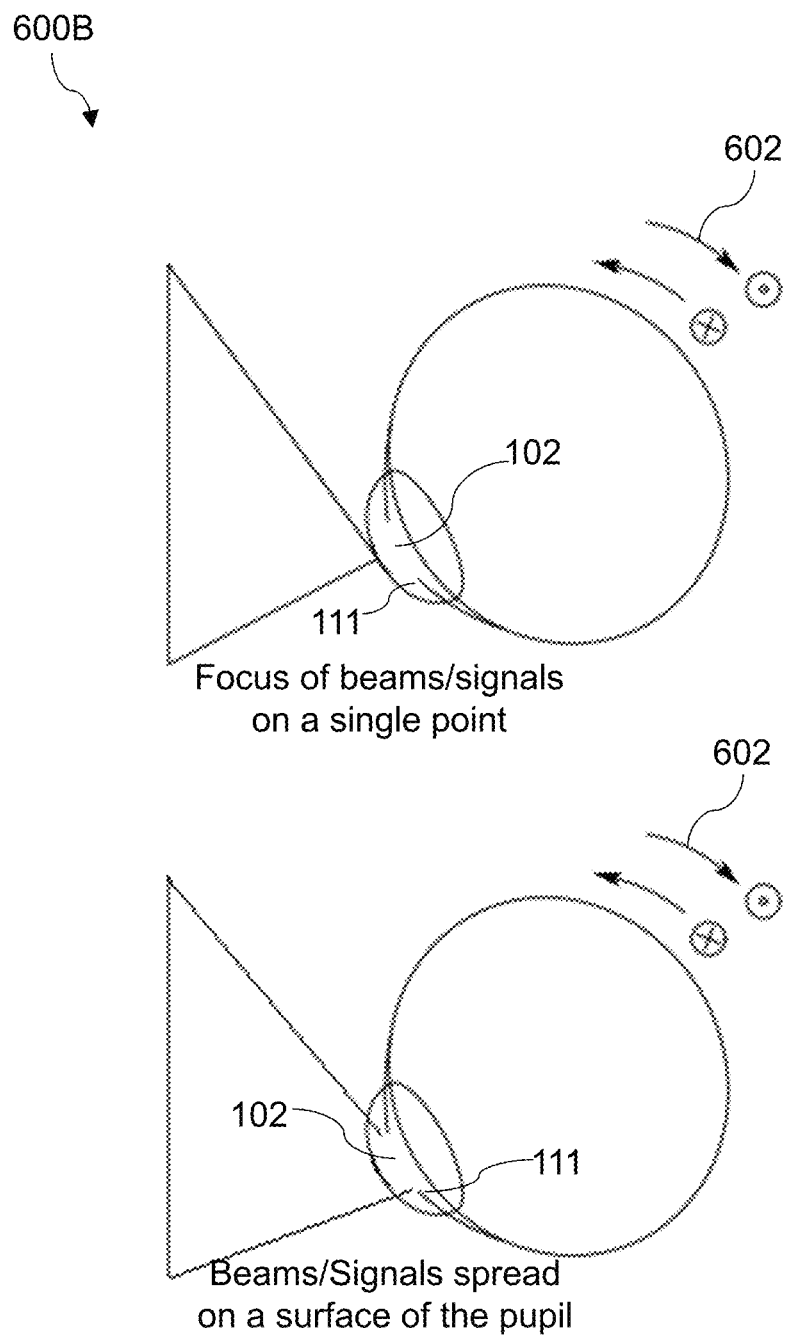
Figure 7:
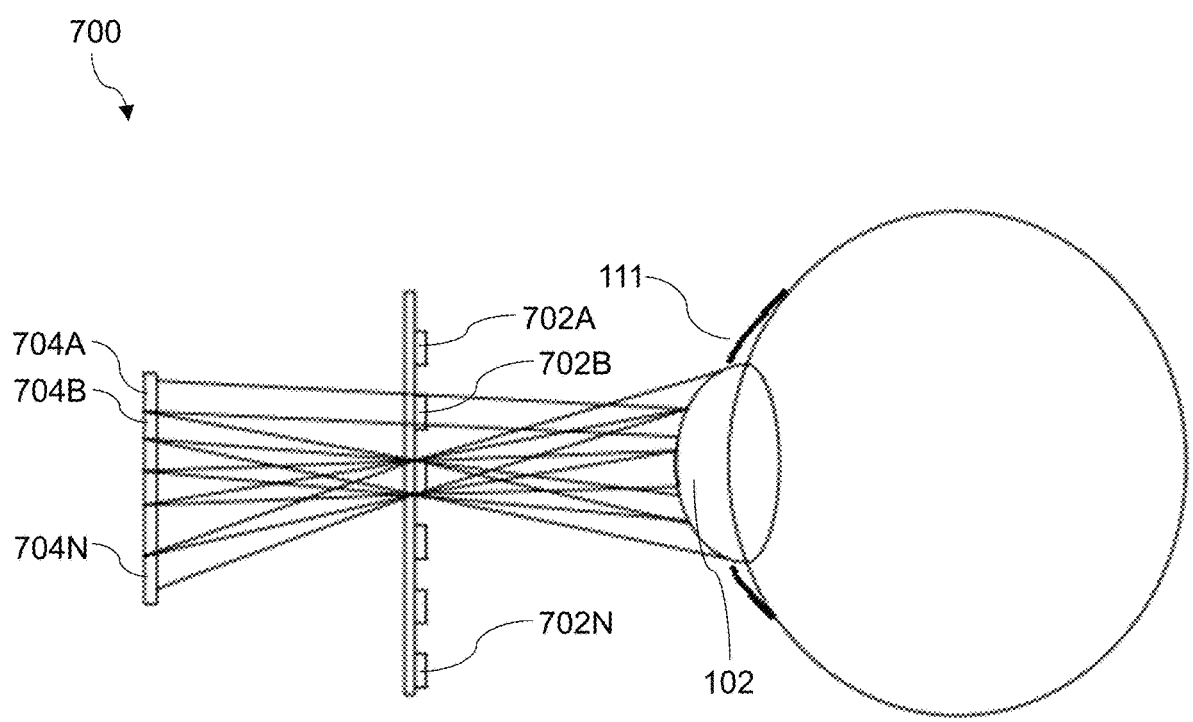
FIG. 7 illustrates an exemplary visual representation depicting a Sparse-Dense topology, in accordance with an embodiment of the present disclosure.
Figure 8A:
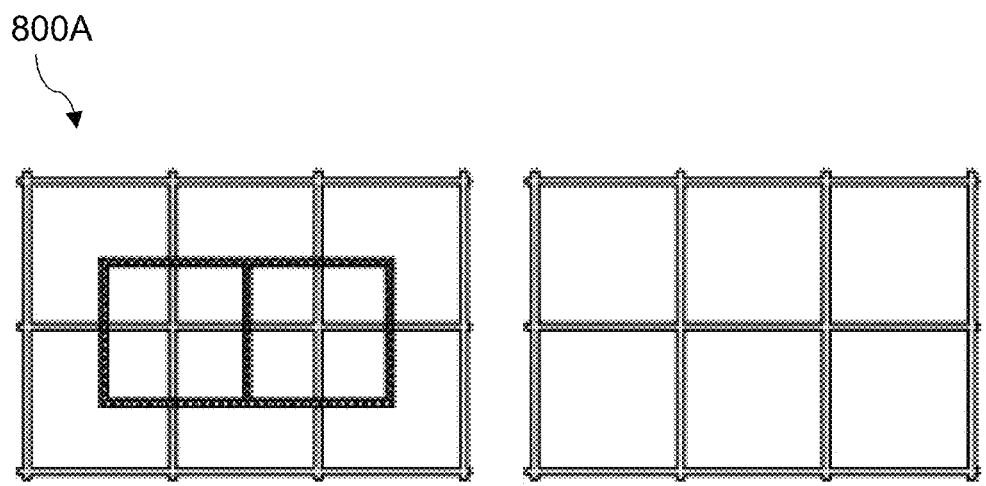
FIG. 8A illustrates an exemplary visual representation depicting virtual regions and complementary virtual regions created by the physical pixels, in accordance with an embodiment of the present disclosure.
Figure 8B:
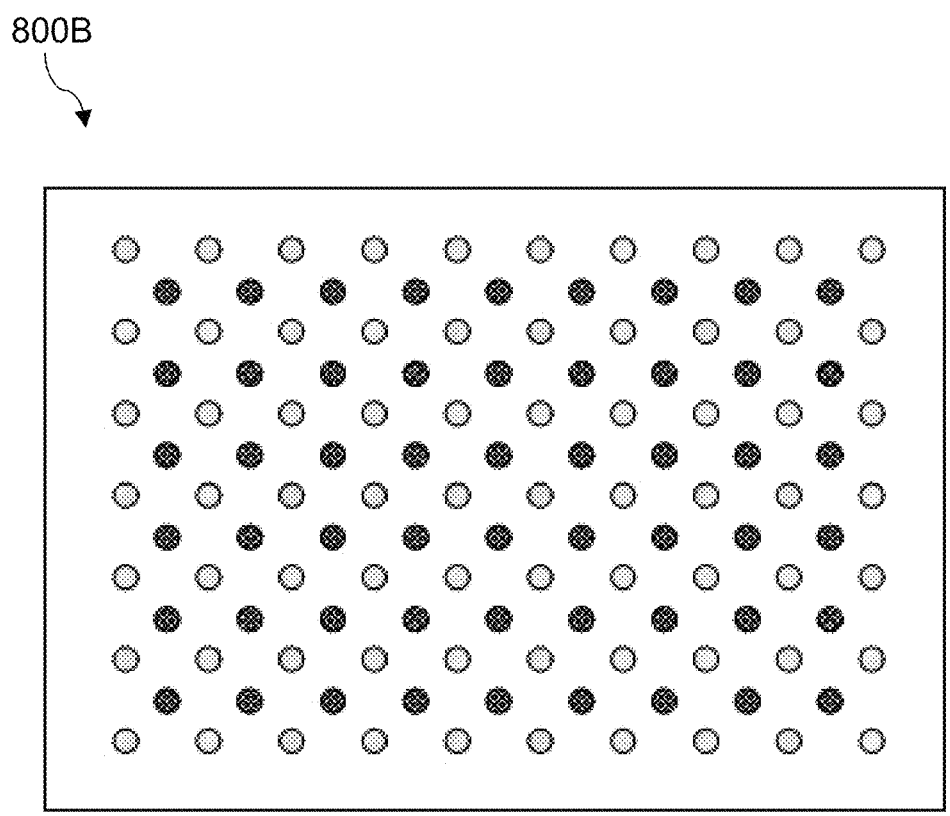
FIG. 8B illustrates an exemplary visual representation arrangement of the physical pixels and complementary physical pixels, in accordance with an embodiment of the present disclosure.
Figure 9:
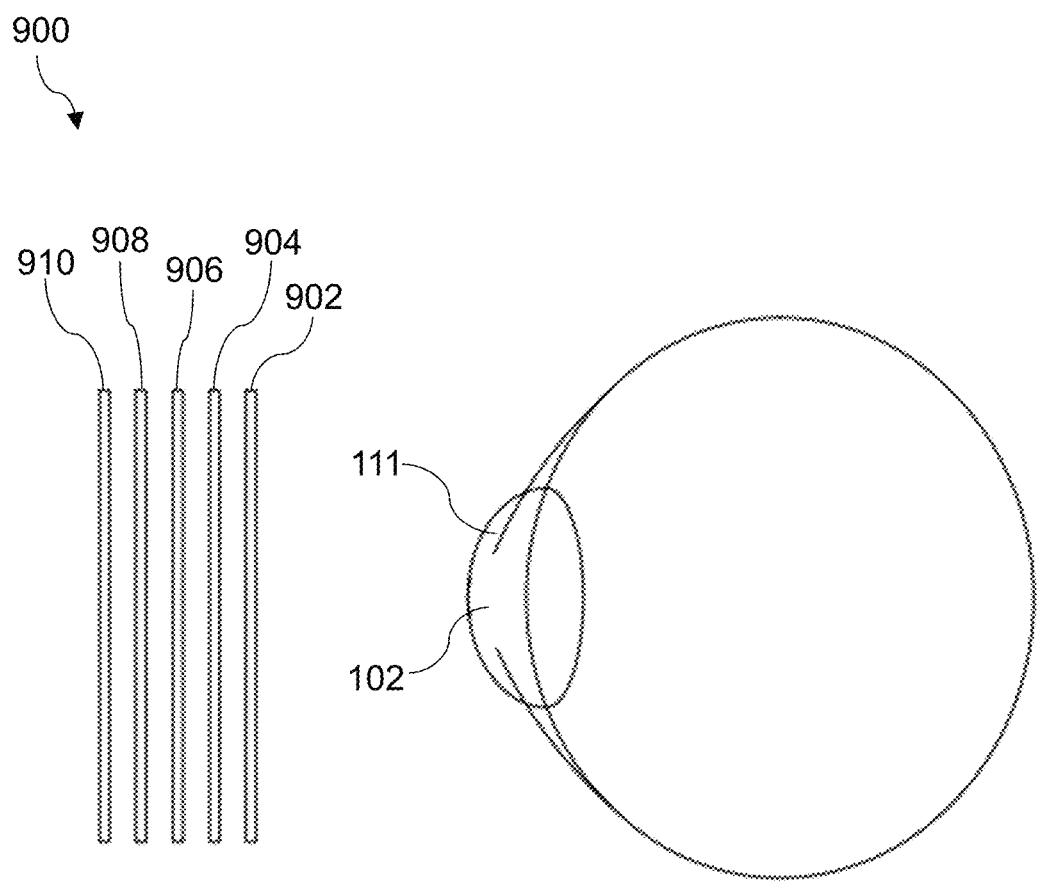
FIG. 9 illustrates an exemplary visual representation depicting multiple layers on glasses, in accordance with an embodiment of the present disclosure.

FIG. 1 illustrates an exemplary visual representation 100 depicting a sample configuration of a directed physical pixel, in accordance with an embodiment of the present disclosure;

FIG. 2 illustrates an exemplary visual representation 200 depicting the sample configuration of the directed physical pixel, in accordance with an embodiment of the present disclosure;

FIGS. 3A-3E illustrate exemplary visual representations 300 depicting light rays entering a pupil, in accordance with an embodiment of the present disclosure;

FIG. 4A illustrates an exemplary visual representation 400A depicting one virtual pixel, in accordance with an embodiment of the present disclosure;

FIG. 4B illustrates an exemplary visual representation 400B depicting multiple virtual pixels, in accordance with an embodiment of the present disclosure;

FIG. 5A illustrates an exemplary visual representation 500A depicting a Sparse topology, in accordance with an embodiment of the present disclosure;

FIG. 5B illustrates an exemplary visual representation 500B depicting multiple physical pixels, in accordance with an embodiment of the present disclosure;

FIG. 5C illustrates an exemplary visual representation 500C depicting a virtual region, in accordance with an embodiment of the present disclosure;

FIGS. 6A-6B illustrate exemplary visual representations (600A, 600B) depicting a Dense topology, in accordance with an embodiment of the present disclosure;

FIG. 7 illustrates an exemplary visual representation 700 depicting a Sparse-Dense topology, in accordance with an embodiment of the present disclosure;

FIG. 8A illustrates an exemplary visual representation 800A depicting virtual regions and complementary virtual regions created by the physical pixels, in accordance with an embodiment of the present disclosure;

FIG. 8B illustrates an exemplary visual representation 800B arrangement of the physical pixels and complementary physical pixels, in accordance with an embodiment of the present disclosure; and FIG. 9 illustrates an exemplary visual representation 900 depicting multiple layers on glasses, in accordance with an embodiment of the present disclosure.

In an exemplary embodiment, the computer-implemented system for pupil-directed retinal projection in near-eye displays is disclosed. The computer-implemented system is configured for providing optimized visual experiences to one or more users by projecting one or more virtual images onto one or more eyes in near-eye displays. The terms "computer-implemented system" and "pupil-directed system" may be used interchangeably throughout the description. The computer-implemented system employs a retinal display based on a position of a pupil 102 (The hole in the Iris 111). The retinal display directly projects a virtual image onto a retina in a manner very similar to a natural behavior of light in conventional eyeglasses, creating a full-view experience. On a glass 106 of the eyeglasses, micrometer-sized pixels are placed, which emit red, green, and blue laser light in a directed manner. An intensity, a color combination, and a phase (an angle of emission in two dimensions) of a light beam are controlled (for instance, using optical phased array technology) and are adjusted in real-time based on the virtual image and the position of the pupil 102 (The hole in the Iris 111).

The distribution of the pixels may be at least one of: dense, sparse, and a combination of both. Additionally, the pixels may be at least one of: uniformly distributed and non-uniformly distributed on lens. Moreover, transparent circuits are used in the construction of the pixels. The pixels are referred to as directed physical pixels (or directed pixels).

The computer-implemented system is configured to simulate and reconstruct natural behavior of a light as it enters the eyes through the glass 106 of the eyeglasses using the directed pixels, albeit with some differences. Normally, countless natural light rays from a single point in space enter the pupil 102 in a conical shape and are focused on the retina through an eye's optical system. Depending on the virtual image pixel's position in the space, the position of the physical pixel on the glass 106, the position and distance of the pupil 102 relative to the glass 106, and a diameter of the pupil's 102 opening, one or more laser beams 104 are used as representatives of all the natural light rays, and the image is directly formed on the retina.

In the case of a shaded glass mode, the environment's image is captured by at least one of: a camera and composite cameras on at least one of: the eyeglass frame and an optical phased array (OPA) camera on the glass 106. If necessary, the computer-implemented system is combined with augmented reality (AR). The image may also be entirely Virtual Reality (VR)-based image. In a transparent glass mode, only a display of augmented reality images is required.

The directed physical pixel is not like traditional Light Emitting Diodes (LEDs) used in monitors and televisions which emit light in various directions. The directed physical pixel emits the light as a very narrow laser beam in a single direction. The laser beam 104 quickly and sequentially changes its emission angle to direct the light towards an open area of the pupil 102, thereby projecting a single pixel of the virtual image onto the retina at any given moment.

Each directed physical pixel scans a small area of the entire virtual image, covering anywhere from one to thousands of virtual pixels on the retina, at a pre-determined rate (i.e., a minimum rate of 25 times) per second. Together with other pixels located at different points on the glass 106 of the eyeglass, the directed physical pixels form the full-view virtual image on the retina. The directed physical pixels are synchronized by a processor and each covers a specific area relative to the position and the size of the pupil 102, collectively forming the complete image.

The number of the directed physical pixels on the glass 106 of the eyeglass ranges from fewer than 100 to as many as a one-to-one correspondence with virtual pixels (with a current maximum density technology allowing for over 12 million pixels). The direction and the angle of the laser beam 104 may change within a range known as a Field of View (FOV), which may extend up to >90° in both the X and Y directions. The speed of the angle change is on the scale of a few nanoseconds, with an angular resolution being better than 0.1°. The thinner the laser beam's diameter, the better an image resolution. The ideal diameter matches the size of cone cells and rod cells, approximately 2 micrometers to 7 micrometers.

Each directed physical pixel comprises three independent yet closely positioned lasers in red, green, and blue. The three lasers change direction together, but their light intensities differ and are determined in the real-time based on the color and the intensity of the corresponding virtual pixel. Essentially, each directed physical pixel is made up of three adjacent Red Green Blue (RGB) sub-pixels that are sufficient to cover a sub-region of the image on the retina. Additionally, the intensity of the laser beams 104 is kept low, within the safe limits for retinal projection.

The computer-implemented system is configured to determine each directed physical pixel for displaying virtual pixel at any given moment depend on several factors. The several factors may comprise, but not restricted to, at least one of: the position of the virtual image pixel in the space, the area of the virtual image that the physical pixel may cover, the position of the physical pixel on the glass 106, the position and the distance of the pupil 102 relative to the glass 106, the diameter of the pupil's 102 open area, and the like. The calculations are performed by the system, and processed on at least one of: the glasses themselves, connected wearable devices, and in a cloud.

Even if the virtual image being displayed is static, the image projected by each directed physical pixel is sensitive to pupil movement. As the eye moves, the area each pixel may cover is recalculated by one or more calculation devices, and the pixel projection is adjusted accordingly.

The directed physical pixels are fixed on a layer on an inner surface of the glass 106 of the eyeglass, oriented at least one of: perpendicularly to the glass surface and at the angle nearly perpendicular to the eyeball. The directed physical pixels are also mounted on at least one of: middle layer and outer surfaces of the glass 106, though this may complicate the calculations. Additionally, some of the directed physical pixels may be embedded within the inner frame of the glasses 106. The glass 106 may be at least one of: flat and curved. Appropriate corrections in the computer-implemented system are applied to accommodate the curvature.

A layout topology of the directed physical pixels on the glass 106 may be at least one of: Dense, Sparse, and Sparse-Dense. The directed physical pixels may also be distributed uniformly and non-uniformly across the glass 106. The directed physical pixels may be constructed from the transparent circuits and Integrated Circuits (ICs). The directed physical pixels are equipped with a mechanism similar to a watchdog timer found in the processors. This feature protects the eye by stopping the system in case of malfunction or freeze, preventing the continuous projection of the laser beam 104 onto a single spot on the eye.

The directed physical pixels are constructed from at least one of: a light source (e.g., a laser light source), light transmission, light on/off and intensity modulation (i.e., a light intensity modulator), light direction determination, the processor and a memory unit, and the layout topology. The laser light source for each pixel is generated near the directed physical pixels itself. Alternatively, the laser light source may be external to the directed physical pixel and delivered to the pixel location via at least one of: direct radiation (from the eyeglass frame) and optical fibers and waveguides. The external source is shared among multiple directed physical pixels, or each directed physical pixel is connected to its own independent laser light source via the optical fiber or waveguide. Depending on the light-guiding technology, the laser light source is perpendicular to the surface or parallel to the surface. Laser generation technologies may include, but not constrained to, at least one of: Nanolaser, Vertical-cavity surface-emitting laser (VCSEL) 108, a projector mounted on the eyeglass frame to direct the light towards the pixel guiding area using one of: micromirrors and optical phased array (OPA), and the like.

In the light transmission, if the laser light source is external to the directed physical pixels, the laser light is transmitted to the directed physical pixels via at least one of: distant radiation and the optical fibers and the waveguides. A fiber routing is either dedicated or shared, depending on whether a common or independent laser light source is used for each directed physical pixel. Even if the laser light source is adjacent to or within the directed physical pixels, all three radiation and optical fiber and waveguide methods are employed for the light transmission.

In the light on/off and intensity modulation, the intensity of the light beam in each of the three RGB colors is adjusted in (but not limited to) three ways: (a) directly at the laser source itself, (b) using Liquid Crystal Diode (LCD) panels, and (c) utilizing Spatial Light Modulators (SLMs) and mechanisms within OPA technology. Additionally, the intensity is determined and controlled at the laser light source in the dedicated fiber and waveguide routing. In an embodiment, the intensity is adjusted at the pixel location in the shared fiber routing.

In the light direction determination (i.e., beam steerer and guidance module), the final guidance and steering of the light beams towards the open area of the pupil 102 is executed precisely at the pixel location. Several existing technologies are used for this purpose. The existing technologies may comprise, but not limited to, at least one of: OPA: Phased-array optics (i.e., a collection of nanophotonic antennas arranged in one of: a One-Dimensional (1D) array and a Two-Dimensional (2D) array), Microelectromechanical Mirrors (MEMS) 110, Spatial Light Modulators (SLMs), Microlens, Microprism, and other Light Beam Steering technologies.

Each directed physical pixel may either have its own independent processor and the memory or share the processor and the memory with other directed physical pixels. The layout topology of the directed physical pixels may be at least one of the: Sparse, Dense, and Sparse-Dense.

For instance, a sample configuration (shown in FIG. 1) of the directed physical pixel may look as follows. The one or more light sources (e.g., Vertical-cavity surface-emitting laser (VCSEL)) 108 are configured to generate one or more light signals (this instance is simplified for a single color, such as red). The one or more light signals are transmitted to one or more directed physical pixels using one or more light transmission techniques. In an embodiment, the one or more transmission techniques comprise radiation technique. The light intensity modulator is configured to adjust an intensity of the one or more light signals by changing a voltage. The beam steerer and guidance module (the MEMS (microelectromechanical mirrors 110) in this sample) is configured to direct the one or more light signals at one or more angles onto one or more eyes of the one or more users for projecting a number of virtual pixels of the one or more virtual images onto a pupil 102 of the one or more eyes of the one or more users. The beam steerer and guidance module (the MEMS (microelectromechanical mirrors 110) in this sample) is configured to direct the one or more light signals (from two or more directed physical pixels) at one or more angles onto one or more sub-areas of the pupil for projecting a single virtual pixel on a retina, which causes changing a focal effort in lens muscles to simulate natural accommodation cues and mitigate vergence-accommodation conflict in virtual reality (VR) and augmented reality (AR) environments. The one or more directed physical pixels arranged on one or more glasses 106. Each directed physical pixel of the one or more directed physical pixels is configured to scan the pre-defined area of the one or more virtual images covering the number of virtual pixels at a pre-determined rate per second. The one or more glasses with the one or more directed physical pixels, are configured to be act as one or more prescription glasses for at least one of: providing one or more views of AR and VR images, and correcting at least one of: farsightedness, nearsightedness, astigmatism, strabismus, and one or more refractive errors. The one or more directed physical pixels are configured to be synchronized with the pre-defined area of the one or more virtual images using one or more processors to project the one or more virtual images onto the one or more eyes in near-eye displays by covering one or more areas corresponding to a position and size of, the pupil 102 of the one or more eyes of the one or more users. It is important to note that changes in any of the six components may alter the design. For instance, if the layout topology is changed to the Sparse-Dense, a VCSEL Array is used instead of the single VCSEL beam.

In an embodiment, the one or more directed physical pixels are integrated into a contact lens, configured to: (a) project the one or more virtual images directly onto the retina using at least one of: a micro-scale OPA and a beam-steering technology; (b) track the pupil position of the one or more users in real-time by at least one of: an accelerometer or one or more sensors, to dynamically adjust projection angles for optimal image clarity; (c) operate in at least one of: the sparse, dense, and sparse-dense topology, to balance resolution, transparency, and power and cost efficiency; and (d) adapt augmented reality (AR) and vision correction functionality without a need for an external eyewear.

In an embodiment, the computer-implemented system includes a power-efficient optical projection module for near-eye displays. The power-efficient optical projection module is configured to direct the laser beams exclusively toward the pupil 102 for reducing unnecessary light dispersion in order to minimize energy consumption. The power-efficient optical projection module is further configured to by dynamically adjust beam emission to optimize computational and power resources, based on real-time pupil tracking and user gaze direction. In an embodiment, the computer-implemented system is configured to integrate a biometric authentication through the pupil tracking by analyzing one or more unique iris patterns and micro-movement behaviors, allowing secure user identification without requiring external credentials. The computer-implemented system further includes a modular magnetic attachment mechanism for connecting removable components including at least one of: one or more external battery packs, additional sensors, one or more smart assistants, and Silicon Light Shield for VR immersion, allowing for customizable configurations.

For instance, another sample configuration of the directed physical pixel may be as follows. The one or more light sources (e.g., red Nanolaser) are configured to generate the one or more light signals (this example is simplified for a single color of light, such as red). The one or more light signals are transmitted to the one or more directed physical pixels using the one or more light transmission techniques comprising the optical fiber transmission or waveguide 202. The light intensity modulator is configured to adjust an intensity of the one or more light signals using the SLMs and mechanisms 204 within the OPA technology. The beam steerer and guidance module (the OPA (Optical Phased Array)) 206 is configured to direct the one or more light signals at one or more angles onto the one or more eyes of the one or more users for projecting a number of virtual pixels of the one or more virtual images onto a pupil 102 of the one or more eyes of the one or more users. The beam steerer and guidance module (the OPA (Optical Phased Array)) 206 is configured to direct the one or more light signals (from two or more directed physical pixels) at one or more angles onto the one or more sub-areas of the pupil for projecting the single virtual pixel on the retina, which causes changing the focal effort in the lens muscles to simulate natural accommodation cues and mitigate the vergence-accommodation conflict in the virtual reality (VR) and augmented reality (AR) environments. The visual representation 200 depicts another sample configuration (as shown in FIG. 2) which represents another approach to constructing the directed physical pixel.

In the Sparse topology (shown in FIG. 5A), there is no one-to-one correspondence between the physical pixels and the virtual pixels, meaning that there may not need to be the physical pixel on the glass 106 of the eyeglass for every virtual pixel. The directed physical pixels are scattered across a layer on the glass 106 of the eyeglass (uniformly or non-uniformly-with a higher concentration in the center of the glass). Each physical pixel is responsible for a floating mosaic region of the virtual image pixels. The floating mosaic regions are arranged edge-to-edge, and ultimately, the entire virtual image is covered by a relatively small number of physical pixels (shown in FIG. 5B).

For instance, suppose the pupil diameter is 2 millimeters and the distance from the glass 106 of the eyeglass to the eye is 14 millimeters. An apex angle of the cone formed by the central physical pixels is approximately 8 degrees. The virtual area 502A-N that the central physical pixel may cover includes thousands or even over ten thousand virtual pixels 404A-N, depending on the angular resolution of the pixel. Under such conditions, with only around 100 directed physical pixels 402A-N on each glass 106 of the eyeglass, an acceptable quality of the virtual image is achieved. However, the higher the number of physical pixels 402A-N, the better the image quality.

When the pupil 102 moves, all the aforementioned calculations for the new position of the open pupil 102 are repeated, and each physical pixel may now be responsible for creating a different virtual region (shown in FIG. 5C) 502A-N. However, the result is such that everything appears as if the eye is moving normally in a scenario, with the entire virtual scene remaining unchanged in its place. An important point to note is that from all angles, the necessary light beams (even from the corners of the eye) enter the pupil 102, giving a user the perception of a full 120-degree field of view for each eye.

The advantage of the sparse topology is that with a small number of the physical pixels 402A-N, a large number of virtual image pixels 404A-N are created. This reduces production costs and provides enough space to accommodate other components, such as circuits, ICs, OPA cameras, LiDARs (Light Detection and Ranging), and eye trackers, on the glass. Additionally, a large portion of the glass surface remains empty, which enhances the transparency of the glasses 106, improving user comfort and increasing social acceptance.

In the Dense topology (shown in FIGS. 6A and 6B), there is a one-to-one correspondence between the physical pixels 402A-N and the virtual pixels 404A-N, with each physical pixel 402 responsible for displaying only one virtual pixel 404. The light beams are concentrated towards the center of the pupil 102 or uniformly distributed across the open area of the pupil 102. (The latter approach, similar to a screen saver, is better for the long-term health of the cornea and lens).

Similar to the sparse topology, in the Dense topology, as the pupil 102 moves, the calculations are repeated, and each physical pixel 402 displays the different virtual pixel 404. However, the user perceives the same virtual environment, just as they perceive the real environment when moving their eyes (as shown in FIG. 6B) 602. The advantage of the Dense topology is the high image quality. However, it may reduce the transparency of the glass 106, and due to the higher number and density of the directed physical pixels 402, the cost is also higher.

Due to physical limitations, the angular resolution of the physical pixel may be restricted. Therefore, a combination of the concentrated (Dense) and Sparse approaches is beneficial (physical pixel blocks 702A-N), providing the advantages of both layout topologies (as shown in FIG. 7).

For instance, consider 100 arrays of 16×16 directed physical pixels distributed sparsely across the eyeglass glass 106. In the system, the lack of angular resolution is compensated by dense pixel resolution. The operation of the Sparse-Dense topology is similar to the Sparse approach, with the key difference being that at each emission angle (phase) of the array of the physical pixels, a corresponding set of virtual pixels is displayed. As the phase changes, the same array of the physical pixels displays another group of the virtual pixels, and overall, each directed-physical-pixel array covers a region of the virtual space with higher precision. In the Sparse-Dense topology, the final virtual image is achieved with very high quality using significantly fewer physical pixels compared to the Dense topology. This approach combines the benefits of both topologies.

The Sparse-Dense topology provides the high image quality similar to the Dense topology, but with fewer physical pixels. Like the Sparse topology, the Sparse-Dense topology reduces the number of physical pixels needed, allowing for more transparent glasses and reducing production costs. By combining pixel resolution with the angular resolution, the Sparse-Dense topology ensures that each physical array may cover the virtual area with the high accuracy, compensating for any limitations in the angular resolution.

In all the topologies, the sensors continuously measure pupil movements and the distance between the glasses 106 and the eye. If the glasses 106 move closer to or further from the pupil 102, causing image blocks to overlap or the edges of image blocks to separate, the processor detects this and compensates accordingly.

Energy is not wasted as the light is only directed towards the retina. The system is of lower cost due to the ability to create 1 to 100,000 virtual pixels with the single directed physical pixel. The glasses maintain a high transparency. Natural and wider two-dimensional and three-dimensional views with an expanded range of eye movement (as opposed to head and neck movement), providing a full-view experience.

To design the directed physical pixels at the micrometer scale, methods employed are at least one of: beam steering, phased array antennas, the OPA, spatial light modulator, visible-light integrated optical phased arrays, the SLM, a photonic integrated circuit (PIC), MicroLED, Nanolaser, Digital Micro Mirror Device (DMD), MEMS, waveguides, Liquid crystal on silicon (LCOS), electro-optics and electro-optic effect, acousto-optic modulators, photonic crystal modulators, electrically-addressed spatial light modulator (EASLM), Digital micromirror device (DMD), Optically-addressed spatial light modulator (OASLM), acousto-optic devices, electro-optic devices, photonic crystals, plasmonic devices, thermo-optic modulators, optical diffractors, diffraction gratings, specialty optical fibers, graded-index fibers, and the like. The preferred method for constructing the directed physical pixels is micro and nanoscale Optical Phased Array (OPA).

The beam steering is the method for changing the direction of a main lobe of a radiation pattern. In radio and radar systems, the beam steering may be accomplished by switching antenna elements or by changing the relative phases of radio frequency (RF) signals driving the elements. As a result, this directs the transmit signal towards an intended receiver. In optical systems, the beam steering may be accomplished by changing a refractive index of the medium through which the laser beam is transmitted or by the use of mirrors, prisms, lenses, and rotating diffraction gratings. Examples of optical beam steering approaches include mechanical mirror-based gimbals, beam-director units, galvanometer mechanisms that rotate the mirrors, Risley prisms, phased-array optics, and microelectromechanical systems using micro-mirrors.

In the phased antenna arrays, a phased array usually means an electronically scanned array, a computer-controlled array of antennas which creates a beam of radio waves that is electronically steered to point in different directions without moving the antennas.

The phased-array optics is the technology of controlling the phase and amplitude of the light waves transmitting, reflecting, or captured (received) by a two-dimensional surface using adjustable surface elements. The OPA is the optical analog of a radio-wave phased array. By dynamically controlling the optical properties of a surface on a microscopic scale, it is possible to steer the direction of the light beams (in an OPA transmitter), or the view direction of the sensors (in an OPA receiver), without any moving parts. Phased-array beam steering is used for optical switching and multiplexing in optoelectronic devices and for aiming laser beams on a macroscopic scale.

Complicated patterns of phase variation are used to produce diffractive optical elements, such as dynamic virtual lenses, for beam focusing or splitting in addition to aiming. Dynamic phase variation also produces real-time holograms. Devices permitting detailed addressable phase control over two dimensions are a type of the SLM.

The LiDAR is an important application of the OPAs. The requirements for developing the OPAs for LiDAR applications are the resolution of 0.1° to 0.2° in horizontal and vertical directions, a horizontal Field of View (FOV) of >90°, power budget of 10-30 W or lower, and a system cost of 100-200 dollars or lower. Phase shifters with current injections enable up to a gigahertz bandwidth, and the tuning time of the widely tunable laser is reduced to a few nanoseconds.

For the integrated phased array for wide-angle beam steering, as per demonstration, on-chip optical phased array is fabricated in a Complementary Metal-Oxide-Semiconductor (CMOS) compatible process with continuous, fast (100 kHz), wide-angle (51°) beam-steering suitable for applications such as low-cost LiDAR systems. The device demonstrates the largest (51°) beam-steering and beam-spacing to date while providing the ability to steer continuously over the entire range. Continuous steering is enabled by a cascaded phase shifting architecture utilizing low power and small footprint, thermo-optic phase shifters. The results are demonstrated in the telecom C-band, but the same design is easily adjusted for any wavelength between 1.2 μm and 3.5 μm.

The SLM controls the intensity, the phase, and polarization of the light in a spatially varying manner. For instance, an overhead projector transparency. Usually when the term SLM is used, it means that the transparency is controlled by the one or more communication devices. The SLMs are primarily marketed for image projection, display devices, and maskless lithography. The SLMs are also used in optical computing and holographic optical tweezers. The SLMs are used as part of a holographic display technology. The spatial light modulators are either reflective or transmissive depending on their design and purpose.

The PIC or integrated optical circuit is a microchip containing two or more photonic components that form a functioning circuit. This technology detects, generates, transports, and processes the light. The PICs utilize photons (or particles of light) as opposed to electrons that are utilized by electronic ICs. The major difference between the two is that a photonic integrated circuit provides functions for information signals imposed on optical wavelengths in the visible spectrum or near-infrared (850 nm to 1650 nm). The MEMS function as the steering component of the directed physical pixels, directing the light at various angles.

It is reiterated that the system is independent of the technologies and methods required for the production, deflection, and guidance of the light, including the OPA, or methods of electrical or physical deflection and guidance of light or laser at the micro and nano scales, such as Nanolaser phased arrays, MEMS galvanometers, or more advanced methods such as waveguides and deflection due to the electro-optic effect. Any past or future method is included within the scope of the system.

Figure 3A:
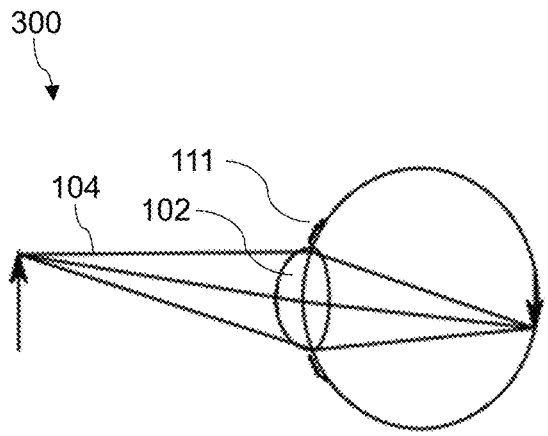
FIGS. 3A-3E illustrate exemplary visual representations depicting light rays entering a pupil, in accordance with an embodiment of the present disclosure.
Figure 3B:
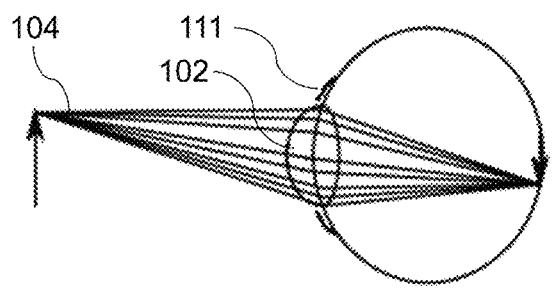
Figure 3C:
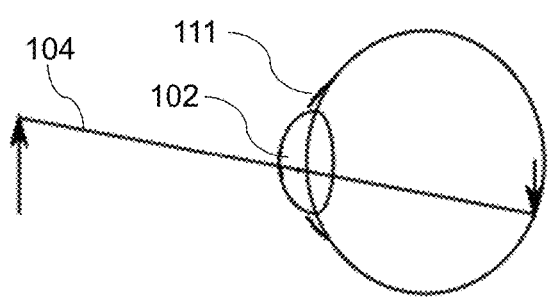
Figure 3D:
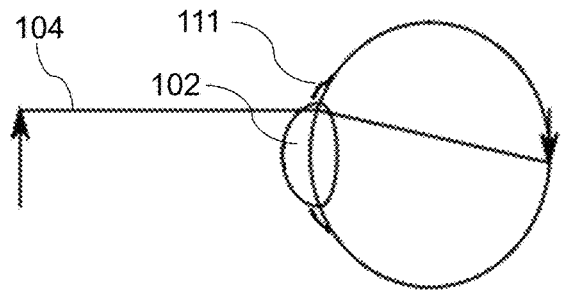
Figure 3E:
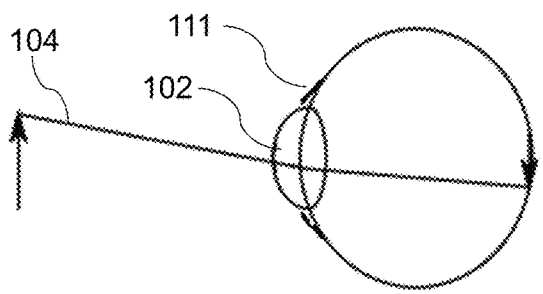

In the eye optical system, the reality is that an immense number of the light rays are emitted from a point of the object into the environment. A large portion of the light rays enter the pupil 102 (as shown in FIGS. 3A-3B) in a conical shape and is then refocused onto the retina by the eye's optical system (including the cornea and the lens). This process occurs for every single point on the surface of the object, and ultimately, the image of all the points on the object is clearly (in a healthy eye) formed on the retina. Now, instead of all the numerous light rays, the single laser beam of the same color and with an intensity equal to the sum of the previous emissions is directed from a point of the object towards the pupil 102 (as shown in FIGS. 3C-3E). The laser beam may form the same point on the retina with the same intensity and quality as before. In a healthy eye, the laser beam, regardless of where it strikes within the open area of the pupil 102, is precisely guided to the same specific point on the retina after passing through the eye's optical system (the lens and the cornea). In the eye with a refractive error, additional calibration and system correction may be necessary. Therefore, all the visible light is replaced with the equivalent laser beam, achieving the same image on the retina as before. This concept may be used in retinal projection systems to directly project a holographic image onto the retina.

The near-eye displays include one or more calibration processes to correct the refractive error comprising at least one of: myopia, hyperopia, and astigmatism, by adjusting one or more projection parameters based on one or more user-specific optical profiles. The refractive error causing vision defects of the one or more users, are dynamically corrected, by: (a) detecting the one or more refractive errors by analyzing laser beam reflections from the pupil and retina; (b) adjusting at least one of: intensity, angle, and phase, of the one or more directed physical pixels to emulate a corrective lens effect; and (c) continuously recalibrating beam parameters as the user's gaze shifts, providing personalized, lens-free vision correction.

The system simulates the natural behavior of the light and limits it to the physical position of the directed physical pixel, the position of the virtual pixel, and the position of a point on the pupil's diameter. This approach eliminates the need for extensive hologram calculations across all light emission angles. The number of calculations is linearly proportional to the number of the image pixels, requiring only one laser beam calculation per virtual pixel.

If a pair of glasses 106 with the directed physical pixels is placed on a layer on the inner surface of the glass 106 in various locations, then three key concepts are considered.

A first key concept, it is not necessary to direct the light beam precisely to the center of the pupil 102 to form the image on the retina. The entire open area of the pupil 102 is utilized. The diameter of the human pupil's open area ranges from 2 millimeters to 8 millimeters, giving the system flexibility in forming the image. The flexibility allows the system to reduce the number of the physical pixels, thereby lowering costs and increasing the transparency of the glass 106. The open area of the pupil is measured in real-time by a Pupil Tracker system (which is more accurate than an Eye Tracker) and fed into the system. Alternatively, this value is set as a fixed, personalized measurement (e.g., 2 millimeters) in the system settings.

A second key concept, multiple directed physical pixels are used to create the single virtual pixel (part of the virtual image). As illustrated in FIG. 4A, three different directed physical pixels 402A-N are utilized to form one virtual pixel 404. It is enough to shine the light along the (physical pixel-virtual pixel) line to the open part of the pupil. To achieve this, the system must have information about the position of the physical pixel on the glasses 106, the position of the virtual pixel 404 on the image, the location and the distance of the pupil from the glasses 106, and the size of the open area of the pupil 102, all of which is determined in real-time by Pupil Tracker cameras (which are more accurate than eye trackers and are mounted on the frame or glass 106). This information allows the system to calculate the angle (phase) of the light beam that the directed physical pixel needs to produce in two dimensions. Therefore, by considering the flexibility in using the entire surface area of the open pupil 102, the system is not dependent on the single physical pixel to produce the virtual pixel 404, and multiple physical directed pixels 402A-N are utilized.

A third key concept, by utilizing the entire surface of the open pupil 102, the single directed physical pixel is used to generate the large number of virtual image pixels 404A-N (shown in FIG. 4B). Using the information, all the points of the virtual image (virtual pixels 404A-N) that the single directed physical pixel 402 creates are calculated and scanned at a rate of at least 25 times per second. This is achieved by varying the intensity and the phase of the light beam produced by the directed physical pixel 402, which rapidly scans each of those many virtual pixels 404A-N. Due to the round shape of the pupil 102, the area that each physical pixel scans form the cone, encompassing a circular plane of the virtual pixels 404A-N. However, for ease of overlapping blocks of the virtual pixels 404A-N, the system employs square or rectangular shapes arranged as virtual mosaics adjacent to each other. Additionally, each directed physical pixel 402 is equipped with its own processor and the memory, which are micro-sized and transparent.

In the system, all light rays are calculated, and their direction and point of origin are controlled by the processors, it becomes possible to correct most vision problems such as myopia (nearsightedness), hyperopia (farsightedness), astigmatism, strabismus, and others.

In cases where all the light rays are focused on the center or another specific point of the pupil 102, the vision problems are automatically corrected (a phenomenon known as the Pinhole Effect). However, a major drawback of this approach is the potential long-term damage to the cornea and the lens due to the concentration of all light rays on a single point. The first method to address this issue is to continuously change the point where the light is directed on the open area of the pupil 102 (Pupil Saver, similar to a screensaver on monitors). In cases where the light rays are spread and directed across the surface of the open pupil 102, the long-term risk of damage is mitigated. However, the users with vision defects may experience image interference, seeing the image less clearly.

In eyes with refractive errors, this misalignment in focusing the light causes the projected laser beams to overlap or spread apart instead of aligning neatly side by side, which may distort the image. The second method to address this issue in this invention involves a manual calibration process during the initial setup of the glasses 106. A few reference images are displayed to the user, who manually adjusts and corrects the images according to their specific visual conditions. Also, refractive errors can be detected by analyzing laser beam reflections from the pupil and retina; These adjustments are then stored as calibration values in the glasses' settings and applied to all subsequent images. This approach allows for exceptionally clear VR and AR images without the need for optical prescription lenses.

As a result, the glasses 106 not only eliminate the need for wearing prescription lenses to view VR and AR images, but the glasses 106 also function as all-purpose prescription glasses (correcting at least one of: farsightedness, nearsightedness, astigmatism, strabismus, and other refractive errors) with the addition of front-facing camera(s). However, it is still possible to customize the installation of directed pixel layers on prescription lenses for those who prefer to use the glasses as traditional prescription glasses when the smart features are turned off. Moreover, for those who use bifocal glasses, the smart glasses are particularly beneficial. With automatic correction based on the user's gaze, the glasses 106 are used to view both distant and near objects seamlessly, utilizing all parts of the glass 106.

Many individuals experience floaters in their eyes, which sometimes interfere with their vision. In retinal projection systems, this phenomenon may be exacerbated due to the laser focusing on the floaters. By placing one or more InfraRed OPA LIDARs or InfraRed MEMS LiDARs on the inner surface of the glass 106 of the eyeglass, the pupil 102 is scanned by emitting infrared laser beams into the open area of the pupil and detecting the reflections from the eye's floaters. The real-time location of the floaters is then determined and sent to the central retinal display system. This information is processed by the processors and is taken into account when projecting the images onto the retina using the directed physical pixels.

The directed physical pixels are flexible enough to use any point within the open area of the pupil 102 to display the image and transmit the laser beam, and the directed physical pixels also overlap with each other. Therefore, the system avoids sending the virtual pixel beam directly onto the eye floater, choosing an alternative path instead. This approach ensures that the user experiences a much clearer and unobstructed image.

The human eye and the brain perceive the surrounding environment in three dimensions and with depth through three mechanisms. A first mechanism is the disparity between the images seen by the right and left eyes, this feature is primarily used in stereoscopy and (three-dimensional) 3D headsets and is also utilized in the system.

A second mechanism is experience, the brain based on prior knowledge of an object's size and dimensions, estimates the distance and depth of that object even when viewed with one eye. A third mechanism is lens focus, the brain estimates the depth of the object, even in monocular vision, based on the effort required by the lens muscles to bring the image into focus.

In VR and AR headsets, the first mechanism and the second mechanism are used to convey the depth to the user, but the third mechanism is been overlooked. Since the brain relies on all three sources of information to perceive depth, inconsistencies between these inputs lead to user fatigue over time and reduce the naturalness of 3D images. This discrepancy is known as Vergence-Accommodation Conflict, and newer technology called Light Field Technology attempts to address this issue in previous headsets. In the system, a method is employed to leverage the third mechanism to enrich the 3D perception, making it feel more natural and adding a sense of depth to the objects.

To address the Vergence-Accommodation Conflict and enhance the natural 3D experience, the system proposes using the third mechanism. By controlling the focal effort required by the lens muscles, the system aligns the depth cues from all three mechanisms, reducing the inconsistency that leads to fatigue and improving the overall 3D experience. This may involve dynamically adjusting the image projection or simulating the effort required for focusing, thereby making the 3D images appear more realistic and less straining to the user over extended periods.

In the layout topologies, the system used only one light beam to form the image pixel on the retina. However, if the system uses two or more directed physical pixels to create the single virtual pixel, as illustrated in FIG. 4A, the eye needs to exert more effort in focusing the lens muscles to see the virtual object, depending on its perceived distance. This increased effort allows the brain to perceive a more realistic sense of the depth. The directed physical pixels involved in overlapping the virtual pixel may be adjacent or non-adjacent and are referred to as complementary pixels.

For instance, in FIG. 8A, a right side shows virtual regions created by physical pixels in the Sparse topology. A left side illustrates an example of overlapping the virtual regions by the physical pixels (gray) and their complementary pixels (black). In this arrangement, both the physical pixel and its complementary pixel project the same virtual pixel onto the retina, but from different and more distant points on the open area of the pupil 102.

The arrangement of the physical pixels and their complementary pixels on the glass 106 of the eyeglass is controlled by the processors and is set to alternate or be spaced further apart from each other. An example of such an arrangement is shown in FIG. 8B. One of the additional benefits of this method is the prevention of lens muscle fatigue or wasting during prolonged use, especially for children. It's important to note that these overlaps are applied after the correction of eye defects using the calibration constants stored in the system.

A lens-free flat directed camera is a camera that uses directed light reception (visible, infrared, or ultraviolet) through directed cells to record images instead of using a traditional lens. Each directed cell scans and receives light from a small area of the entire image, covering one to thousands of directions, at a minimum rate of 25 times per second. Together with other cells distributed across various points on the eyeglass glass, they capture the entire scene in a full-view format. The cells are coordinated by the central processor, with each covering a specific area to form the complete image. The number of the directed cells on the eyeglass glass 106 may range from one to millions.

The direction and angle of light reception may change within a range known as the FOV, which may extend up to >90° in both the X and Y directions. The speed of angle change is on the scale of a few nanoseconds, with the angular resolution better than 0.1°. The narrower the diameter of the received light beam, the better the image resolution, with the optimal diameter being on the scale of a few micrometers. Each directed cell comprises of three independent but closely positioned receivers for red, green, and blue light, all of which change direction in unison and measure the intensity of the received light.

To enhance image quality, more directed cells focus on capturing information from a specific region of the scene based on the user's gaze point. The eyeglass glass 106 may be flat or curved, with appropriate corrections applied to match the curvature of the glass. The topology of the directed cells on the glass 106 may Dense, Sparse, or Sparse-Dense. Additionally, the directed cells may be distributed uniformly or non-uniformly across the glass 106. The directed cells are composed of the transparent circuits and the ICs.

Components of the directed camera cell are light spectrum, determining the direction of the incoming light, the processor and the memory, and layout topology.

The light spectrum may be visible (RGB), infrared, or ultraviolet. The measurement of the direction of the incoming light beams is accomplished using various technologies. Some of the existing technologies suitable for this purpose include at least one of the: OPA cameras (Optical Phased Array Receiver-A collection of nanophotonic antennas arranged in a 1D or 2D array), MEMS, SLMs, Microlens, Microprism, and the like.

The directed camera cells are extremely low in weight and volume. Completely flat, making the directed camera cells ideal for use on the eyeglass glass 106. The directed camera cells are low cost. Due to the ability to use a single directed camera cell to capture (measure and store) from 1 to 100,000 pixels. High transparency of the glasses is enabled by the possibility of using Sparse or Sparse-Dense configurations, which do not obstruct the user's view. Allows for the creation of wide-angle cameras with very large angles, including 360-degree cameras. The directed camera cells are mounted on flat, curved, ring-shaped, or spherical surfaces.

No need for the lenses. Processor-based focusing is achieved without the lenses or moving parts. The high resolution is achieved by capturing a large number of scene pixels with each directed cell. The number of phased array cameras attached to the external side of each glass 106 ranges from one to as many as the physical pixels on the inner side of the glass 106, mounted back-to-back. Versatile camera types include standard cameras, infrared, ultraviolet, X-ray, and the like. Like the OPA Retinal Display (Directed Pixels), the OPA cameras are configured in Sparse, Dense, or Sparse-Dense modes, with the latter compensating for limited angular resolution with the dense resolution.

Given the sufficient spacing between the physical pixels in the Sparse and Sparse-Dense configurations, small conventional cameras or small, transparent phased array cameras, such as the LiDARs are placed on the glass 106 of the eyeglasses.

Technologies required for the directed camera cell comprises One-Dimensional Heterodyne Lens-Free OPA Camera, high sensitivity active flat optics optical phased array receiver with a two-dimensional aperture, the phased-array optics, and the like. The phased-array optics is a technology for controlling the phase and amplitude of the light waves transmitting, reflecting, or captured (received) by a two-dimensional surface using adjustable surface elements. The OPA is the optical analog of a radio-wave phased array. By dynamically controlling the optical properties of the surface on the microscopic scale, it is possible to steer the direction of the light beams (in the OPA transmitter), or the view direction of the sensors (in the OPA receiver), without any moving parts. Phased-array beam steering is used for optical switching and multiplexing in optoelectronic devices and for aiming the laser beams on the macroscopic scale.

In the optical phased-array receiver, the incident light (usually coherent light) on the surface is captured by a collection of nanophotonic antennas that are placed on a 1D or (two-dimensional) 2D array. The light received by each element is phase-shifted and amplitude-weighted on a chip. These signals are then added together in the optic or electronic domain to form a reception beam. By adjusting the phase shifts, the reception beam is steered in different directions, and the light incident from each direction is collected selectively.

In an embodiment, the computer-implemented system further includes optical phased array-based imaging and sensing systems that are integrated into the one or more frames and one or more lens, of the one or more glasses 106. The optical phased array-based imaging and sensing systems may include one or more OPA cameras mounted on at least one of: the one or more lens and the one or more frames of the one or more glasses 106. The one or more OPA cameras are configured to capture one or more images using at least one of: sparse, dense, and sparse-dense distribution topologies, for optimizing transparency, reducing weight, and improving optical clarity.

The optical phased array-based imaging and sensing systems may further include one or more OPA-based Light Detection and Ranging (LiDAR) sensors integrated into at least one of: a glass layer and the one or more frames. The one or more OPA-based LiDAR sensors are configured to perform at least one of: depth sensing, object recognition, and environmental mapping for augmented reality (AR) applications, hand gesture recognition, and enhanced eye tracking. The optical phased array-based imaging and sensing systems may further include one or more OPA-based eye trackers integrated into at least one of: the one or more lens and the one or more frames of the one or more glasses 106. The one or more OPA-based eye trackers are configured to provide at least one of: real-time tracking of pupil movement, gaze direction, and inter-pupillary distance (IPD) computation for adaptive focus correction and interactive AR experiences.

The optical phased array-based imaging and sensing systems may further include a Sparse-Dense OPA architecture comprising a combination of sparsely distributed sensors and densely arranged sensing elements, which provides an optimal balance between cost-efficiency, high resolution, and minimal visual obstruction. The optical phased array-based imaging and sensing systems may further include a control module configured to process one or more signals from the OPA imaging and sensing components, dynamically adjusting beam steering, scanning resolution, and power consumption based on real-time user activity and one or more environmental conditions.

On the glass 106 of the eyeglasses, in addition to the inner surface where a layer 902 of the directed physical pixels is installed, several other layers (as shown in FIG. 9) are added to the outer surface of the glasses 106, including an electrochromic layer 906, a transparent color display layer 908, a Touchpad layer 910, Glass or lens layer 904, and the like The electrochromic layer adjusts the transparency of the eyeglass glass 106 from 100% (completely transparent) to 0% (completely opaque) by applying the voltage. The electrochromic layer 906 is an electrochromic dimming layer that may switch between clear and shared modes. To create the electrochromic layer 906, Electrochromic (EC), Liquid Crystal, and Suspended Particle Devices (SPD) are employed.

Additionally, crossed active polarizing layers are used to achieve maximum opacity and darkness. In scenarios such as sunglasses, lensless prescription glasses, virtual reality (VR), and augmented reality (AR), there are times when it is necessary to block the incoming light from the environment to the glass 106 of the eyeglass either fully or partially, and either across the entire surface or just in specific sections. The electrochromic layer 906 is used in such cases. Overall, the electrochromic layer 906 makes the glasses suitable for daytime use. Another advantage is reduced brightness, which assists in preventing eye strain throughout the day. The electrochromic layer is configured to selectively dim one or more portions of user views behind virtual elements, for optimizing contrast for an AR content while maintaining overall transparency and situational awareness.

The transparent color display layer 908 is installed on the external surface of the eyeglass glass 106. When inactive, the transparent color display layer 908 remains completely transparent, but when activated, the transparent color display layer 908 transforms into an opaque display (especially when activated simultaneously with the electrochromic Layer 906). The technologies that are used to create the transparent color display layer 908 include a transparent Organic Light-Emitting Diode (OLED), a transparent Liquid-crystal display (LCD), and the like.

The transparent color display layer 908 functions as tinted sunglasses. The user's eyes are visible through the glasses even in dark mode. The transparent color display layer 908 may display videos that the user is watching or wants to share with others. When the glasses are placed on the surface and not worn, the transparent color display layer 908 is used similarly to a smartphone associated with the one or more communication devices. Interaction is achieved through gesture detection (using the cameras and the LiDAR) without needing a touch panel. One glass acts as the display while the other functions as a keyboard. An Artificial Intelligence (AI)-powered translator may display the translation of the user's speech on the external surface of the eyeglass glass 106 as subtitles for the other person to read. Another method involves directly transmitting the translated speech to the other person's ear via an Ultrasonic Array. Additionally, with the help of the AI-powdered translator, the other person's speech is subtitled for the user via the Retinal Display in AR format or played back as translated audio while filtering out the original speaker's voice as background noise.

The user's speech is converted into the text and displayed as the subtitles on the external surface of the eyeglass glass 106 for a deaf person. The AI may also convert the sign language of a deaf-mute person into the text, which is then subtitled in the AR format on the Retinal Display or translated into audio. If the user is deaf-mute and wears the glasses, the reverse process occurs, with the translated text of their sign language being displayed on the glass 106 or played as sound through a speaker embedded in the wearable device. Alternatively, the translated speech is transmitted directly to the other person's ear via the Ultrasonic Array. The deaf-mute user may also see subtitles of the other person's speech through their glasses in the AR format.

The Touchpad layer 910 enables the glasses to function similarly to the smartphone when placed on the surface and not worn. In this scenario, one glass acts as the display while the other serves as the keyboard. The Touchpad layer 910 is also installed on one or both of the eyeglass glasses. When the glasses are not being worn, the Touchpad layer 910 allows for some smartphone-like functionality.

A directed pixel layer 902 is installed on the inner surface of the glasses, while the electrochromic layer 906 is placed on the outer surface. between these layers, the glass 106 of the eyeglass or a prescription lens (if needed) is positioned. The transparent color display layer 908, along with the Touchpad layer 910, is also installed on the external surface of the glass 106. Additionally, the electrochromic layer 906 and the transparent color display layer 908 are combined into a single layer. all these layers are designed as either flat or curved surfaces.

The glasses are not limited to these layers. additional layers such as physical protection layers, anti-reflective coatings, or even meta-lens layers may also include, similar to what is found on conventional prescription glasses.

If the directed camera cells or the OPA LiDAR are used on the glass 106 of the eyeglass (instead of conventional cameras and the LiDAR on the frame), the existing layers or new layers may be utilized.

The technologies used for the directed physical pixels and the directed camera cell (both in the infrared spectrum) and the Sparse topologies and the Sparse-Dense topologies are also applied to the construction of LiDAR systems, both in the transmitter and receiver components. This approach provides several advantages. The overall volume and weight of the LiDAR systems may be significantly reduced. Especially in the "Sparse-Dense OPA Lidar" configuration, the precision and resolution of the LiDAR are enhanced. The LiDAR systems may be installed on flat, curved, or spherical surfaces. LiDAR units, both front and rear are mounted directly on the eyeglass glass 106 in the Sparse and Sparse-Dense display modes, significantly reducing the weight and bulk of the glasses.

Figure 10A:
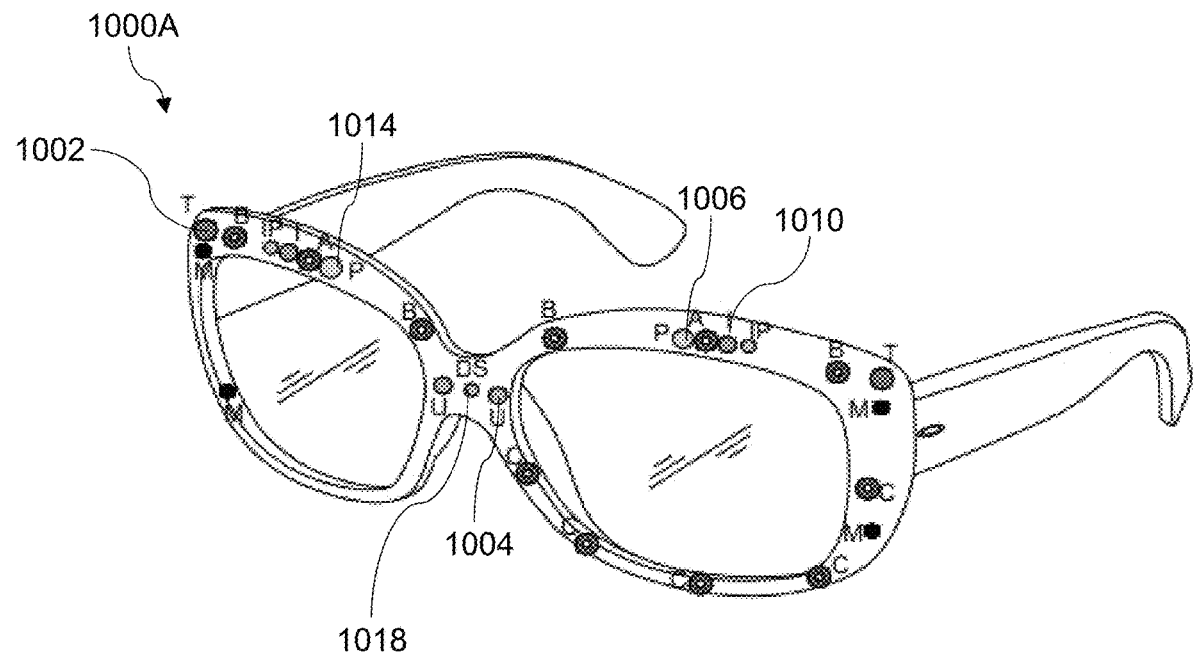
FIGS. 10A-10B illustrate exemplary views of a frame of the glasses components, in accordance with an embodiment of the present disclosure.
Figure 10B:
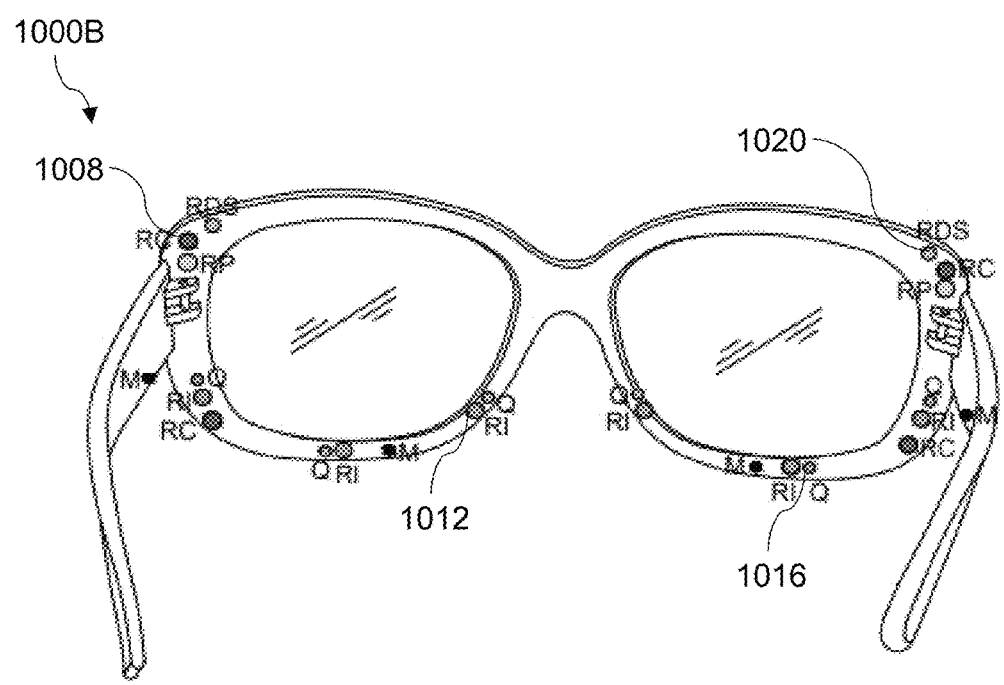
Figure 11A:
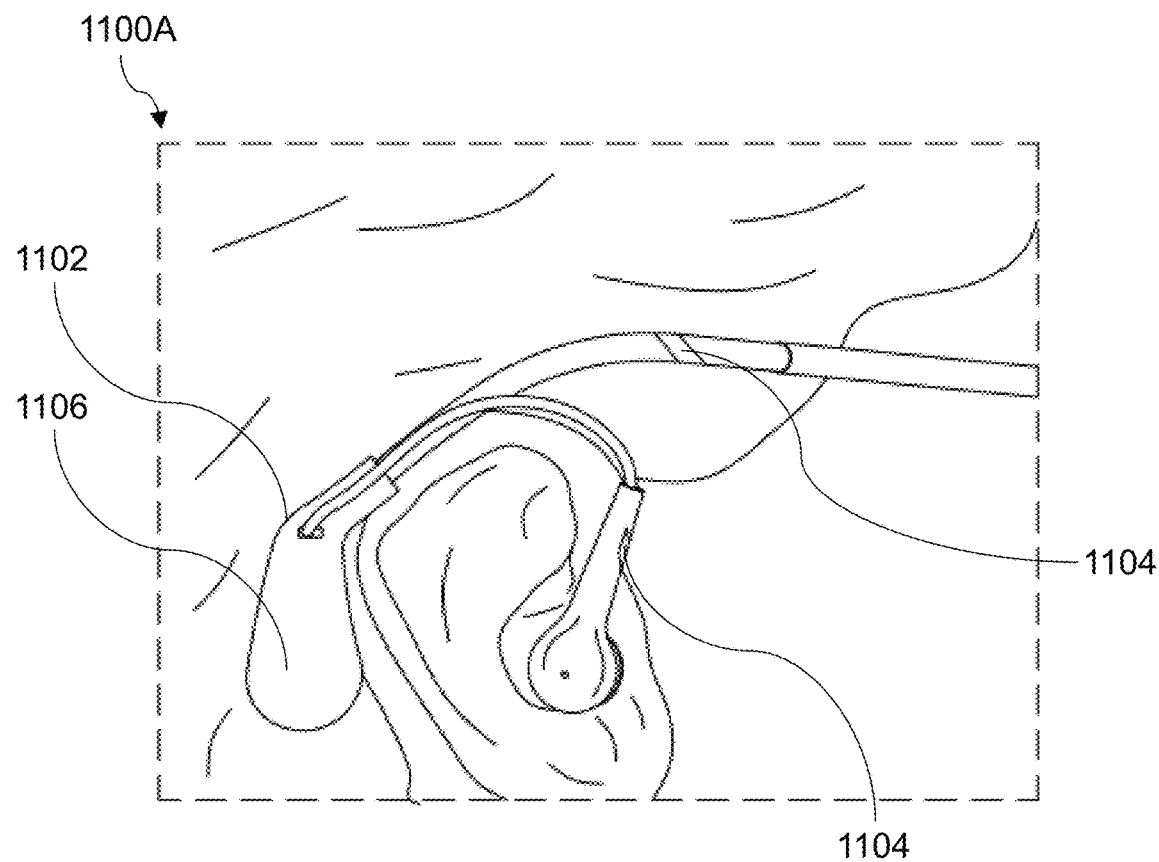
FIGS. 11A-11B illustrate exemplary views of headphones, in accordance with an embodiment of the present disclosure.
Figure 11B:
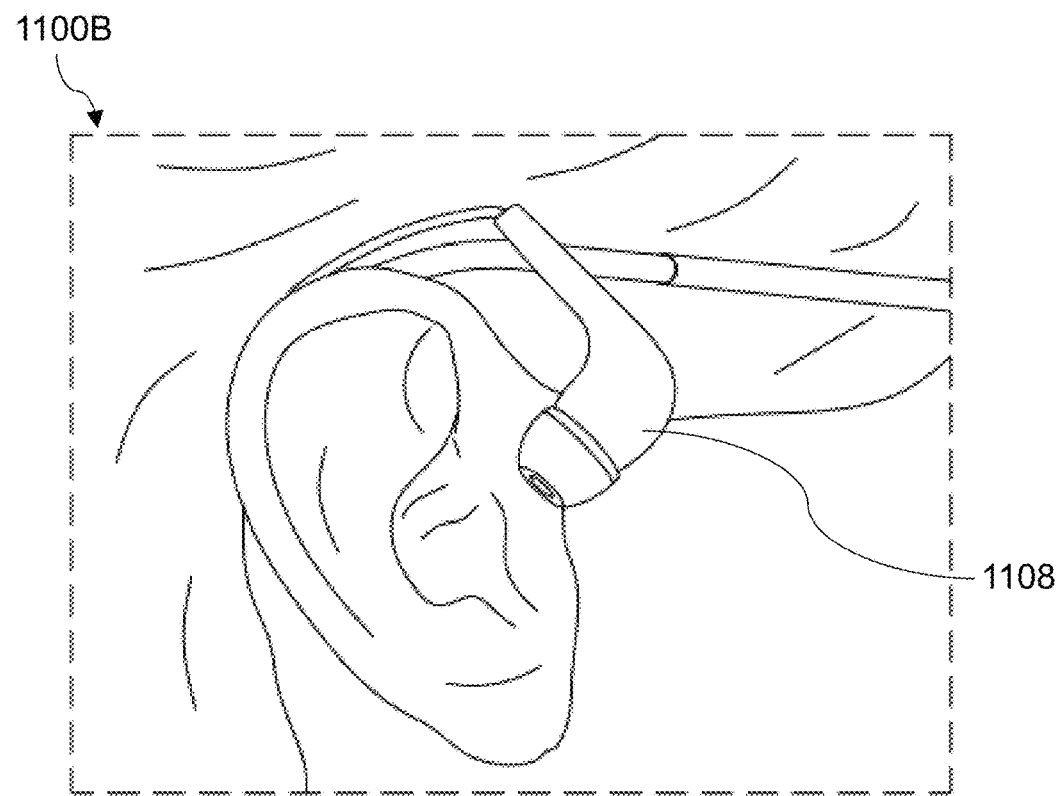
Figure 12:
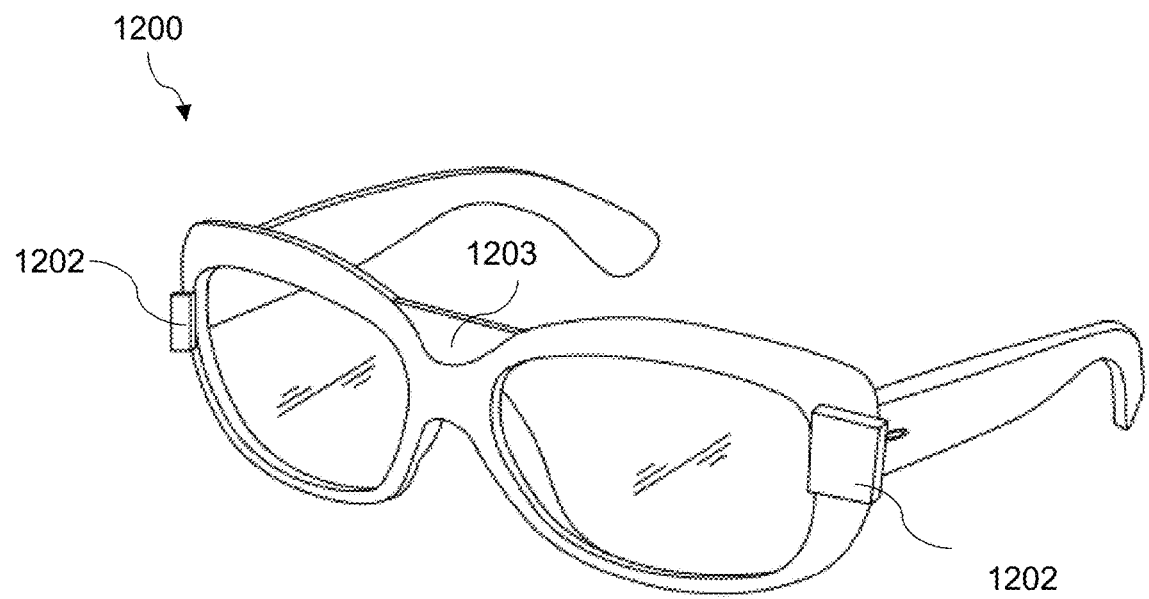
FIG. 12 illustrates an exemplary image of two miniature directional ultrasonic speaker arrays, in accordance with an embodiment of the present disclosure.
Figure 13:
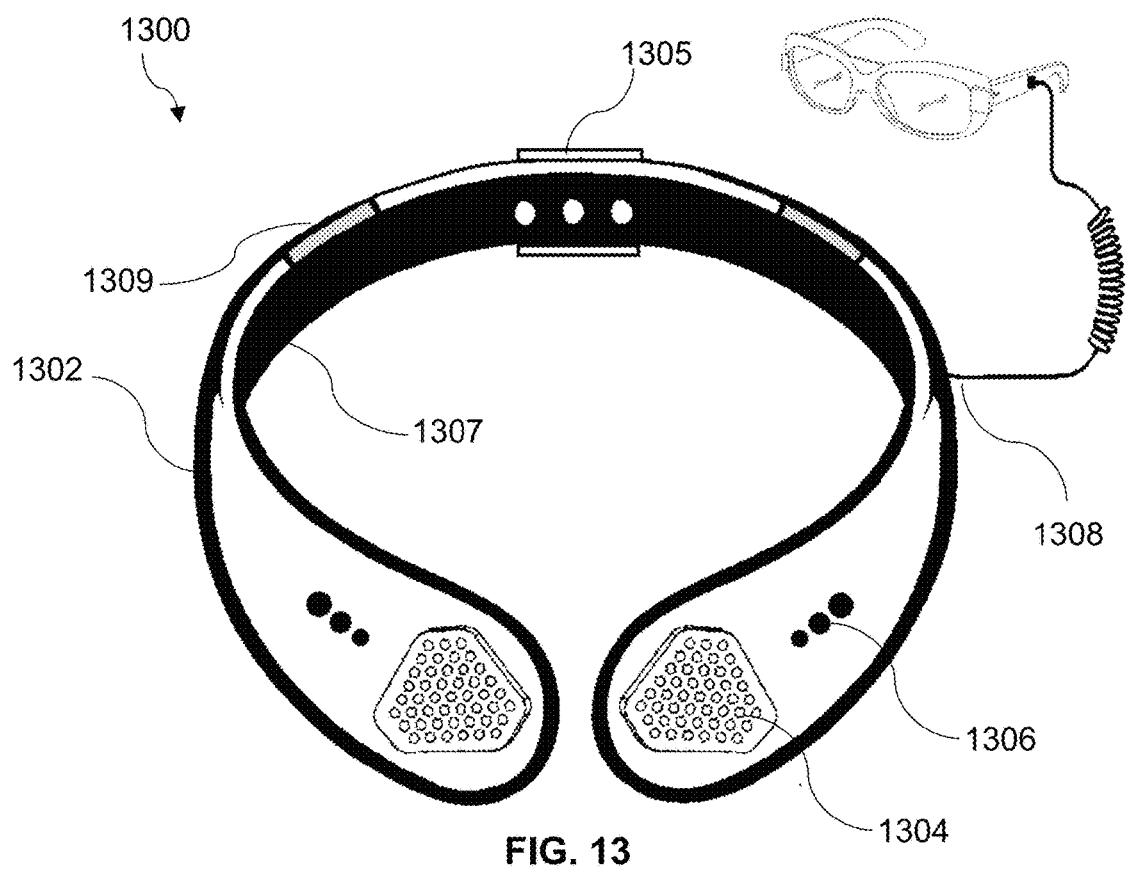
FIG. 13 illustrates an exemplary image of a collar-style smart necklace, in accordance with an embodiment of the present disclosure.
Figure 14:
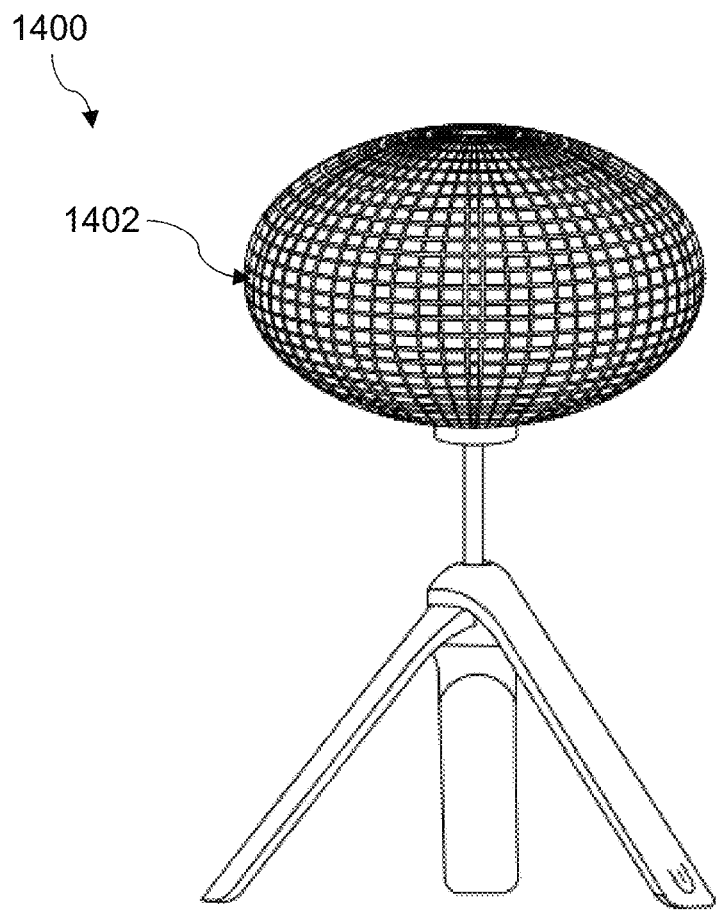
FIG. 14 illustrates an exemplary image of a directed camera ball sample with the Sparse-Dense topology, in accordance with an embodiment of the present disclosure.
Figure 15:
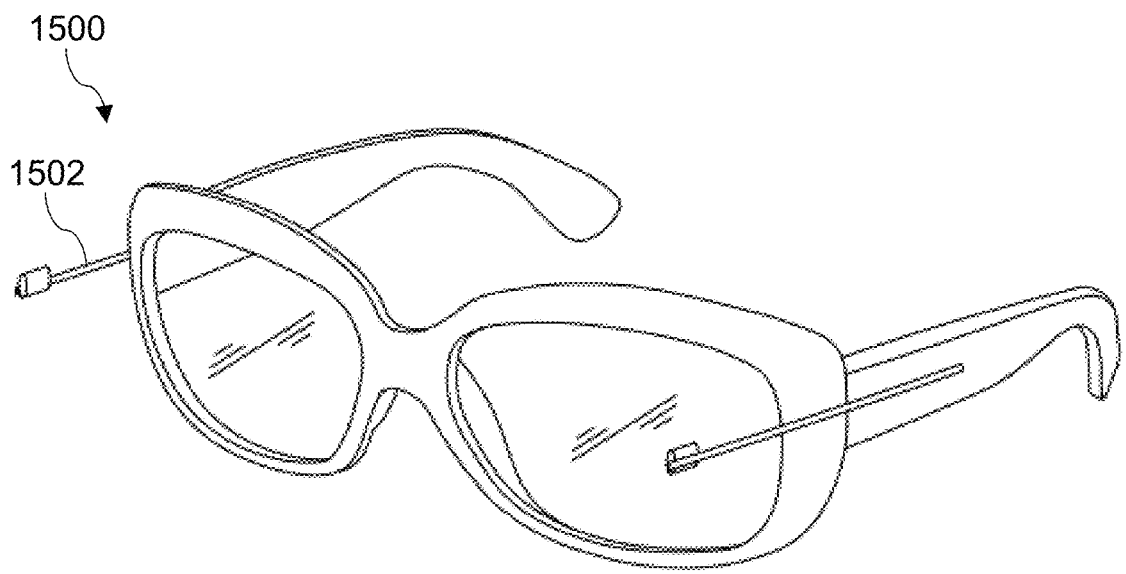
FIG. 15 illustrates an exemplary image of smart glasses, in accordance with an embodiment of the present disclosure.
Figure 16:
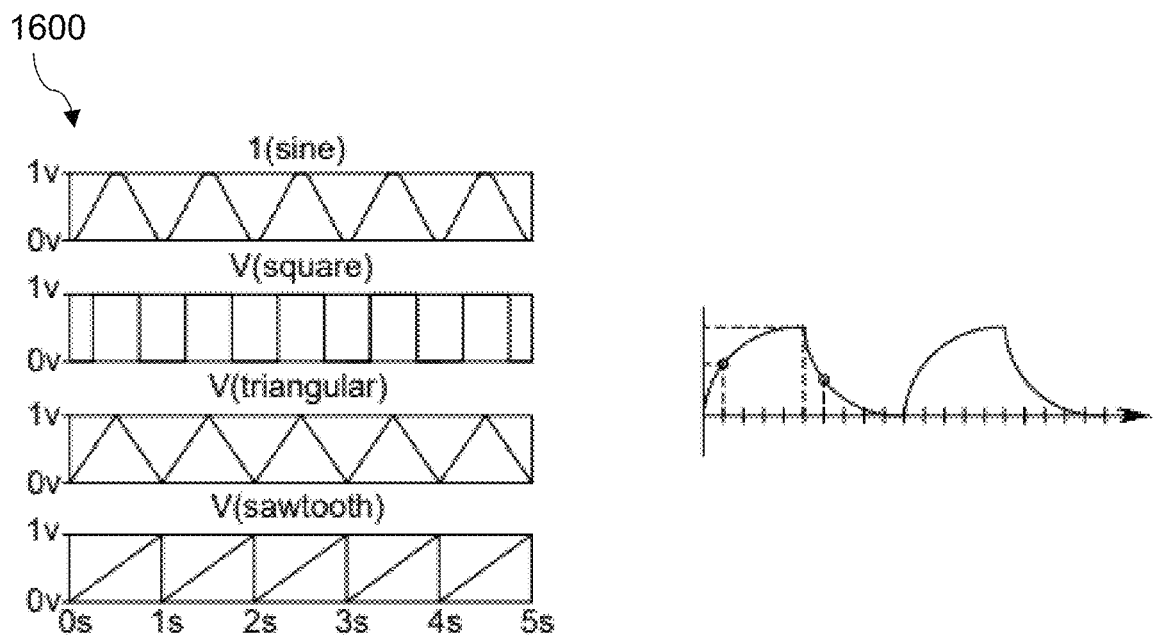
FIG. 16 illustrates an exemplary visual representation depicting different vibration waveforms, in accordance with an embodiment of the present disclosure.
Figure 17:
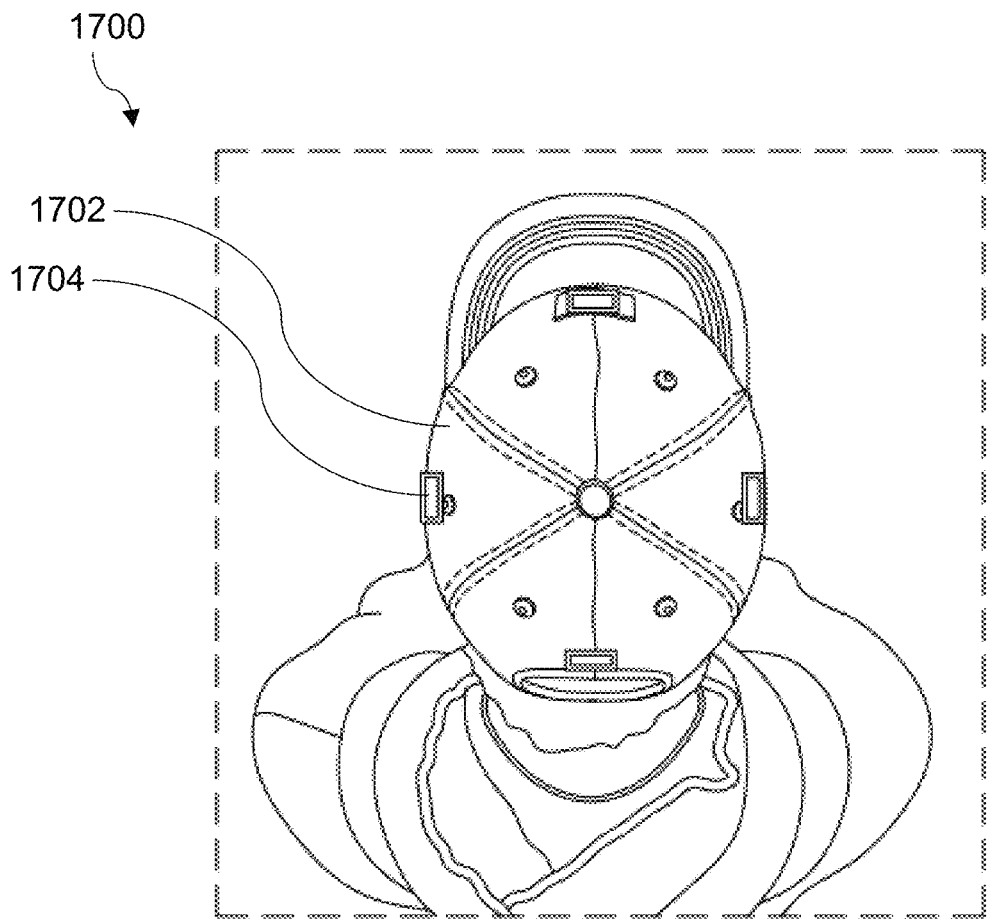
FIG. 17 illustrates an exemplary visual representation depicting linear actuators installed on a helmet, in accordance with an embodiment of the present disclosure.

FIGS. 10A-10B illustrate exemplary views (1000A and 1000B) of a frame of the glasses components, in accordance with an embodiment of the present disclosure;

FIGS. 11A-11B illustrate exemplary views (1100A and 1100B) of headphones, in accordance with an embodiment of the present disclosure;

FIG. 12 illustrates an exemplary image 1200 of two miniature directional ultrasonic speaker arrays, in accordance with an embodiment of the present disclosure;

FIG. 13 illustrates an exemplary image 1300 of a collar-style smart necklace, in accordance with an embodiment of the present disclosure;

FIG. 14 illustrates an exemplary image 1400 of a directed camera ball sample with the Sparse-Dense topology, in accordance with an embodiment of the present disclosure;

FIG. 15 illustrates an exemplary image 1500 of smart glasses, in accordance with an embodiment of the present disclosure;

FIG. 16 illustrates an exemplary visual representation 1600 depicting different vibration waveforms, in accordance with an embodiment of the present disclosure; and FIG. 17 illustrates an exemplary visual representation 1700 depicting linear actuators installed on a helmet, in accordance with an embodiment of the present disclosure.

The components integrated into the frame of the glasses comprise, but not restricted to at least one of: one or more visible light cameras, one or more infrared (IR) cameras, one or more light projectors, one or more depth sensing sensors, microphones, other components and sensors, communications and networking, one or more magnetic parts, one or more headphones and speakers, one or more touchpads, various overall shapes of glasses, and the like.

In an embodiment, the one or more glasses 106 are configured to mitigate a motion sickness in virtual reality environments by at least one of: (a) adding vestibular stimulation mechanisms within the smart wearables to simulate realistic motion cues; (b) dynamically adjusting a field of view of the one or more users and reducing rotational visual artifacts during navigation; and (c) adding environmental references comprising a virtual static frame, to stabilize perception of the one or more users.

The one or more Forward cameras are one or more telephoto cameras 1002 on the sides (T), one or more ultra-wide cameras 1004 in the center of the forehead (U), and one or more main high-resolution cameras 1006 for natural vision. The one or more telephoto cameras 1002 on the sides (T) have adjustable long-focus lenses and turn the glasses into binoculars with a user gesture, such as widening the eyes.

The one or more ultra-wide cameras 1004 in the center of the forehead (U) have adjustable close-focus lenses and turn the glasses into a binocular microscope for the objects very close to the lenses with the user gesture, such as winking followed by half-closed eyes.

The one or more main high-resolution cameras 1006 for natural vision, one (A) or three (A, B) cameras are placed along the upper edge of each glass frame, or eight (A, B, C) cameras may be distributed around the frame of each glass 106. The one or more main high-resolution cameras 1006 may be aligned parallel to each other and perpendicular to the glass surface, or they may be angled nearly perpendicular to the eyeball, providing different perspectives. The lenses are adjustable according to the user's gaze, and the images from these cameras are combined via the system based on the position of the pupil 102.

To the face cameras are one or more face based visible light cameras 1008. The one or more face based visible light cameras 1008 are facing the user. The one or more face based visible light cameras 1008 are used for creating a photorealistic avatar (Codec Avatar) or displaying the user's face during video calls. The one or more face based visible light cameras 1008 are wide-angle cameras installed on the inner part of the frame (RC). In areas where the cameras may not fully capture the face, the AI is used to complete the image. (In the "Selfie Mini Stick" section, the two top cameras (RC) may slide or hinge forward 1502 to provide better selfies.) (as shown in FIG. 15)

One or more forward based IR cameras 1010 (i.e., an infrared camera) include one infrared camera for each eye positioned above the frame (I). The infrared camera 1010 enhances visibility in low-light conditions. The infrared (IR) camera 1010 improves user interaction with VR and AR environments: facilitating more natural interactions. The infrared camera 1010 assists in accurate depth perception. The infrared camera 1010 enhances the accuracy of gesture detection depth sensors.

To the face, one or more face based IR cameras 1012 include one to three infrared cameras for each eye. The one or more face based IR cameras 1012 are positioned below the frame and on the sides (RI). The one or more face based IR cameras 1012 provide an accurate and real-time measurement of the location and diameter of the pupil's open area (Pupil Tracker) and the degree of eye openness. The one or more face based IR cameras 1012 capture fine details of facial expressions (for this, the system may need more cameras on top, to-the-face).

The one or more face based IR cameras 1012 perform Inter-Pupillary Distance (IPD) calculation by automatically adjusting devices to the user's specific IPD to prevent eye strain. Using eye features as a unique biometric identifier for biometric identification. The one or more face based IR cameras 1012 track and analyze where the user is looking. The one or more face based IR cameras 1012 reduce the eye strain by optimizing what the user is viewing.

One or more standard light projectors (P) 1014 and one or more infrared light projectors (IP) are positioned at the center of the forehead of the glasses. Applications of these projectors include photography and night vision.

The one or more infrared light projectors 1016 facing the face and eyes (Q) is positioned near or around each infrared camera. Used for face and iris detection at night and to capture facial expressions for the avatar, as well as part of the Pupil Tracker process. A visible light projector 1016 facing the face (RP) is used for face and iris detection at the night and to capture facial expressions for the avatar.

One or more forward depth sensing sensors (DS) 1018 include Infrared Lidar (OPA Lidar), MEMS Lidar, VCSEL Array, Time of Flight (TOF) sensor. The one or more forward depth sensing sensors 1018 are used for: (a) depth detection: applications include detecting the position of the other person's ears for directing sound, detecting the surface of a table to turn it into the virtual keyboard, identifying the position of furniture for virtually placing the other person in 3D remote communication, obstacle detection while the user is moving, and more, (b) assisting in navigation and AI-Assisted Global and Local Positioning System (AIPS), (c) gesture detection: recognizing hand movements and other gestures, (d) 3D scanning of surroundings: for better integration of the real and virtual worlds by the AI, enhancing AR capabilities, (e) tracking the position of hands, fingers, or feet: for various interactive applications, (f) photography focus: depth detection for creating bokeh effects in portrait photography, and (g) 3D mapping and distance measurement: creating accurate three-dimensional maps and measuring distances.

To the face depth sensors (RDS) 1020 include Infrared Lidar (OPA Lidar), MEMS Lidar, VCSEL Array, and the TOF Sensor. The one or more face depth sensing sensors 1020 are used for: (a) facial recognition: identifying the user's face, (b) precise distance estimation: measuring the exact distance between the eyes and facial features relative to the glasses, and the position of the pupil in relation to the glasses, (c) collaboration with other technologies: working alongside other existing technologies (such as conventional or OPA infrared cameras) for the pupil-tracking and eye-tracking, (d) gesture and facial mimicry detection: capturing the movements of the eyelids, eyebrows, and lips to run commands and simulate smiles and other facial expressions for avatars (both resembling the user and non-resembling avatars), and (e) reading body language, facial expressions, and emotions: to transfer these cues to virtual avatars for a more life such as representation.

Multiple microphones are employed for high-quality audio recording and noise reduction during conversations. One or more forward facing microphones are 1 to 4 forward-facing microphones (M) (or a microphone array). The one or more forward facing microphones are configured to filter at least one of: background noise during online translation and noisy environments, and capture optimized audio during video recording.

One or more user microphones may include 1 to 4 inward and downward-facing microphones (M) (two on the lower part of the glass frame and two on the arms of the glasses).

The one or more user microphones configured to determine a speech of the one or more users to be optimized and filter the background noise, and utilize the AI to differentiate a voice of the one or more users from environmental sounds.

In an embodiment, health and beauty sensors may include pulse, temperature, blood pressure, oxygen level, skin moisture, blood sugar level, and other sensors for health, beauty, and medical care. Combining the information received from the health and beauty sensors with the brain waves received from a smart hat with the help of the AI is effective in predicting the possible diseases of the user and preventive measures or even timely assistance (for example, automatic emergency calls). In an embodiment, positioning systems including at least one of: Global Positioning System (GPS), Local Positioning System (LPS), and AI-Assisted Positioning System (AIPS), are employed.

The CPU associated with the processor, the memory, a motherboard, and the battery are heavier components 1106 that are positioned to leverage the weight toward the back and near the ears, to create balance and minimize the weight burden on the nose, making the glasses more comfortable for extended wear. The battery is replaceable and is configured with thermal insulation on the side in contact with the body.

An accelerometer detects movement and shocks. A gyroscope (head tracking system) detects rotation and orientation. A magnetometer detects magnetic fields and is used in compasses. A barometer measures air pressure and altitude. An ambient light sensor adjusts display brightness based on ambient light and controls the tinting and shading of the glasses. A proximity sensor is configured to activate and change functionality when the glasses are worn. An Electroencephalogram (EEG) Integration is a part of an EEG system that may be integrated into the glasses' arms. The computer-implemented system may include one or more electroencephalogram (EEG) sensors configured to generate one or more brainwave signals for adjusting one or more displayed contents, which causes at least one of: handsfree control, thought-driven interactions, and personalized adjustments, based on one or more intentions. The one or more electroencephalogram (EEG) sensors are further configured to detect one or more emotional states through the one or more brainwave signals and automatically adjust at least one of: one or more AR and VR parameters, brightness, and contrast, to mitigate stress, optimize comfort, and provide one or more supportive recommendations based on health status of the one or more users and early diagnosis of neurological disorders like Parkinson's.

Some directed physical pixels are placed on the frame as well. Digital Scent Technology includes the sensors for detecting harmful gases, air quality, food spoilage, and even transmitting scents in social networks. Scent delivery systems are positioned near the nose for applications such as cooking programs, tourism, and receiving scented messages in social networks, and more. Secure element is employed for ensuring security in the storage of cryptographic keys, authentication, mobile payments, Web 3.0, hardware wallets for cryptocurrencies, and LiDAR Deepfake Protection. Other components and the sensors are also employed for wireless and fast charging.

The communications and networking comprises at least one of: (a) a Subscriber Identity Module (SIM) Card or eSIM for GSM (Global System for Mobile Communications) and mobile connectivity, (b) 5G support for higher internet speeds, (c) Wi-Fi and Bluetooth for fast and stable connections, (d) NFC (Near Field Communication) for wireless payments and other applications, (e) Infrared communication device that enables the communication between nearby smart glasses, allowing a virtual display of information above the heads of people wearing the smart glasses, and (f) Ultra-Wideband (UWB) for fast and stable connections between different devices and gadgets.

The magnetic parts may comprise: (a) a magnetic small mouse pad that is attachable to the glasses, (b) a magnetic selfie camera, (c) a magnetic smart pen, (d) magnetic headphones that are easily attachable and detachable, and (e) a magnetic extra battery for extended use and easy swapping.

The headphones and the speakers are integrated into the glasses in four different ways. One or more fixed internal speakers on the arms of the glasses where directional speaker arrays with sound field technology cancel out sound waves at a distance, protecting user privacy. Additionally, if ultrasonic arrays are used, the glasses may function as hearing aids. The users may still opt to use Bluetooth headphones if desired.

Further, one or more wireless detachable speakers with magnetic connection (i.e., magnetic 1104 or socket connection on the glasses' arms are the detachable speakers that may be converted into earbuds or wireless headphones). To reduce the weight of the glasses, the speakers 1108 may be removed when not needed or placed inside the ears for privacy. The sound volume is louder when the speakers are attached to the frame compared to when used as the headphones (as shown in FIGS. 11A and 11B, but without wires). The detachable headsets also serve as extra batteries.

Further, one or more wired headphones with a short cable and micro socket 1102 (i.e., magnetic or socket connection on the glasses' arms are headphones that may be attached with the short cable and micro socket). To reduce the weight of the glasses, the speakers may be removed when not needed or placed inside the ears for the privacy. The sound volume is louder when the speakers are attached to the frame compared to when used as the headphones. During physical activities, unlike earbuds or wireless headphones, the wired headphones may not fall off. The wired headphones may also serve as extra batteries (as shown in FIGS. 11A and 11B).

The wired or wireless headphones are configured with: (a) a physical slot (i.e., a small physical slot on the glasses' arms provides stability, connection sensors, and a power and data communication socket), (b) a sound output (i.e., when attached to the glasses, the sound is louder, while in-ear usage provides a quieter experience), (c) a wireless mode where the headphones have a built-in battery that, when magnetically connected to the glasses, works in parallel with the glasses' battery, enhancing overall battery life, and (d) head-related transfer function (HRTF) technology that is used for a more immersive audio experience.

The advantages of the wired or wireless headphones are: (a) reduced glasses weight by detaching the headphones when not in use, (b) user privacy protection ensures that only the user may hear the sound when needed, (c) ease of convenient access to the wireless headphones, and (d) preventing loss during sports activities: a wired connection prevents the headphones from falling off during the physical activities.

Further, one or more forward-facing speakers are a standard speaker 1203 that is placed in the center of the forehead area, with two miniature directional ultrasonic speaker arrays (shown in FIG. 12) 1202 on the sides, facing forward (or vice versa). The applications of the forward-facing speakers are: (a) directional sound transmission (i.e., the ultrasonic speakers may send directed sound to the ears of the person in front of the user, enabling translation of the user's speech or communication in noisy environments), and (b) virtual touch sensation where the ultrasonic speakers create a virtual tactile sensation, such as the feeling of pressing virtual keyboard buttons on the fingertips (VR haptics with the ultrasonic speakers). The HRTF may be employed in all four audio systems.

In most headphones, 3D headsets, and the smart glasses, stereo sound is available. However, conventional stereo sound may not allow for precise localization of the sound source, just as two microphones alone cannot accurately determine the exact location of a sound source in space. Naturally, the shape and ridges of the human outer ear (pinna) create phase differences, delays, and other modifications to sound frequencies as they enter the ear canal, assisting the brain to pinpoint the exact location of the sounds. To create a more realistic experience in VR and AR environments, the system employs the HRTF technology when using the headphones (and other audio systems, whether integrated into the glasses' frame or in other wearable devices).

Similar to visual calibration, the system may require audio calibration to store personalized ear profile parameters. This enables the users to accurately determine the precise location of the sounds, enhancing their 3D audio experience in VR, AR, the Metaverse, and Mixed Reality (MR) environments.

The smart glasses may be designed in a variety of overall shapes to suit different styles, preferences, and functional requirements. Some possible shapes may comprise at least one of a: classic frame, sporty frame, slim and minimalist frame, futuristic frame, full coverage frame, rimless or semi-rimless frame, foldable frame, modular frame, oversized frame, and hybrid frame. The shapes may be adapted to include the various technologies and features, ensuring that the users have a wide range of options to meet their individual needs and preferences. The smart glasses may be cycling glasses, fit over glasses, and normal.

The images from the cameras are stitched together using the system to expand the field of view. If there are areas with lower image quality, such as seams or borderlines, the system ensures that these areas are positioned outside the central focus area on the retina. The system may use the image from the closest camera to the gaze point to ensure a seamless experience. When wide-angle cameras are used, lens correction model is employed during the stitching process to correct distortions.

All components mounted on the frame, such as the cameras, the sensors, the pupil trackers, and the LiDARs are also integrated directly onto the eyeglass glass using technologies such as the OPA, the OPA cameras, and the transparent circuits. This includes all the visible light and infrared cameras and the sensors. Given the sufficient spacing between physical pixels in the Sparse and Sparse-Dense configurations, small conventional cameras or small, transparent phased array cameras (visible light or infrared or ultraviolet) and the LiDARs are mounted directly onto the glass of the eyeglass.

In all types of topologies, all outward-facing cameras using the OPA technology are installed on the glass with the transparent circuits. The glasses are designed to be a fully independent mobile device, incorporating all the features and capabilities of existing smartphones. The glasses are made from various materials, including a carbon fiber, ensuring durability and lightweight construction. The glasses also include all the features of traditional virtual reality headsets, such as the accelerometers, the gyroscopes, head-tracking, and stereoscopic displays, and the like.

Based on scanning mechanism, laser projections of the LiDARs are manipulated using various methods and mechanisms to produce a scanning effect. The standard spindle-type, which spins to give a 360-degree view; solid-state lidar, which is configured with a fixed field of view, but no moving parts, and can use either MEMS or optical phased arrays to steer the beams; and flash lidar, which spreads a flash of light over a large field of view before the signal bounces back to a detector. The system may use an optical phased array to make the LiDAR such as a LIDAR antenna The eye tracking in the VR usually involves the cameras and the lights arranged in a ring between the user and the display. Machine learning models analyze the camera feed to provide real-time data on pupil size, gaze direction, and eye openness. This data is used to assess a person's response to stimuli, reactions to scenes, and intentions. Henceforth, the VR is more responsive and comfortable. The VR headsets with the eye-tracking, built track real-time non-verbal cues such as emotional expressions and pupil focus. Enabling the interface to interact and respond in a way that makes the experience more comfortable. What the user is looking at inside the headset is automatically adjusted to reduce the strain on the eyes and provide intuitive interaction and an attentive user interface for improved control and feedback.

The HRTF is a response that characterizes how an ear receives a sound from a point in the space. As the sound strikes the user, the size and the shape of the head, ears, ear canal, density of the head, and size and shape of nasal and oral cavities, all transform the sound and affect how it is perceived, boosting some frequencies and attenuating others.

A pair of HRTFs for two ears are used to synthesize a binaural sound that seems to come from a particular point in the space. It is a transfer function, describing how the sound from a specific point may arrive at the ear (generally at the outer end of the auditory canal). Some consumer home entertainment products designed to reproduce surround the sound from stereo (two-speaker) headphones use the HRTFs. Some forms of HRTF processing have also been included in the system to simulate surround sound playback from loudspeakers.

The users have just two ears, but locate sounds in three dimensions in range (distance), in direction above and below (elevation), in front and to the rear, as well as to either side (azimuth). This is possible because the brain, inner ear, and the external ears (pinna) work together to make inferences about location. The system may also employ 3-D Sound for virtual reality and multimedia The glasses function as lensless prescription glasses, VR, and AR devices, or in the simplest case, as sunglasses.

When used as the lensless prescription glasses (without a prescription lens in the glass layers), the electrochromic layer switches to the shaded mode, becoming 100% opaque and blocking ambient light from entering the eyes. Then, the front cameras capture the environment, and the image is processed by an image-combining model and the AI, which is applied based on vision correction parameters, the position of the pupils, and the gaze point. The corrected image is then displayed to the user via the Retinal Display.

In the VR mode, the electrochromic layer also switches to the shaded mode, blocking the ambient light. The corresponding image for each eye is adjusted based on the user's head and pupil position, is displayed through the Retinal Display.

The AR model is integrated into the real-world view in two ways:

In first way, the electrochromic layer remains clear, and only the virtual elements are added to the real-world image via the Retinal Display. The user may see both the virtual overlay and the real environment simultaneously through the transparent glass. For better visibility of the added virtual elements in daylight, only the approximate background of the virtual content is shaded while the rest of the electrochromic layer remains transparent. In the AR mode, the user's eyes remain visible to others. Additionally, if needed, a customized prescription lens may be added to the glass layers.

In an embodiment, the computer-implemented system is configured to operate in the AR mode using at least one of: (a) a transparent layer mode wherein one or more virtual elements are overlaid onto a natural environment while maintaining direct visibility of ambient light, and (b) an opaque layer mode, wherein real-world imagery captured by front-facing cameras, is combined with the one or more virtual elements to generate a mixed-reality experience.

In second way, similar to the lensless prescription glasses mode, the electrochromic layer switches to the shaded mode, blocking the ambient light. The front cameras capture the environment, and the image is processed by the AI and the image-combining model, which then merges the virtual AR elements with the real-world image. The final combined image is displayed to the user via the retinal display. In the AR mode, depth-sensing sensors and the LiDAR play a crucial role in accurately positioning virtual objects within the 3D real environment. All the components and the sensors of the glasses, along with the system, work together to ensure that the virtual images are seamlessly integrated into the real world.

Using a light sensor, the tint level of the glasses is adjusted automatically based on ambient light conditions or manually through system settings, allowing the glasses to function as the sunglasses. The light sensor is placed on the frame or the glass itself, and the cameras also serve as the light sensors. Additionally, the glasses may be used as the sunglasses with the help of the Transparent color display layer.

One of the challenges with the smart glasses is the heavy weight of the battery and various electronic components. Additionally, the large size and volume of some parts make it impractical to place them directly on the glasses. Henceforth, wearable accessories such as hats, necklaces, headbands, headsets, backpacks, waist bags, and others are utilized to address this issue. A significant portion of the smart glasses' functionality is transferred to the wearable accessories, thereby making the glasses' frame lighter and more comfortable to wear.

The smart hat plays a crucial role in reducing the weight and bulk of the smart glasses by offloading some of the heavier and bulkier components, such as the batteries, the memory, and the processors. The smart hat may come in various forms, such as at least one of a: cap hat, bucket hat, sun hat, edge hat, winter hat, and the like.

The smart hat provides the following features: (a) component integration: the smart hat may house all the components, the sensors, and equipment that the smart glasses' frame has, as well as any necessary mobile phone functions, (b) holographic projector: a projector that displays 3D holographic images in open space, which may be used for video calls or displaying images and videos, (c) video projector is positioned on the forehead of the smart hat to share what the user sees through the glasses by projecting it onto a surface such as the palm of the hand, a wall, or any other flat surface, (d) an additional battery: provides extra power for the glasses, (e) the wired and wireless connections: the smart hat connects to the glasses via a data and power cable, which is either socket-based or magnetic (both charging and data transfer may also be wireless), (f) a magnetic tracker for lost items: the small magnetic tracker that assists the user in locating lost items using the glasses, (g) a multi-spectral camera: a camera capable of capturing images in various spectra, such as visible light, infrared, and ultraviolet. This feature is useful for scientific and industrial applications, (h) professional cameras: the smart hat may house a professional telephoto camera, ultra-wide camera, and high-resolution main cameras, (i) a flashlight: the smart hat may include visible, infrared, or ultraviolet light projectors. adding an infrared projector may turn the glasses into night vision devices, (j) dry EEG sensors: integrated on the inner surface of the smart hat, the EEG sensors read brainwaves and transmit data wirelessly or via a wired connection to the smart hat's and glasses' processors. Using EEG signals and the machine learning models, the user may execute commands simply by thinking, possibly combined with other inputs and gestures. For instance, the user may type on the glasses' display using only eye movements and thoughts, then send a private voice message to a colleague in a meeting by blinking and thinking of sending the message (using the hat's directional speaker).

Other applications may include enhancing focus, managing stress, gaming, training, and research, or unlocking the glasses by thinking of the passcode.

The smart hat further includes a thermal insulation that is the inner surface of the smart hat made from heat-insulating and fire-resistant materials, as some components may generate heat such as the batteries, may pose a risk of failure or combustion. These components are kept as far away from the scalp as possible. The smart hat further includes depth sensors and cameras placed around the edges of the smart hat and facing downward (towards the face and body). The depth sensors may detect full-body and facial movements, including hands, feet, and more. This information is crucial for metaverse, mixed reality, and full-body avatar simulation applications.

The smart hat further includes a back camera, and possibly a 360-degree regular or VR camera on top. The images from the back cameras are displayed in the corners of the glasses' view (like a car's rearview mirror). The back camera may also serve as a "black box," recording images continuously and storing them locally or in the cloud. This feature provides several benefits such as security (i.e., particularly useful for women in isolated places or at night, or when walking in areas with potential wild animals), danger alerts (i.e., warning of the user of potential dangers from behind), and cycling that may be used as a rearview mirror for cyclists.

The smart hat further includes one or more load speakers or directional speakers (the ultrasonic array) on the forehead, which may send the sound directly to the ears of the person in front. This is particularly useful in crowded places or for online translation. The deaf and mute users may also use the smart hat's speakers to communicate with others. Another application of the ultrasonic array is the creation of virtual tactile sensations.

The smart hat further includes headphone integration. The user's headphones are also mounted on the smart hat near the ears or connected to the hat by wire or wirelessly. The smart hat further includes a directional speaker making sound for the person in front. When using the directional speaker for the other person on the smart hat or on the necklace, the sound direction is achieved through coordination between the laser depth sensors on the smart hat or necklace and the infrared cameras on the glasses, assisted by the AI.

Magnets and attachable devices are attached to the smart hat using magnets, pockets, or hook-and-loop fasteners. Wired or wireless earbuds and other devices (such as a Representative Drone, Selfie Camera, Smart Pen, or Motion Sickness Vibrator) may be optionally attached to the smart hat in a detachable manner, either via the magnets or by being placed in pockets on the smart hat.

The smart hat is designed to have a designated spot for mounting the glasses on top of the head when not in use. Slots and the magnets are located on the arms of the glasses and the sides of the smart hat to securely fix the glasses in place. While mounted, the glasses may also be charged simultaneously.

The smart hat with the glasses is a type of the smart hat that is designed for the users who find traditional glasses uncomfortable on their nose. The smart hat integrates or supports the glasses, allowing the users to wear their eyewear without the usual pressure on their noses. The glasses are securely mounted on the smart hat, providing comfort and stability while still allowing for all the smart features and functionalities. This design ensures that the users may wear their glasses for extended periods without discomfort.

All the features of the smart hat are used independently of the glasses. For instance, the directional speaker on the smart hat is used independently for online translation. In this case, the smart hat itself may need to have its own independent processor. Additionally, all the features of the smart hat may also be installed on headbands, headsets, and smart helmets for sports, cycling, or motorcycling. This flexibility allows the users to choose the wearable that best suits their needs while still enjoying the full range of smart features.

The list of hat types that may be used as gadgets includes at least one of a: cap hat, bucket hat, sun hat, edge hat, winter hat, headband, sports helmet, cycling helmet, motorcycle helmet, beanie, visor hat, snapback hat, fedora, cowboy hat, flat cap, trilby hat, and the like. These various types of hats may be equipped with the smart features, providing the users with a wide range of options to suit different styles and functional requirements.

Similar to the use of the smart hat, a necklace may be utilized to lighten the load on the smart glasses. The necklace may come in various forms, such as a collar-like design, a conventional necklace, or similar to a badge with lanyards used at exhibitions and seminars. The necklace may be equipped with all the components that were installed on the smart glasses and the smart hat, such as, but not restricted to, at least one of the: batteries, processors, directional speakers, various sensors (including depth sensors), video projectors, thermal insulators and cooler or heater, wired or wireless headphones and power supply and date communication, and magnetic detachable components (such as placing the glasses on the necklace for resting around the neck when not in use).

The advantages of using the smart necklace: a) access to movement-related neural signals by embedding EEG/MEG-like sensors (nerve impulse detection) on a neck's spinal area. The necklace may access motor nerve signals (from the neck down), which may assist gesture detection systems and digital commands and even simulate avatar movements and Full body AI tracking. Additionally, the smart necklace allows for integrating more medical and health sensors. The smart necklace may allow easier integration of directional sound system (the ultrasound array). The smart necklace is an ideal location for placing the ultrasonic directional sound system, which provides directional sound transmission for sending focused sound directly to the ears of the person in front, facilitating functions such as translating the user's speech or communicating in noisy environments and virtual tactile feedback. This creates virtual touch sensations, such as the feeling of pressing virtual keyboard buttons on the fingertips (VR haptics with ultrasonic speakers).

In both the smart hat and necklace scenarios, for increased accuracy, a system for ear localization coordinated with the smart glasses is needed. For instance, the necklace or the smart hat's LiDAR may scan a small infrared beam, and when it detects the ears of the opposite person, the glasses may notify the necklace or the smart hat of the exact location.

As shown in FIG. 13, a collar-style smart necklace 1302 with the integrated ultrasonic directional speaker mounted on it. The necklace 1302 is designed to be worn comfortably around the neck and features a sleek, modern design. The ultrasonic speaker 1304 is positioned at the front of the necklace 1302, capable of focusing sound directly toward the ears of a person in front of the wearer.

The necklace 1302 is used independently or in conjunction with the smart glasses. The necklace 1302 may serve as a tool for real-time online translation, sending the translated audio directly to the ears of the listener. The ultrasonic speaker 1304 ensures that the sound is directed only to the intended recipient (or a microphone during a speech), maintaining privacy and clarity in noisy environments. Nerve impulse detection systems/modules on the spinal cord in the necklace gadget with High-Density Electrode Arrays such as, but not limited to, at least one of the: Electroencephalography (EEG) and Magnetoencephalography (MEG) 1305 for accessing motor nerve signals (from the neck down), which may assist gesture detection systems and digital commands and even simulate one or more avatar movements and Full body AI tracking. In other words, the nerve impulse detection systems/modules further include the full-body AI tracking to simulate the one or more avatar movements in augmented reality, virtual reality, and metaverse applications. In an embodiment, sensors and cameras may include, but not limited to, depth sensors and OPA LIDAR and Camera and IR camera 1306. Isolating and Cooling/heating systems such as, but not limited to, at least one of the: Peltier Module/Thermoelectric Cooler 1307, for cooling or worming the neck as the one or more users comfort. Wired or wireless connections to the one or more glasses and headsets for both data transmission and power supply 1308, Speakers 1309. The nerve impulse detection systems/modules further include one or more signal processing algorithms are configured to interpret detected nerve impulses for gesture recognition and digital command execution The smart glasses may connect to various peripherals. The various peripherals may include game controllers, haptic gloves, shoes, and suits designed to enhance the VR, the AR, metaverse, and mixed reality experiences. Additionally, the smart glasses may connect to other devices such as omnidirectional treadmills, small video projectors, and smart waist packs or backpacks. The smart glasses may also function as passive input/output devices and connect wirelessly or via the internet to more powerful processors, such as gaming consoles or laptops or servers.

By installing the directed camera cells on curved surfaces or a complete sphere, a wide-angle and even 360-degree filming in all X, Y, and Z directions may be achieved, replacing the need for a wide lens. This feature is particularly ideal for 360-degree VR and AR cameras. With a directional spherical camera (approximately 8 to 10 centimeters in diameter), millions of the users may remotely view a scene in 3D from all directions simultaneously. All the images captured by the directed camera cells at various angles are combined using the AI and then sent to different users based on their viewing angles, allowing the users to see in 3D from all directions.

As the remote user's head moves, corresponding directed camera cells data are selected, and based on the user's eye movements, the corresponding combined image is sent. Additionally, the directed camera cells may be distributed uniformly and symmetrically or non-uniformly and asymmetrically on the curved surface or sphere.

For AR and VR applications, and to enable subject separation, such as a person from the background, a camera ball is equipped with the depth-sensing sensors such as the OPA LiDAR and the infrared cameras. When both parties use the mentioned smart glasses and the camera ball for video communication, the AI and the depth sensors separate the body image of each participant from their environment. The image is then added into the other party's AR, VR, Metaverse, or Mixed Reality environment via the smart glasses, creating an immersive virtual presence experience. For instance, the user may virtually see his/her mother, who is far away, sitting on a couch beside the user and talking to the user. If these 3D cameras are installed on the representative drone, this experience becomes even richer with the added mobility.

The camera ball sample 1402 with Sparse-Dense topology is shown in FIG. 14. With the help of the cameras, one or even millions of the users may simultaneously connect to stores, conferences, museums, and events like the Olympics, experiencing them remotely and virtually in 3D, or even making purchases. The cameras may be conventional or utilize the 360-degree spherical camera. The images may be recorded or live. Additionally, the cameras are fixed in pre-determined locations or moved using the "representative drone or robot". After purchasing, items are delivered through one of: services and via a carrier drone directly to the user's doorstep.

As shown in FIG. 15, to fully replace the smartphone with the smart glasses, it is necessary to add video calling and selfie camera 1502 capabilities to the glasses. For the video calls, one solution is to use photorealistic avatars. This method simulates the user's face using stored images from various angles and the AI. Another method involves using very wide-angle cameras facing the user and adjusting the image with the AI. To increase the field of view, a foldable or sliding selfie camera may be used.

The front camera on the smart glasses may also be used to display the environment, scenery, and other people that the user sees. One way to take the selfie is for the user to remove the smart glasses and use the front camera, while simultaneously viewing their image on the transparent color display layer. The front light projector may act as a flash in this mode. Additionally, the user may utilize the camera ball for 2D or 3D video calls with one or multiple users. The filming range of the cameras is limited by the AI.

Despite these capabilities, there is still a need for a small, detachable selfie camera that is easily accessible. To address this, a camera with foldable legs that attaches magnetically, via a slide, or through a socket to the glasses' frame and charges through connectors on the frame is designed known as a selfie mini stick. The selfie mini stick may in the form of a bar, stick, or rod with a quadrangular cross-section and include a small battery and flash. The selfie camera's image is transmitted wirelessly, such as via the Bluetooth, and simultaneously displayed in the corner of the smart glasses for the user to see.

Moreover, the wide-angle camera and flash at the top of the selfie mini stick may be extended using a telescopic or sliding antenna. This functionality provides dual purposes: when detached from the smart glasses, it serves as a stand-alone selfie stick, and when attached, it may extend to increase the field of view of the front-facing cameras, aiding in the creation of more natural photorealistic avatars during the video calls. Additionally, when attached and extended, AI-based wide-lens correction ensures a natural image of the user's face is sent to the other party, similar to the front camera of the smartphone.

The Selfie Mini Stick device is mounted and charged not only on the smart glasses frame but also on various other gadgets such as, at least one of the: hats, necklaces, headsets, headbands, waist packs, backpacks, glasses cases, and the like using magnetic or other methods. Additionally, the body of the selfie camera is equipped with two infrared or ultraviolet LEDs, allowing the AI to detect its location using the infrared or LiDAR cameras. During the video calls, the user may view the other party's image in the location of the selfie camera, simulating a virtual smartphone.

Some smartphones come with a stylus that allows the users to take notes, draw, and utilize additional features such as remote control and motion capabilities. To enable the smart glasses to fully replace the smartphone, a mini smart pen feature must be added as well.

Since the smart glasses are equipped with various sensors and infrared cameras, a small pen similar to those used with smart boards (interactive whiteboards) may also be used to write or draw on surfaces such as the whiteboards, glass, walls, or tables.

The computer-implemented system may include the smart pen with a smart pen interface, adapting the one or more users to write, draw, and interact with one or more digital surfaces through one or more infrared tracking sensors embedded within the one or more glasses. The smart pen, like those used with the smart boards, may have a pressure sensor and an infrared or ultraviolet LED at the tip, with operational buttons or guiding infrared/ultraviolet LEDs on the body. The smart pen may also attach magnetically, via the slide, or through the socket to the glasses' frame arm and be charged through connectors on the frame. The smart pen may configured with the bar, stick, rod, or quadrangular cross-section design and include a rechargeable battery.

For instance, the user may open a note-taking application in the Metaverse, Mixed Reality, VR, or AR environments on their smart glasses and write on a regular table or glass surface using the mini smart pen, with all writing being converted into visible virtual text via the AI similar to the smart board. The mini smart pen may also be used as a pointer or remote control for moving or interacting with virtual objects. Additionally, the various buttons on the smart pen are used for control in 3D games, Metaverse, and the like.

The mini smart pen may be attached and charged, not only on the smart glasses frame arm but also on other gadgets such as, at least one of the: hats, necklaces, headsets, headbands, waist packs, backpacks, glasses cases, and the like using the magnetic or other methods. Since the smart glasses are equipped with various infrared and standard cameras, as well as depth-sensing and LiDAR sensors, the smart glasses may, with the help of the AI, image processing models, and the system, detect the position of fingers or objects and their depth. Therefore, a finger, a pen, or even a piece of stick is used for writing or drawing on the regular whiteboard, glass, wall, or table. This method requires more processing power.

For instance, the user having a 3D video call with another user, both users are using the smart glasses. If the user wants to experience a complete 3D conversation, feeling as if the user is present in the other user's environment, freely moving around and observing the other user, objects, or the place they are in. This is where a 3D camera-equipped representative drone that represents the user in the other user's location becomes essential.

The representative drone may configured with all the features of the smart glasses, except for the retinal display, including the array of speakers, the microphones, the cameras, and the sensors. The representative drone may be equipped with the conventional 3D camera, the VR camera, and the 3D camera ball. The representative drone acts as the representative of the user in the other user's environment, allowing the user to explore their location.

The drone is controlled via gesture recognition, head and body movements, the AI, the buttons on the virtual/physical controller, or the buttons on the mini smart pen. During the 3D conversations, the camera-equipped representative drone sends the 3D image of the user to the other user and vice versa. In other words, the representative drone represents another user, and its movements are controlled by the other user's head movements, making it feel as though that the other user is in the user's presence, able to see the user from any angle and move around the user's room. Similarly, the user may control the other user's drone, allowing for a 3D conversation with a sense of presence in each other's environment.

Also, the AI may separate the 3D image of the other user from their background and project it into user's room, making it appear as though the other user is sitting on user's furniture, and vice versa. If user want to attend a seminar or museum remotely, freely visit booths, talk to people, or take a virtual tour of a tourist city, the user may use kiosks to rent these types of drones or rent the exhibition's own drones. However, these drones are not allowed to enter private areas or not-registered seminars.

The representative drones are equipped with speakers and translators, allowing the user to interact with other users in different languages. The user wearing the smart glasses sees the representative drone as the other user. Also, the representative drone is configured with a small monitor for interacting with the users without the smart glasses.

In business meetings, the representative drones may enhance the feeling of presence and collaboration. The representative drones may be wirelessly charged in flight through phased array energy transfer systems, supporting long sessions. The 3D camera ball may be mounted on the representative drone, allowing millions of online users to share and view 3D content.

The representative drone may be attached and charged using the magnets or other methods to various gadgets such as, but not limited to, at least one of the: hats, necklaces, headsets, headbands, waist packs, and backpacks. However, to attach the representative drone to the glasses frame, it needs to be very small and require advanced technology.

The representative drone may also have a display screen that shows image or avatar of the user to the other user. If the other user is also wearing the smart glasses, the other user may see the representative drone as a 3D image or a full avatar of the user.

There are three types of 360-degree 3D representative cameras that are fixed, drone, and robot. In all the aforementioned scenarios, a small robot that walks on the ground and possesses all the features of the representative drone may be used instead of the representative drone. Additionally, in places such as stores or stadiums where millions of the users may want to connect to the 3D camera, these cameras may be fixed in various corners of the store or stadium. In this case, the sense of movement between the cameras for the users may be similar to a street view model but in real-time, with the added capability of digital zoom.

One of the significant challenges and barriers to the adoption of VR headsets and devices is a sensation of nausea or motion sickness. The contradiction between the perceived movement in the VR environment and the actual movement sensed by the fluid in the inner ear along the X, Y, and Z axes by the VR, user causes this problem. On the VR headset, and in the system on the smart hat, six (three pairs) of linear actuators (or vibrator motors or solenoids) are installed along the X, Y, Z axes. The linear actuators, based on the VR content and movements occurring in various directions within the virtual environment, cause head movement or rotation (by simultaneous movement of a pair of linear actuators in opposite directions), thereby influencing the fluid in the inner ear along the X, Y, Z axes.

The vibration of the actuators is designed in such a way that, when the head moves, the fluid in the inner ear is stimulated in a manner corresponding to the virtual movement or rotation. The simulation misleads the brain, preventing it from detecting any discrepancy between the visual input from the eyes and the sensory input from the inner ear, thereby reducing or eliminating the motion sickness.

The vibration waveform of the linear actuators is determined by the AI in the headset or the smart glasses. The vibration waveform may take various forms, including, but not limited to, repeatable and non-repeatable patterns, symmetric and asymmetric shapes, sharp or smooth pulses, and more (as shown in FIG. 16). The variations in the vibration waveform are configured to effectively simulate the movement of the inner ear fluid, further enhancing the realism of the virtual experience and reducing motion sickness.

The vibration waveforms are configured to simulate the movement of the inner ear fluid, and they are customized through the AI to match the user's specific needs. This personalized approach ensures that the virtual experience is more immersive and effective in reducing motion sickness by aligning the artificial stimuli with the natural responses of the inner ear.

The linear actuators 1704 are installed at the front, back, left, right, and top of the helmet 1702 (as shown in FIG. 17), with the final actuator placed on the chin strap. This arrangement allows for the effective stimulation of the inner ear fluid in various directions to simulate virtual movements, thereby reducing the motion sickness during the VR experiences. In addition to the smart hat 1702, all features may also be installed on the headbands, the headsets, and the smart helmets 1702 designed for sports, cycling, motorcycling, and other similar activities. This versatility allows for the integration of motion sickness mitigation technology across various wearable devices, enhancing the user's comfort and experience in a wide range of activities.

The ultrasound array is installed on the glasses frame, the hat 1702, and the necklace. The ultrasound array has two main applications: a) sending directional sound to the other user's ear for translating the user's speech or communicating in noisy environments. For increased accuracy, a system for locating the ears in coordination with the smart glasses is required (e.g., the LiDAR on the necklace 1302 or hat 1702 scans with a small infrared beam, and when it hits the user's ears, the location is communicated from the smart glasses to the necklace 1302 or helmet), b) creating a virtual tactile sensation, such as the feeling of pressing virtual keyboard buttons on fingertips (VR haptics with ultrasonic speakers).

The directional microphones (or microphone array) comprise 4 inward-facing microphones and 4 outward-facing microphones. An application of the 4 inward-facing microphones on the glasses frame (toward the face) focus on the user's mouth, enhancing accuracy and noise reduction for clearer voice translation. In noisy environments, the 4 inward-facing microphones send the user's voice to the other user's ear clearly, amplified, and directionally. Combining this feature with AI improves overall sound quality.

The application of the 4 outward-facing microphones on the glasses frame (toward the other user) captures the other user's voice for better translation and noise cancellation, especially in noisy environments. The AI further enhances this feature. In this case, by staring at the other user's mouth, the AI only focuses on that user's voice and amplifies or translates it. Additionally, the glasses may detect noisy environments and suggest noise cancellation for both transmitted and received audio. Digital Signal Processor (DSP) systems are employed in the microphone array and other parts of the smart glasses.

The gesture detection is performed through at least one of: facial expressions, hand and finger detection, foot and other movements detection, neural signals, and the like. Using the OPA LiDAR, the depth sensors, the regular and infrared cameras (facing the face), and the AI, the facial expressions and gestures, such as the eye movements, eyebrows, eyelids, mouth, lips, tongue, and the like may be detected and assigned shortcut functions.

In the VR or AR environments, or even in the lensless prescription eyeglass mode, the user may zoom in or out on near or distant objects by widening or narrowing their eyes (similar to an eagle's vision or binoculars). Telephoto cameras on the frame or the OPA cameras on the eyeglass glass enable physical or software zooming. This feature is also used when working with virtual screens and applications. In this mode, image stabilization may be applied to smooth and stabilize the zoomed image, reducing the effect of head or body movements while walking. Additionally, for the objects close to ultra-wide cameras, widening the eyes may provide a binocular magnifier effect. Also, raising the eyebrows may replace the cancel button.

Blinking may also be used. Right and left blinks may replace right and left clicks, and double blinks may substitute for double clicks. Similar to drag and drop with a mouse, after a right blink or double blink, objects or menus may be moved by moving the eyes up, down, left, or right.

Using the OPA LiDAR, the depth sensors, the regular and infrared cameras (facing outward), and the AI, the hand and finger movements may be detected and used for functions such as twisting, zooming in and out, grabbing and moving objects (drag and drop), and the like.

For this purpose, the AI may be used alone or combined with inputs from the sensors to reduce processing load. Additionally, gaze detection may be combined with brain waves detected by the EEG/MEG sensors on the smart hat (including pressure or rubbing fingers together) or with nerve impulse detection systems on the spinal cord in the necklace gadget to simulate the keyboard, the mouse, and the touch panel using only hand gestures. Interactive sensors may also be used for this purpose on the smart glasses or its accessories.

Using the OPA LiDAR, the depth sensors, the regular and infrared cameras installed on the edges of the smart hat 1702, and the AI, the foot movements are detected and used for creating avatars or recognizing actions such as kicking a ball and walking in 3D games or VR and AR environments.

With the EEG brain sensors installed on the smart hat 1702, in addition to aiding in typing and executing the commands, the AI combined with data from other cameras and sensors is used to more accurately detect gestures of the face, hands, fingers, and feet. Using the nerve impulse detection system on the spinal cord in the necklace gadget, combined with the AI and other sensors and cameras, the entire body avatar from the neck down may be more accurately simulated, and related gestures may be detected. Additionally, various types of the nerve impulse detection systems are designed to improve body gesture recognition and avatar simulation.

The smart glasses may be connected to various other input devices, such as smart rings, mouse pads, keyboards, smart pens, joysticks, and mice, as well as input connections from other devices such as smartphones, and more. Throughout all the above-mentioned processes, the AI may perform detections independently or in conjunction with the sensors and equipment such as, at least one of the: LiDAR, infrared cameras, depth sensors, ultrasonic detectors, and the like.

Using the following methods individually or in combination, the touch of the finger on the wall is detected, allowing the wall to be used as an AR drawing surface or the whiteboard. If the distance between the fingertip (or the end of a pen or any pointer) and the wall surface reaches zero, contact is established. If the EEG detects signals of finger contact with the wall, contact is confirmed, and the pen (or eraser, and the like.) is in use.

Since the smart glasses have all the features of the smartphone, all software, websites, and applications with graphic design or personal management features may use this tool or expand their capabilities. Another method involves using the mini smart pen, which emits ultraviolet or infrared light from its tip upon contact with any surface. The mini smart pen may be stored in a bag or the smart hat.

Sometimes the user may need to use the smart glasses like the smartphone without wearing them, for instance, to quickly check notifications or send a message. This is achieved by using the touchpad on the glass surface and by using the front sensors and the cameras to detect the gestures and execute the commands (to avoid smudging the glasses).

The depth sensors and the LiDAR are suggested here as a solution to combat video forgery and recording from a display. These technologies, due to their ability to measure distance and scene depth, may identify the differences between a real three-dimensional scene and a two-dimensional image displayed on a monitor:

The LiDAR and the depth sensors measure the exact distance between the camera and the objects in the scene. When the video is recorded from the display, the real depth between the camera and the display content remains unchanged, whereas in a real scene, the depth varies depending on the distance of each object from the camera. This difference may be used to identify fake scenes.

One distinguishing feature of the display is its flat surface. The depth sensors detect the flat surface and differentiate it from a natural scene that includes various surfaces with different depths. If the depth sensor detects that all points are at a constant depth, it may indicate that the image is recorded from the display.

By combining the depth sensors with the AI, incorrect or suspicious details in the video may be identified. For instance, if a fake video is created using fake depth techniques, the AI may detect subtle differences in the scene's various depths that may not be entirely accurate. Also, the AI may compare IR camera information with other cameras.

The cameras, the microphones, the depth sensors, and the LiDAR all have their own independent and local secure elements, where all information is hashed and signed on-site. The cameras, the microphones, the depth sensors, and the LiDAR are also all equipped with independent anti-tampering systems that may disable the system if any tampering is detected.

When the video is recorded (whether using the front-facing cameras of the smart glasses or the internal cameras aimed at the user's face), the LiDAR data is also hashed frame by frame (and ultimately globally) along with the audio and the video. This data is then signed with a private key of a central secure element in addition to local secure elements. Additionally, the signatures are authorized using a chain of trust model and Certificate Authority (CA) or may be authorized by a Blockchain Based CA to maximize the proof of authenticity of the image, the video, and the audio. Further, the authenticity is verified through multi-level validation using local and central secure elements.

Therefore, with the smart glasses, when the user calls via video, leaves a message, or records a scene on the street with the smart glasses cameras, the user is significantly assured of the authenticity of the image, the video, and the audio. This method may also be used on conventional mobile phones, cameras, recorders, and the like.

All the encryption techniques may also be applied to photos, videos, and audio recordings in the VR, AR, Meta-verse, and Mixverse environments. In this way, not only the media recorded in the real world be authenticated, but also in virtual and mixed worlds. This may serve as a practice for maintaining privacy and security in virtual worlds in a future where the human brain may be uploaded, and the user may live in a virtual paradise.

Over time, slight changes in the physical characteristics of the pixels may cause misalignment in the overlapping edges of the virtual pixel blocks. To compensate for this, the smart glasses case is equipped with the cameras (at least two) that simulate pupils. When the smart glasses are placed inside the case, in addition to charging the glasses' battery, the edges of the blocks may be calibrated. Although image block calibration may also be manually performed on the eyes, a separate calibration device may be provided independently of the glasses case. The glasses case may also have designated spots for charging other accessories, such as the selfie mini stick and mini smart pen.

An electronic taste receiver spoon may be used for transmitting better 3D experiences, such as during cooking shows, and may be stored in a waist pack or other accessories.

A scent transmitter receiver (olfactory receiver) device is mounted near the nose on the glasses frame, enhances VR and AR experiences by transmitting scents. One application includes combining the smart glasses with social networks to send scented messages or emojis.

A silicone edge is designed to seal the gap between the glasses' edges and the face, preventing extra light from entering during the VR applications, allowing the users to be fully immersed in the virtual world, such as the Metaverse and video games. The silicone edge may be attached to the frame via the magnet, and the like.

The system is Artificial Intelligence Positioning System (AIPS) that relies heavily on the AI and computer vision models, similar to how the users and animals navigate their surroundings. Using various cameras, the depth sensors, and the LiDAR on the smart glasses, the positioning accuracy may reach millimeter-level precision.

Combining the system with other positioning technologies such as GPS (for start point location when signals drop at the building entrance), building and floor maps, gyroscopes (for estimating movement, especially in elevators or rapid rotations, or in environments with poor visual data like darkness), Simultaneous Localization and Mapping (SLAM), magnetometers, and more, may further enhance the accuracy of the AIPS. Occasionally, LPS and IPS tools may also be used.

Over time, the collective Data gathered by the users and different smart glasses may assist the AIPS provide highly accurate positioning even in outdoor areas without the GPS. Additionally, this method may be applied to existing smartphones as well.

With the help of the smart hat sensors, using the EEG/MEG waves and the machine learning models, the user may execute the commands simply by thinking or even may typing text. For instance, if the user thinks about zooming, the area they are gazing at may be zoomed in. Combining the EEG/MEG with nerve impulse detection on the peripheral gadgets, the eye tracking systems, and other sensors on the smart glasses and the peripheral devices may increase the accuracy.

In addition to running all existing applications available on current smartphones, the smart glasses, with their new capabilities, may run specialized applications designed specifically for them. The smart glasses may also have their own dedicated application store. An AI-based user interface may be developed that continuously learns from the user's habits and optimizes the user experience based on daily behavior.

The smart glasses, equipped with various telephoto and ultra-wide cameras, along with physical or digital focus options and local or cloud storage, enable different types of photography and videography, both close-up and distant. The smart glasses may be used as zoom lenses, binoculars, or magnifying glasses. Additionally, while zooming and walking, the AI and the gyroscopes may stabilize the image by compensating for head movements.

Sometimes the user may see something interesting on the street, Television (TV), or at home and wish had recorded it. Since the smart glasses may always be on the user's eyes, by activating a "Save The Moment" option, the cameras are continuously recording and buffering a selectable duration (e.g., 60 or 120 seconds) and overwriting anything older to conserve memory. Whenever the user sees something interesting, they may say "Save the moment" (or use another method), and the smart glasses save those 120 seconds and everything after to long-term memory. Save-the-moment features are available for 360° camera as well, for instance, if the user lose seeing a bolt of lightning then user may say "save the moment" and replay it on the smart glasses The smart glasses have the ability to load and search through old memories and experiences using the AI (as the smart glasses may see and learn everything). The smart glasses may review moments seen by the user in slow motion. The smart glasses are configured with the capability for stereoscopic photography and videography.

The smart glasses are configured with the ability to take high-quality photos through dirty windows, fences, or mesh: Since the smart glasses are configured with stereoscopic capabilities, the user may take two photos from slightly different angles behind the dirty window (or fence or mesh) and use the AI to enhance pixels with minimal movement (distant and main scenery) while removing parts of the image that show more movement between the two photos (dirt on the window with little distance) as noise and dirt. This feature may even be added to single-lens cameras if the photographer slightly shifts position between the first and second photos. All photography and videography features are also be available in the VR, AR, Mixed Reality, and Metaverse environments, allowing the users to record anything they see through the smart glasses.

The smart glasses and their peripheral gadgets, such as the smart hat and the necklace are equipped with various processors such as Central Processing Units (CPUs), Graphics Processing Units (GPUs), Tensor Processing Units (TPUs), Language Processing Units (LPUs), and different types of memory. However, with the widespread coverage and gradually increasing internet speed, most processing is handled outside the smart glasses, on the cloud, or on the user's personal servers.

Since the smart glasses are the closest electronic device to the user and store critical information, including everything seen and heard, both physically and virtually, as well as EEG brainwave data, privacy and information security are of utmost importance. For instance, if the smart glasses are hacked while driving and lead the user astray or if an authoritarian government gains access to all user information. Privacy is ensured through various cryptographic methods (benefit from Secure Element), storing and processing data on local and personal servers, and using confidential computing everywhere.

The smart glasses may be unlocked using various methods, including face recognition, eye pupil recognition, password or pattern on the touchpad layer, the EEG waves, thinking of a password, (Multi-Party Computation) MPC wallet encryption, and other existing methods. The smart glasses may automatically recognize the user based on their face, personalize the environment, and greet them by name.

With the video recording and zoom capabilities, the AI may prevent recording in private areas such as bathrooms or when undressed. The AI also restricts zooming in on other people's windows or prohibited areas to protect others' privacy. Also, "Confidential Computing" may be used on the smart glasses or cloud processors to guaranty the user privacy. The system is also configured with the features such as incognito mode or the ability to disable the cameras and the microphones through the voice or gesture commands to enhance user privacy.

Another application of the "Save the moment" or continuous event recording feature is in security and emergency situations, which may reduce crime rates. For instance, it may serve as a black box or dash cam for court evidence in cases of accidents, assaults, thefts, or legal disputes. Additionally, by sending the latest images and real-time conditions during the emergencies, the system may potentially save the user's life.

Women who walk at night or in isolated areas may feel more secure with the camera, which see behind and records events for safety. Cyclists may use it as a rear-view mirror displayed in the corner of the smart glasses. Moreover, the users who travel in areas with potential wild animal attacks may benefit from the rear camera and the AI alerts to prepare for possible dangers.

The smart glasses allow for payment via Near Field Communication (NFC). The payments may be made using the glasses' camera to scan a Quick Response (QR) code. In this mode, the password may be entered in various ways, including by thinking of the bank card's Personal Identification Number (PIN). The smart glasses support the payments through various cryptocurrency methods and Web3 technologies. The payment may be made simply by looking at the bill and saying, "Pay it!". The payment may be executed by thinking about it. Also, in AR mode, the one or more users can pay via cryptocurrencies like a physical coin, see and hand over it, and hold a virtual AR coin in their hand. The one or more users may look at the plate of his car and say "Pay parking".

With the smart glasses, there is no more barriers in communication between the users speaking different languages, as the smart glasses may translate the languages bidirectionally. Additionally, the deaf and mute users are able to communicate not only with those who speak their language but with users worldwide.

When watching a movie in another language, the smart glasses may translate and subtitle it in the user's language, or translate the audio into the user's language and play it in the user's ear while filtering out the original language as background noise. The AI and the ultrasonic array assist with the noise cancellation.

The AI uses the cameras and the depth sensors to perceive the environment and describe it to the blind user, guiding them and warning of obstacles while walking. The system provides voice-guided navigation to direct the user to their destination. When the blind person extends their hand with the palm open at chest height, the VR Haptics with ultrasonic speaker system on the glasses, the smart hat, and the necklace create a tactile representation of significant objects in the path on their palm, allowing them to perceive the environment as a Braille-like image instead of traditional Braille. The AI assists the blind users read signs, books, menus, and the like through auditory output.

The smart glasses seamlessly bridge the gap between the virtual and real worlds. For instance, while reading the book, if the user places their finger on a word, the glasses display its translation.

Sometimes, two users who are together may want to share what they are seeing (similar to showing a phone screen to someone else). Besides handing over the smart glasses to the other user, there are several other methods: a) display the image or the video seen on the eyeglasses glass, b) project the image onto the palm of the hand, the wall, or the table using the gadget's built-in projector, c) share the image on the monitor, the TV, or other display devices, d) if the other user also have the smart glasses, the user may share the image via Bluetooth or other methods, and e) two or more users on the video call may share what each of them is seeing with the group (such as a view, monitor, a movie screen, report pages on the desk, and the like.). This feature is particularly useful for remote work environments.

The smart glasses may connect to all types of physical input and output devices via the Bluetooth and other methods. Additionally, various virtual inputs and outputs may be defined and used virtually with the smart glasses. Using various cameras and depth sensors on the smart glasses and peripheral gadgets, all input devices such as, at least one of the: keyboards, mice, touchpads, scanners, optical input devices such as barcode or QR code scanners, joysticks, and the like may be virtualized, providing a near-real experience of the input devices.

By connecting the smart glasses to the physical input devices, all the virtual devices inside the smart glasses, such as the computers, the TVs, and the like may be controlled. Input (and output) information may be exchanged between them and the smart glasses via a small Universal Serial Bus (USB) dongle or entirely without a dongle using the Bluetooth, Wireless-Fidelity (Wi-Fi), or other wired and wireless methods.

Physical output devices such as, at least one of the: monitors, printers, loudspeakers, headphones, TVs, and projectors may be connected to the smart glasses as outputs via the Wi-Fi, the Bluetooth, or other wired and wireless communication methods. All output devices such as the monitors, the TVs, cinema screens, and the like, may be virtual and display information to the user via the smart glasses, receiving their data from the computers or other inputs via wired or wireless methods.

By combining the features and using the capabilities of the smart glasses, almost all current electronic devices may be simulated entirely virtually or through a combination of physical and virtual components. For instance, with the LiDAR and other depth sensors, not only the gesture recognition be achieved, but a virtual smartphone touchpad may also be simulated. The user may see a virtual smartphone or tablet on their left palm and perform all touch panel functionalities by touching the left palm with the right fingers or performing gestures such as zoom in and zoom out on the left palm, but virtually.

Additionally, using the LiDAR and other depth sensors, the table surface may be transformed into a computer keyboard or a musical instruments keyboard like an organ or piano. With gesture recognition, even guitars and other musical instruments may be simulated within the smart glasses as AR or VR. Moreover, the glasses and their peripherals may facilitate communication and data exchange between smartphones and other smart devices. The smart glasses may replace everything, including the smartphones.

Since the smart glasses have all the features of regular smartphones and are equipped with powerful processors (on the frame, the hat, the bag, the cloud, and the like.), they may serve as an ideal and more convenient replacement for devices such as the mobile phones, the tablets, the computers, the laptops, the wristwatches, the TVs, the cinema screens, the game consoles, the musical instruments, and more. Essentially, the smart glasses may be used instead of all of the devices.

By adding an AI-powered voice assistant to the smart glasses and utilizing the audio and visual capabilities of various LLMs (Large Language Models) or the AI Agents, a vast array of possibilities opens up for the user. For instance, the system may read aloud a book the user is holding, summarize it page by page or chapter by chapter, or even translate it. The user may look at another user or object and ask specific questions about them. The system may monitor all the food and drinks consumed by the user throughout the day, calculate the total calories, and provide the user with exercise routines and health recommendations.

For instance, the smart glasses' user notices a problem in the city (e.g., a blocked street or damaged pavement) and immediately the user says "Report" to the AI. The AI autonomously collects relevant information such as photos, videos, location, and time, identifies a responsible municipal department, and reports the issue. In return, the municipality rewards the user with incentives. This idea is extended to all products and services from both public and private organizations. The users may report problems or make suggestions with a simple voice command, and organizations may set up AI-driven feedback systems to receive and act on customer feedback, leading to significant improvements in quality.

The smart glasses may replace prescription glasses and, since they constantly monitor the eyes, provide recommendations to prevent dry eyes. The system may also occasionally suggest exercises to strengthen the eye muscles or lens muscles. Additionally, the smart glasses are equipped with various health sensors, such as blood pressure and heart rate monitors, which exchange information with the user's medical records. If a potential health risk is detected, the glasses may alert the user's doctor or the nearest hospital emergency department.

If the user is a social media influencer, the important moments of user's life are continuously being captured by the smart glasses. Based on the strategy the user may set and with the help of the AI, the moments are automatically transformed into social media content and uploaded to social media platforms. The glasses also allow the users to post 3D videos and send scented comments and messages to other users.

The smart glasses may take social networks to a new level of development, replacing the concept of "Social Media" with "Social Collective Action!"

With the help of the AI-assistant system and the AIPS, not only the user may control all devices with the voice commands, but also address the objects by simply looking at them. For instance, if the user looks at a lamp and says, "Turn this on," or instructs the robot vacuum to clean a specific area of the house. The system may also employed for military applications.

The capabilities of the smart glasses combined with their lightweight and compact design, enable to seamlessly blend AR, VR, Metaverse, and the real world in ways never experienced before, creating a significant transformation across various fields such as communication, games, work, entertainment, life, learning, social media, finance, business, trading, sports, and more.

Different social groups (work, gaming, family, educational, economic, and the like.) located in various geographic areas may see themselves as if they are together and interact as though they are physically present. For instance, a business meeting is held where other participants are virtually present, yet all may be seen around the same table through the smart glasses.

In virtual seminars, the user may approach and converse with anyone Additionally, in physical seminars, the representative drone or robot may attend, visit booths, and talk to various users on their behalf. In large events such as football matches or major speeches, each camera may cover millions of people, providing a 360-degree 3D view with digital zoom capabilities, while several cameras around the venue provide a sense of movement for the users.

Over time, the AI gathers information through the smart glasses, learning various professions practically (necessary for training the AI in call-to-action tasks), as well as understanding personalities. When needed, the AI may act as an assistant or even a substitute.

A large network of the smart glasses may be incredibly useful for collaborative tasks. For instance, if the user is looking for a specific item in the store and another user's glasses have already seen it, this collaboration may guide the user to the item's location. Similarly, the smart glasses may connect to help find a missing person and assist the police. When searching for someone in a crowd, a product in the store, the book in a library, or even a word in the physical book, simply look at it through the smart glasses, and AI (individually or with help from other glasses or the internet) will locate it for.

This concept introduces a second layer to the earth's surface, allowing the one or more users to not only see the physical world but also enjoy and interact with virtual stores, landscapes, forests, advertisements, parks, and virtual animals throughout the augmented city. An empty football field or hall may be transformed into a virtual store where anyone with the smart glasses may visit (physically or virtually), pick up, examine, try on items, and interact with sellers as if in a real store.

If the user misses someone, a simple call may bring them to 3D, right by user side. When shopping for clothes (or shoes, and the like.), the user may look at any item and virtually see wearing it from different angles. The same feature is available in virtual stores, assuming the user has previously set up a body scan using the smart glasses or the 3D camera.

For instance, the user enters a clothing store or any other shop, and based on previous purchases, height, weight, and skin tone, the AI in the smart glasses recommends products the user may like. The smart glasses also show the percentage match with user preferences above the item virtually in the AR.

In stores, an AI sales assistant may appear as a human avatar to provide advice, guide customers, sell products, provide information about items, or lead the user to the products looking for.

With the smart glasses, the user may explore various existing Metaverses, buy and sell land, and design and build user's own store or mall on their land. The user may create their own NFT marketplace, display NFT art on the walls, or start a new business. The smart glasses may establish a standard where all Metaverses are interconnected, with gateways for entry and exit between them. In the near future, when brain uploading (after death) becomes possible, this may pave the way for MetaParadises to be linked, allowing the users to travel from one virtual paradise to another. The user may participate in a prompt-writing competition to create AI-generated art and sell the results in a 3D virtual museum. Alternatively, the user may design 3D art within the Metaverse, have it 3D printed in the real world, and sell it.

The smart glasses may serve as an ideal input tool for collecting data to train the AI in various skills and aspects of daily human life. This data may provide the machine learning models with practical knowledge that is not documented, such as "call to action" methods. Similar to how parents train their children, daily use of the smart glasses by doctors, engineers, lawyers, workers, Chief Executive Officers (CEOs), artists, and the like, may gradually transfer this tacit knowledge to machines. For instance, the doctor or the CEO with years of experience may leave behind a complete human-like avatar as a successor when they retire. By also training the AI in the user's personal characteristics, this avatar may step in during critical moments and even generate income on behalf of the person. The one or more users can create their own personalized or professional avatars and have the ability to sell or rent them out in bulk.

Using the smart glasses, entire cities and countries may be transformed into multi-layered Metaverses or Mixverses. In the first layer, for a small fee, real property owners may design the virtual layer of their property however they like, place ads on it (for instance, showing different ads based on cookies, needs, and preferences), start a virtual business, or even rent it out. Common land areas in the first layer are purchased by local municipalities and rented out to others. In the higher layers, land purchases are open and managed by the Mixverse City platform. The users may buy or rent property in these layers, advertise on it, or start suitable businesses. These are not just Metaverses but something far beyond (Mixverse). Anything that may exist in the physical world (Layer Zero) and beyond may be experienced in the upper layers (Mixverse layers). In an embodiment, the computer-implemented system is configured to combine one or more overlapped virtual layers comprising at least one of: one or more property-owner managed layers and one or more optimized Mixverse layers, with media in the real world, to generate complexed multi-tiered augmented experiences.

The smart glasses blur the lines between the virtual and real worlds, and in the future, these virtual land layers may become as valuable as the physical layer (Layer Zero). The system may have its methods for document registration and civil registry, potentially laying the groundwork for a borderless world governed by the Earth Federation on blockchain.

In the system, everyone may choose their face, height, body shape, and clothing (as an avatar or NFT-Non Fungible Token), and those wearing the smart glasses may see them in that form on the street.

While exercising, running, or walking on the street, the user may add preferred environments, such as the sea or forest, around the user and even hear sounds like birds or the ocean. The user may also remove scenery they dislike. However, paths and car routes may remain transparent for safety. Virtual incentives can be integrated through AR to enhance the workout experience in sports. For example, the one or more users could see their beautiful AI coach encouraging them to exercise. If the one or more users don't follow the coach's instructions, the AI could transform into a monster that chases the one or more users, forcing the one or more users to run.

In group activities, the smart glasses may sync, allowing everyone to see the same virtual object in the same spot in the room. Multiple virtual monitors, the computers, and the smartphones may exist within the smart glasses, controllable via virtual or physical mice and keyboards, with shared clipboard functionality.

If someone wearing the smart glasses sets their status to "Open to Networking" in public places, others with the smart glasses may see augmented reality information about that person (such as profile, interests, star ratings, number of followers, profile summary, and the like.) above their head. If interested, they may approach and connect with that person. For positioning, the smart glasses may use the Bluetooth or infrared communication to share this information. People may find nearby individuals of interest in public places or on a map and meet virtually or in person. This possibility may be very useful in business applications or even matchmaking.

With the features and capabilities of the smart glasses, it is possible to create strong, beneficial, and harmless network effects among the users of the smart glasses, similar to or even stronger than the network effect that the smokers share. Virtual events, gatherings, and activities may attract people to physical locations, providing engaging, positive, and beneficial social experiences. Examples of activities that the system may create, at least one of: shared virtual experiences, virtual and AR common environments, group AR/VR games, group yoga and meditation, group sports and exercise, shared educational and cultural experiences, classes and workshops, virtual art exhibitions and concerts, VR group games and challenges (inviting collaboration and competition, forming gaming communities), AR games (requiring collaboration and interaction in the physical world, bringing people closer together), virtual movie nights, and more. Some people smoke cigarettes not for the nicotine but for the enjoyment of the smoke they produce from their mouths through their noses. The user can see the virtual AR cigarette in his hand and enjoy the production of smoke, which can be a way to quit smoking.

If there is a danger nearby while walking (such as an unseen hole or step), the smart glasses may alert the user. Additionally, if the user is in AR or VR mode and the system detects a hazard or obstacle, the lenses may automatically become transparent, exiting display mode, and warn the user of the danger. With lawyer AI avatar, these warnings may apply not only to physical dangers but also to legal or economic threats, such as business deals.

Certain features are disabled while driving to prevent distractions and accidents. However, the GPS and navigation capabilities may enhance user's driving experience by highlighting the route and road. If there is a hidden danger ahead on the road, the system may warn the user or highlight the hazard.

The system facilitates virtual meetings and collaborations in the AR/VR environments. The system enhances productivity by displaying information and data as augmented reality during work. The smart glasses may have specific applications based on the job. For instance, in restaurants, the system may manage table orders. Pilots may use the system for viewing flight paths, and engineers may streamline 3D designs. The system learns the user's personality and job skills, acting as user's deputy. The system may separate personal and work life, assist new trainees, and help calm the user during stress or conflict. The system may provide the best responses in important work meetings, debates, or life situations. If the user need to search or consult during a meeting, the user may think of the question, and the answer may appear in front of the user using the EEG. For instance, the user may ask the system (by thinking) to analyze the body and facial language and emotions of the front person.

The smart glasses and Mixverse capabilities may bring sci-fi movies closer to reality and make games realistic. AR games may be designed within the city or in the first or higher layers of Mixverse City, where the user may live inside the game. The users may immerse themselves in AI-generated customized 3D movies or games within home or city environment. On the street, anyone may appear in Mixverse with a different face, height, clothing, and gender as the avatar, even appearing as the animal such as a cat. The user may see everyone around as cartoons, or they may see the user as a cartoon character. The user may live in the middle of a cartoon animation, where everyone transforms into cartoons, and the user may even host a cartoon-themed Anime party. The console for these games may be a private server or cloud-based.

To become a world traveler, the user no longer needs to physically travel. With the smart glasses, the user may rent the representative drone from the destination country or location and visit historical sites, cities, or exhibitions in 3D. The user may ask the AI avatar, which is always with the user, about the history of any building or new thing the user sees. Additionally, during physical travels, the live translation feature of the smart glasses may make the whole world feel like user's own country and city.

With the smart glasses and AI capabilities, 3D virtual classes, computer simulations, and interactive learning may reach the highest quality and educational standards, even in underprivileged areas. The system may create and manage daily tasks with information displayed in augmented reality or an AI beautiful secretary avatar that always reminds the user of every plan. By standardizing and using open platform systems, different Metaverse environments may connect and interact with each other. The other users may also enter each other's Metaverse environments.

The smart glasses may enable many businesses in blockchain, Metaverse, NFT, and Web3. For instance, the users may enter the Metaverse in VR/AR, wear their NFT, and participate in an AR AirDrop where coins are dropped on the users in a physical area by a virtual unidentified flying object (UFO). Also, the users may see cryptocurrencies such as Bitcoin in the form of coins in the augmented reality environment and trade with each other using visual coins. The users may view their speech text in AR (using the AR mode with a transparent lens), and musicians may see their notes in front of their eyes.

For instance, the powerful capabilities of the smart glasses are equipped with an AI or Artificial general intelligence (AGI) virtual human-like avatar assistant. The AR avatar may act as user's secretary, tour guide, lawyer, doctor, advisor, and more (and perhaps, in the future, the user's spouse once the user have uploaded their brain after death). The assistant may always be by the user's side at work and home, knowing the users better than they know themselves, addressing all human shortcomings, and providing intelligent guidance to keep the user ahead of their competitors.

The AI accompanying the smart glasses may function as user's subconscious, constantly monitoring user's professional and social activities, identifying problems, and providing solutions and recommendations at the end of the night or the next morning to help the user seize opportunities and manage threats in all aspects of life. This mirrors how user's subconscious works, observing daily events, processing them during sleep, and even consulting with conscious mind through creative dreams to enhance creativity, presenting new ideas to our conscious mind upon waking.

There are numerous creativity techniques in the world such as brainstorming, speculative excursion, or Synectics, which may be executed in collaboration with the AI to solve user problems and help achieve their goals.

There are many reasons to believe that in the near future, human intelligence may not be able to surpass the AI, and common sense dictates that "If you can't beat them, join them." The capabilities of the smart glasses provide the fastest, easiest, and best way to "join" the AI. Thus, combining the smart glasses with AI marks the beginning of humanity's transition to a new version of itself, known as Humanity Version Two (H2.0 or H2O).

One application of the retinal display technology is AR/VR/Prescription contact lenses. In the contact lenses, directed pixel technology and other equipment on the above-mentioned smart glasses may be used. Since the contact lenses are placed close to the cornea, the directed physical pixels may sweep light across different areas of the retina at various angles. The number of the directed physical pixels may be minimized because, for instance, a single physical pixel may sweep across a large portion of the retina to create the image. Additionally, the Sparse or Sparse-Dense topologies may be utilized.

By placing the one or more directed physical pixels on the edges of the contact lens (around the pupil area), the entire image may be formed without needing the directed physical pixel in the center of the lens, which may interfere with normal vision. In current models, the retinal projector is placed in the middle of the lens, which reduces the quality of natural vision.

Even if a small array of the directed physical pixels is placed on the contact lens in the center of the pupil, using the proposed topologies, especially the Sparse-Dense, along with AR/VR/Prescription formation methods, a high-quality image may be achieved on the full parts of the retina. In this setup, the small OPA camera may be integrated into the lens. Together with the other components of the lens, this setup would deliver a high-quality AR/VR experience for the user.

The directed pixel technology may also be applied to 3D televisions. By tracking the viewer's eye and the open part of the pupil, the necessary 3D image may be projected directly into the viewer's pupil. Given the unique possibilities the directed pixel technology provides for the televisions, they could be named TeleWindow (TW).

Figure 18:
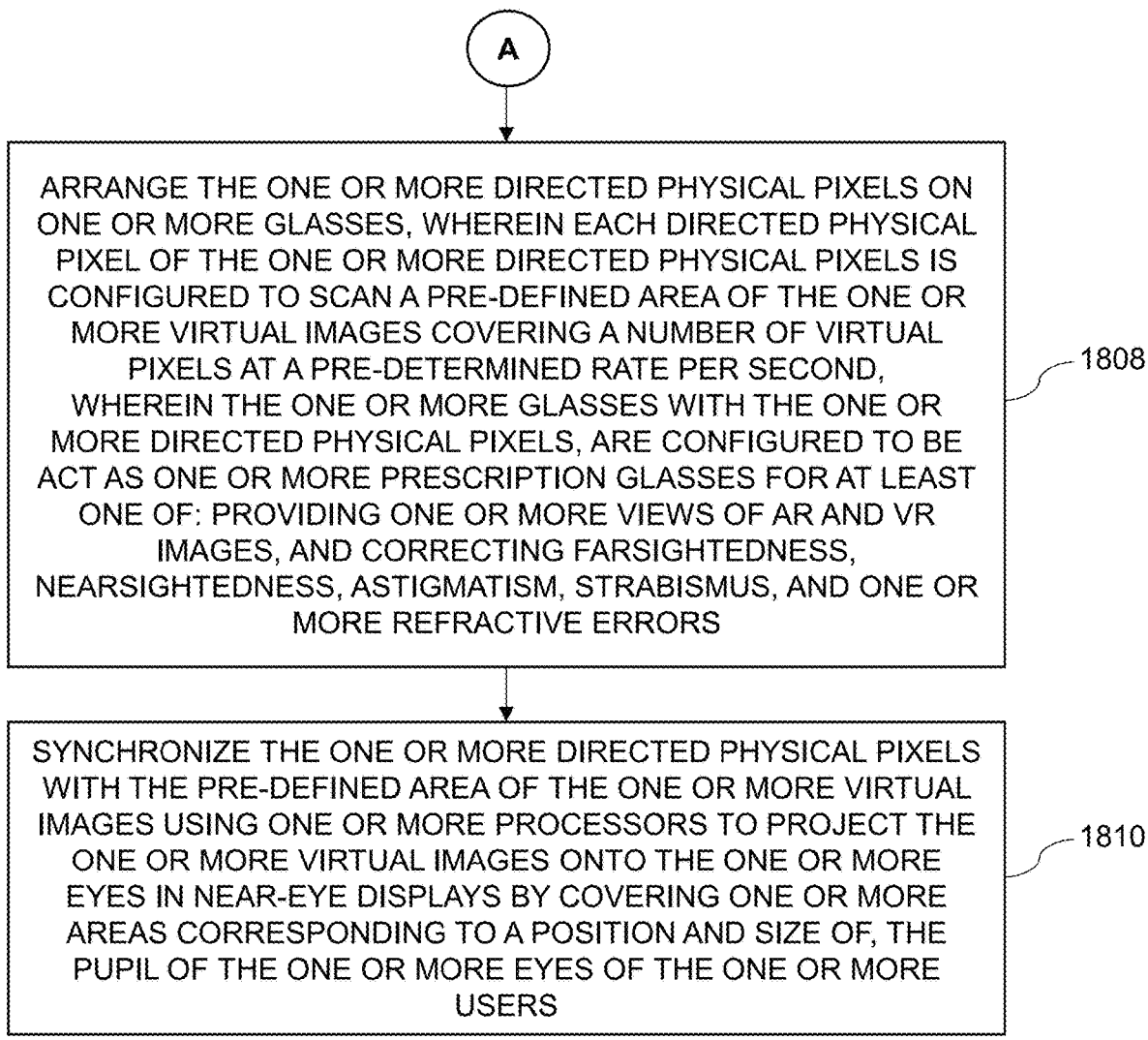
FIG. 18 is a flowchart illustrating a computer-implemented method for providing the optimized visual experiences to one or more users by projecting one or more virtual images onto one or more eyes in near-eye displays, in accordance with an embodiment of the present disclosure.

FIG. 18 is a flowchart illustrating a computer-implemented method 1800 for providing the optimized visual experiences to one or more users by projecting the one or more virtual images onto the one or more eyes in the near-eye displays, in accordance with an embodiment of the present disclosure. At step 1802, the one or more light signals are generated by the one or more light sources. In an embodiment, the one or more light signals are transmitted to the one or more directed physical pixels using the one or more light transmission techniques. In an embodiment, the one or more transmission techniques comprise at least one of: radiation and optical fibers and waveguides.

At step 1804, an intensity of the one or more light signals are adjusted by changing the voltage. At step 1806, the one or more light signals at one or more angles are directed towards the one or more eyes of the one or more users for projecting the number of virtual pixels of the one or more virtual images onto the pupil of the one or more eyes of the one or more users. Also At step 1806, the one or more light signals from two or more directed physical pixels at one or more angles are directed onto one or more sub-areas of a pupil for projecting the single virtual pixel on a retina, which causes changing a focal effort in lens muscles to simulate natural accommodation cues and mitigate vergence-accommodation conflict in virtual reality (VR) and augmented reality (AR) environments.

At step 1808, the one or more directed physical pixels are arranged on one or more glasses. Each directed physical pixel of the one or more directed physical pixels is configured to scan the pre-defined area of the one or more virtual images covering the number of virtual pixels at the pre-determined rate per second. In an embodiment, the one or more glasses with the one or more directed physical pixels, are configured to be act as the one or more prescription glasses for at least one of: providing the one or more views of the AR and VR images, and correcting at least one of: farsightedness, nearsightedness, astigmatism, strabismus, one or more refractive errors, and the like.

At step 1810, the one or more directed physical pixels are configured to be synchronized with the pre-defined area of the one or more virtual images using the one or more processors to project the one or more virtual images onto the one or more eyes in near-eye displays by covering the one or more areas corresponding to the position and size of, the pupil of the one or more eyes of the one or more users.

Numerous advantages of the present disclosure may be apparent from the discussion above. In accordance with the present disclosure, the system for the pupil-directed retinal projection in the near-eye displays is disclosed. In the smart glasses section, using the directed pixel technology and considering the location and size of the open part of the pupil, the system may simulate the natural behavior of light reflected from environmental objects as it passes through the smart glasses and enters the eye. This not only enhances the quality of the resulting VR/AR image but also eliminates the need for lenses. Removing the lens makes the display thinner, lighter, and more compact, increasing comfort and acceptance. The directed pixel technology allows the smart glasses to function as all-purpose prescription eyewear. Various methods for creating the directed physical pixels with diverse technologies have been presented. Additionally, by incorporating the Sparse and Sparse-Dense topologies, the need for a large number of the dense pixels is eliminated, making the retinal displays more cost-effective and keeping the glasses' lenses transparent.

The smart glasses may correct many vision defects without lenses, using only a simple setup. The system also addresses the Vergence-Accommodation Conflict, a cause of the eye strain in the VR headsets. Various methods for creating the directed camera cells have been proposed, which may be installed on both flat and curved surfaces. Using the cameras on the glass layer of the smart eyeglasses further reduces the weight and volume of the smart glasses. The construction of the 3D cameras and the OPA LiDAR using this method have also been explained.

By integrating the display, the LCD, the touch panel, and the e-sim into the smart glasses and fully simulating the smartphone in AR space with gesture recognition capabilities, the smart glasses may easily become a serious competitor to smartphones.

Significant features and advantages have been discussed for the smart glasses frame, providing a complete VR/AR/Mixverse experience for the user, enabling real-time translation for both ordinary people and the hearing-impaired, and improving the lives of the visually impaired.

The peripheral gadgets and devices may offload much of the battery, the processor, and other components from the smart glasses while introducing new features such as the EEG, the 360-degree cameras, the directional speakers, and the motion sickness vibrators.

Additionally, the 3D camera ball, the selfie mini stick, the mini smart pen, the selfie stick, the representative drone or the robot, and the like, create the unparalleled VR/AR/Mixverse experience, transforming remote 3D calls into a feeling of physical presence. The motion sickness vibrator section presents a method for reducing the motion sickness effects. The contact lenses and 3D TVs may also be provided with much higher quality and at more affordable prices.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented system for providing optimized visual experiences to one or more users by projecting one or more virtual images onto one or more eyes in near-eye displays, the computer-implemented system comprising:
   one or more light sources configured to generate one or more light signals, wherein the one or more light signals are transmitted to one or more directed physical pixels using one or more light transmission techniques, and wherein the one or more transmission techniques comprise at least one of: radiation and optical fibers and waveguides;
   a light intensity modulator configured to adjust an intensity of the one or more light signals by changing a voltage;
   a beam steerer and guidance module configured to direct the one or more light signals at one or more angles towards the one or more eyes of the one or more users for projecting a number of virtual pixels of the one or more virtual images onto a pupil of the one or more eyes of the one or more users;
   a beam steerer and guidance module configured to direct the one or more light signals from two or more directed physical pixels at one or more angles onto one or more sub-areas of a pupil for projecting a single virtual pixel on a retina, which causes changing a focal effort in lens muscles to simulate natural accommodation cues and mitigate vergence-accommodation conflict in virtual reality (VR) and augmented reality (AR) environments;
   the one or more directed physical pixels arranged on one or more glasses, wherein each directed physical pixel of the one or more directed physical pixels is configured to scan a pre-defined area of the one or more virtual images covering a number of virtual pixels at a pre-determined rate per second,
   wherein the one or more glasses with the one or more directed physical pixels, are configured to be act as one or more prescription glasses for at least one of: providing one or more views of AR and VR images, and correcting at least one of: farsightedness, nearsightedness, astigmatism, strabismus, and one or more refractive errors, and
   wherein the one or more directed physical pixels are configured to be synchronized with the pre-defined area of the one or more virtual images using one or more processors to project the one or more virtual images onto the one or more eyes in near-eye displays by covering one or more areas corresponding to a position and size of, the pupil of the one or more eyes of the one or more users.

2. The computer-implemented system of claim 1, wherein each directed physical pixel of the one or more directed physical pixels is configured to project a corresponding virtual pixel of the one or more virtual images based on one or more factors,
   wherein the one or more factors comprise at least one of: a position of the number of virtual pixels in a space, an area of the one or more virtual images that the one or more directed physical pixels cover, a position of the one or more directed physical pixels on the one or more glasses, a position and distance of the pupil relative to the one or more glasses, a diameter of open area of the pupil of the one or more eyes of the one or more users, and
   wherein the one or more directed physical pixels are formed using nanoscale Optical Phased Arrays (OPAs) integrated with one or more transparent circuits, providing lightweight and compact display hardware with optimized transparency for optimized user comfort.

3. The computer-implemented system of claim 1, wherein the one or more glasses comprise one or more layers, wherein the one or more layers comprise at least one of:
   an electrochromic layer configured to adjust transparency of the one or more glasses by applying the voltage, wherein the electrochromic layer is an electrochromic dimming layer configured to switch the one or more glasses between clear and shared modes, wherein the electrochromic layer is configured to selectively dim one or more portions of user views behind virtual elements, for optimizing contrast for an AR content while maintaining overall transparency and situational awareness;
   a transparent color display layer configured to be act as a display for at least one of: displaying one or more contents and adapting the one or more users to share the one or more contents, wherein the transparent color display layer is transparent when the near-eye display is at least one of: inactive and AR transparent layer mode, and the transparent color display layer is configured as an opaque display when the near-eye display is active; and
   a touchpad layer configured to adapt the one or more glasses to function as one or more electronic devices when the near-eye display is not worn by the one or more users.

4. The computer-implemented system of claim 1,
   wherein the one or more glasses comprise one or more frames, wherein the one or more frames of the one or more glasses comprise at least one of: one or more visible light cameras, one or more infrared (IR) cameras, one or more light projectors, one or more depth sensing sensors, one or more microphones, one or more communication and networking elements, one or more magnetic parts, one or more headphones, and one or more speakers, and one or more touchpads,
   wherein the one or more glasses are configured to mitigate a motion sickness in virtual reality environments by at least one of:
      adding vestibular stimulation mechanisms within the smart wearables to simulate realistic motion cues;

dynamically adjusting a field of view of the one or more users and reducing rotational visual artifacts during navigation; and adding environmental references comprising a virtual static frame, to stabilize perception of the one or more users.

5. The computer-implemented system of claim 4, further comprising optical phased array-based imaging and sensing systems that are integrated into the one or more frames and one or more lens, of the one or more glasses, wherein the optical phased array-based imaging and sensing systems comprise at least one of:

one or more Optical Phased Array (OPA) cameras mounted on at least one of: the one or more lens and the one or more frames of the one or more glasses, wherein the one or more OPA cameras are configured to capture one or more images using at least one of: sparse, dense, and sparse-dense distribution topologies, for optimizing transparency, reducing weight, and improving optical clarity;

one or more OPA-based Light Detection and Ranging (LiDAR) sensors integrated into at least one of: a glass layer and the one or more frames, wherein the one or more OPA-based LiDAR sensors are configured to perform at least one of: depth sensing, object recognition, and environmental mapping for augmented reality (AR) applications, hand gesture recognition, and enhanced eye tracking;

one or more OPA-based eye trackers integrated into at least one of: the one or more lens and the one or more frames of the one or more glasses, wherein the one or more OPA-based eye trackers are configured to provide at least one of: real-time tracking of pupil movement, gaze direction, and inter-pupillary distance (IPD) computation for adaptive focus correction and interactive AR experiences;

a Sparse-Dense OPA architecture comprising a combination of sparsely distributed sensors and densely arranged sensing elements, which provides an optimal balance between cost-efficiency, high resolution, and minimal visual obstruction; and a control module configured to process one or more signals from the OPA imaging and sensing components, dynamically adjusting beam steering, scanning resolution, and power consumption based on real-time user activity and one or more environmental conditions.

6. The computer-implemented system of claim 4, wherein the one or more visible light cameras comprise at least one of:

one or more forward based visible light cameras comprise at least one of:

one or more telephoto cameras configured on sides of the one or more frames, wherein the one or more telephoto cameras comprise one or more adjustable long-focus lenses for utilizing the one or more glasses as binoculars with one or more user gesture operations comprising widening the one or more eyes of the one or more users;

one or more ultra-wide cameras configured in a center of a forehead of the one or more frames, wherein the one or more ultra-wide cameras comprise one or more adjustable close-focus lenses for utilizing the one or more glasses as binocular microscopes for one or more objects proximity to the one or more adjustable close-focus with the one or more user gesture operations comprising winking followed by half-closed eyes; and one or more high-resolution cameras arranged at least one of: along an upper edge of each frame and around the one or more frames of each glass, wherein the one or more high-resolution cameras are arranged by at least one of: parallel to each high-resolution camera, perpendicular to a glass surface, and an angle closely perpendicular to an eyeball, for providing one or more perspectives, and wherein one or more images captured from the one or more high-resolution cameras are combined using the one or more processors based on the position of the pupil; and one or more face based visible light cameras are facing the one or more users, wherein the one or more face based visible light cameras are configured for at least one of: generating one or more photorealistic avatars and displaying one or more faces of the one or more users during one or more video calls.

7. The computer-implemented system of claim 4, wherein the IR cameras comprise at least one of:

one or more forward based IR cameras arranged above the one or more frames, wherein the one or more forward based IR cameras are configured to optimize visibility in low-light ambient; and one or more face based IR cameras arranged at least one of: below the one or more frames and sides of the one or more frames, wherein the one or more face based IR cameras are configured to provide an accurate and real-time measurement of a location and the diameter of the open area of the pupil of the one or more eyes of the one or more users and degree of eye openness, and wherein the one or more face based IR cameras are configured to perform Inter-Pupillary Distance (IPD) computation to prevent strain in the one or more eyes by automatically adjusting near-eye displays to the IPD associated with the one or more users.

8. The computer-implemented system of claim 4, wherein the one or more light projectors comprise at least one of:

one or more standard light and IR projectors are positioned at a center of the forehead of the one or more glasses to capture photography and night vision; and one or more infrared light projectors facing at least one of: the face and the one or more eyes of the one or more users, are positioned around each IR camera, wherein the one or more infrared light projectors are configured to at least one of: detect the face at night, capture one or more facial expressions for one or more avatars, and track the pupil of the one or more users.

9. The computer-implemented system of claim 4, wherein the one or more depth sensing sensors comprise at least one of:

one or more forward depth sensing sensors configured to at least one of: detect depth, assist in navigation and artificial intelligence assisted (AI-assisted) Global and Local Positioning System (AIPS), recognize hand movements and one or more gestures, provide optimized integration of real and virtual worlds by the AI, optimizing augmented reality (AR), track a position of at least one of: one or more hands, one or more fingers, and one or more foot, for interactive applications, generating one or more bokeh effects in portrait photography, and generating accurate three-dimensional maps and measuring distances, wherein detecting the depth using the one or more forward depth sensing sensors comprise at least one of: detecting a position of one or more ears of the one or more users for directing sound, generating three-dimensional maps of the surrounding environment, enabling accurate placement and scaling of virtual objects as if coexisting with real-world elements, detecting a surface of a table to turn the table into a virtual keyboard, identifying a position of furniture for virtually placing the one or more users in three dimensional (3D) remote communication, and detecting one or more obstacles while the one or more users are moving; and one or more face depth sensing sensors configured to at least one of: identify the one or more faces of the one or more users, measure a distance between the one or more eyes and facial features relative to the one or more glasses, and the position of the pupil in relation to the one or more glasses, track pupil and eye of the one or more users, capture movements of at least one of: eyelids, eyebrows, and lips to simulate smiles and facial expressions for the one or more avatars, and analyze at least one of: body language, the facial expressions, and emotions to transfer cues to one or more virtual avatars for the visual experiences and gaze commands.

10. The computer-implemented system of claim 4, wherein the one or more microphones are configured for optimized quality audio recording and noise reduction during conversation between the one or more users, wherein the one or more microphones comprise at least one of:

one or more forward facing microphones configured to filter at least one of: background noise during online translation and noisy environments, and capture optimized audio during video recording; and one or more user microphones configured to determine a speech of the one or more users to be optimized and filter the background noise, and utilize the AI to differentiate a voice of the one or more users from environmental sounds.

11. The computer-implemented system of claim 1, further comprising one or more linear actuators arranged in at least one of: front side, back side, left side, right side, and top, of a helmet, wherein at least one linear actuator among the one or more linear actuators are placed on a chin strap, which adapts for effective stimulation of an inner ear fluid in one or more directions to simulate one or more virtual movements for reducing motion sickness during the virtual reality (VR) experiences.

12. The computer-implemented system of claim 1, further comprising an ultrasonic directional speaker mounted on smart wearables, wherein the ultrasonic directional speaker in the smart wearables is configured to:

translate an audio of the one or more users during conversation speaking of the one or more users;

send the translated audio of the one or more users directly to one or more ears of one or more second users; and determine that the audio of the one or more users is directed to the one or more second users, managing privacy and optimizing the audio in the noisy environments.

13. The computer-implemented system of claim 1, wherein the computer-implemented system is configured to seamlessly transition between one or more AR modes, one or more VR modes, and one or more digital vision correction modes, for dynamically adjusting a visual output based on at least one of: one or more inputs of the one or more users, one or more environmental conditions, and application requirements, and wherein the computer-implemented system is further configured to mitigate eye-strain in the near-eye displays by at least one of:

continuously changing a projection point of the one or more light signals within an open area of the pupil to prevent long-term focus on a single point and to avoid long-term damage to the eye without sacrificing image clarity, wherein the one or more light signals comprise laser beams;

dynamically adjusting the intensity and color of the one or more light signals based on the pupil diameter and movements of the one or more users; and adding a pupil-saver mechanism to simulate one or more natural vision behaviors; and wherein the computer-implemented system is configured to optimize three-dimensional depth perception in AR and VR applications, by at least one of:

dynamically adjusting the focal effort required by the lens muscles of the one or more users;

aligning depth cues from at least one of: binocular disparity, object size inference, and lens focus effort; and simulating natural depth perception to mitigate user fatigue and optimized immersion.

14. The computer-implemented system of claim 1, wherein the near-eye displays comprise a Sparse pixel topology of the one or more directed physical pixels, for cost-effectiveness and transparency of glasses, and a Sparse-Dense pixel topology of the one or more directed physical pixels, which is adapted for a combination of sparse distribution for cost-effectiveness and dense clusters for projecting one or more optimized-resolution images, wherein the near-eye displays further comprise one or more calibration processes to correct the one or more refractive errors comprising at least one of: myopia, hyperopia, and astigmatism, by adjusting one or more projection parameters based on one or more user-specific optical profiles, wherein the one or more refractive errors causing vision defects of the one or more users, are dynamically corrected, by:

detecting the one or more refractive errors by analyzing laser beam reflections from the pupil and retina;

adjusting at least one of: intensity, angle, and phase, of the one or more directed physical pixels to emulate a corrective lens effect; and continuously recalibrating beam parameters as the user's gaze shifts, providing personalized, lens-free vision correction.

15. The computer-implemented system of claim 1, wherein the one or more light signals from the one or more directed physical pixels, are dynamically adjusted to evade a floater of the one or more eyes for providing optimized and unobstructed images, upon detecting a position of the floater of the one or more eyes, comprising (a) an Infrared optical phased array (OPA) LiDAR to detect a real-time location of floaters in the pupil, (b) a central processing unit to dynamically adjust laser beam paths to avoid interference with floaters, and (c) algorithms to maintain a clear and unobstructed image for the one or more users.

16. The computer-implemented system of claim 1, further comprising:

one or more virtual layers configured to be synchronized across the one or more glasses of the one or more users to exchange information associated with one or more augmented environments for at least one of: group activities, remote instruction, holographic meetings, from one or more locations;

one or more digital scent modules configured to provide contextually relevant aromas for virtual experiences, which optimizes realism in VR and AR scenarios comprising at least one of: tourism, culinary exploration, and social scent messaging; and one or more electroencephalogram (EEG) and Magnetoencephalography (MEG) sensors mounted on at least one of: the smart wearables and the one or more frames of the one or more glasses, configured to generate one or more brainwave signals for adjusting one or more displayed contents, which causes at least one of: handsfree control, thought-driven interactions, and personalized adjustments, based on one or more intentions, early diagnosis of neurological disorders comprising Parkinson's.

17. The computer-implemented system of claim 1,
wherein the computer-implemented system is configured to combine one or more overlapped virtual layers comprising at least one of: one or more property-owner managed layers and one or more optimized Mixverse layers, with media in a real world, to generate complexed multi-tiered augmented experiences, wherein the computer-implemented system is further configured to determine an optimized indoor location and orientation that assist the one or more users in one or more processes comprising at least one of: navigation, item finding, and directionality within interior spaces, based on utilization of at least one of: depth data, visual data, and inertial data and AI.

18. The computer-implemented system of claim 16, wherein the computer-implemented system is configured to:
detect one or more emotional states through the one or more brainwave signals; and
automatically adjust at least one of: one or more AR and VR parameters, brightness, and contrast, to mitigate stress, optimize comfort, and provide one or more supportive recommendations based on health status of the one or more users.

19. The computer-implemented system of claim 1, wherein the computer-implemented system is configured to operate in Augmented Reality (AR) mode using:
a transparent layer mode, wherein one or more virtual elements are overlaid onto a natural environment while maintaining direct visibility of ambient light; and
an opaque layer mode, wherein real-world imagery captured by front-facing cameras, is combined with the one or more virtual elements to generate a mixed-reality experience.

20. The computer-implemented system of claim 1, wherein the one or more directed physical pixels are integrated into a contact lens, configured to:
project the one or more virtual images directly onto the retina using at least one of: a micro-scale OPA and a beam-steering technology;
track the pupil position of the one or more users in real-time by at least one of: an accelerometer or one or more sensors, to dynamically adjust projection angles for optimal image clarity;
operate in at least one of: the sparse, dense, and sparse-dense topology, to balance resolution, transparency, and power and cost efficiency; and
adapt augmented reality (AR) and vision correction functionality without a need for an external eyewear.

21. The computer-implemented system of claim 1, further comprising:
a power-efficient optical projection module for the near-eye displays, configured to:
direct the laser beams exclusively toward the pupil for reducing unnecessary light dispersion to minimize energy consumption; and
dynamically adjust beam emission to optimize computational and power resources based on real-time pupil tracking and user gaze direction; and
a modular magnetic attachment mechanism for connecting removable components comprising at least one of: one or more external battery packs, additional sensors, one or more smart assistants, and Silicon Light Shield for VR immersion, allowing for customizable configurations.

22. The computer-implemented system of claim 1, further comprising a nerve impulse detection module integrated into a necklace gadget, wherein the nerve impulse detection module comprises:
one or more high-density electrode arrays for detecting motor nerve signals from a spinal cord, wherein the one or more high-density electrode arrays comprise at least one of: the Electroencephalography (EEG) and the Magnetoencephalography (MEG) sensors, to capture neural activity from neck down;
one or more signal processing algorithms to interpret detected nerve impulses for gesture recognition and digital command execution; and
an Integration with full-body AI tracking to simulate one or more avatar movements in augmented reality, virtual reality, and metaverse applications.

23. The computer-implemented system of claim 1, wherein the computer-implemented system is configured to:
receive one or more remote holographic data streams; and
integrate the one or more remote holographic data streams into the field of view of the one or more users, for providing telepresence experiences of one or more distant locations through directed physical pixel projection.

24. The computer-implemented system of claim 1, wherein the computer-implemented system is configured to determine the authenticity of recorded video and audio, by:
hashing LiDAR data frame-by-frame along with video and audio during recording;
digitally signing the hashed LiDAR data using a private key of one or more secure elements;
employing a chain of a trust model with at least one of: a Certificate Authority (CA) and a Blockchain-based CA for authentication; and
verifying the authenticity through multi-level validation using local and central secure elements.

25. The computer-implemented system of claim 1, wherein the computer-implemented system is configured to integrate a biometric authentication through the pupil tracking by analyzing one or more unique iris patterns and micro-movement behaviors, allowing secure user identification without requiring external credentials.

26. The computer-implemented system of claim 1, further comprising a gesture-controlled smart pen interface, adapting the one or more users to write, draw, and interact with one or more digital surfaces through one or more infrared tracking sensors embedded within the one or more glasses.

27. A computer-implemented method for providing optimized visual experiences to one or more users by projecting one or more virtual images onto one or more eyes in near-eye displays, the computer-implemented method comprising:
generating, by one or more light sources, one or more light signals, wherein the one or more light signals are transmitted to one or more directed physical pixels using one or more light transmission techniques, and wherein the one or more transmission techniques comprise at least one of: radiation and optical fibers and waveguides;

adjusting, by a light intensity modulator, an intensity of the one or more light signals by changing a voltage;

directing, by a beam steerer and guidance, the one or more light signals at one or more angles towards the one or more eyes of the one or more users for projecting a number of virtual pixels of the one or more virtual images onto a pupil of the one or more eyes of the one or more users; and directing, by a beam steerer and guidance, the one or more light signals from two or more directed physical pixels at one or more angles onto one or more sub-areas of a pupil for projecting a single virtual pixel on a retina, which causes changing a focal effort in lens muscles to simulate natural accommodation cues and mitigate vergence-accommodation conflict in virtual reality (VR) and augmented reality (AR) environments; and configuring the one or more directed physical pixels on one or more glasses, wherein each directed physical pixel of the one or more directed physical pixels is configured to scan a pre-defined area of the one or more virtual images covering a number of virtual pixels at a pre-determined rate per second, wherein the one or more glasses with the one or more directed physical pixels, are configured to be act as one or more prescription glasses for at least one of: providing one or more views of AR and VR images, and correcting at least one of: farsightedness, nearsightedness, astigmatism, strabismus, and one or more refractive errors, and wherein the one or more directed physical pixels are configured to be synchronized with the pre-defined area of the one or more virtual images using one or more processors to project the one or more virtual images onto the one or more eyes in near-eye displays by covering one or more areas corresponding to a position and size of, the pupil of the one or more eyes of the one or more users.

28. The computer-implemented method of claim 27, further comprising projecting, by each directed physical pixel of the one or more directed physical pixels, a corresponding virtual pixel of the one or more virtual images based on one or more factors, wherein the one or more factors comprise at least one of: a position of the number of virtual pixels in a space, an area of the one or more virtual images that the one or more directed physical pixels cover, a position of the one or more directed physical pixels on the one or more glasses, a position and distance of the pupil relative to the one or more glasses, a diameter of open area of the pupil of the one or more eyes of the one or more users.

29. The computer-implemented method of claim 27, further comprising integrating the one or more directed physical pixels into a contact lens, for:

projecting the one or more virtual images directly onto the retina using at least one of: a micro-scale OPA and a beam-steering technology;

tracking the pupil position of the one or more users in real-time by at least one of: an accelerometer or one or more sensors, to dynamically adjust projection angles for optimal image clarity;

operating in at least one of: the sparse, dense, and sparse-dense topology, to balance resolution, transparency, and power and cost efficiency; and adapting augmented reality (AR) and vision correction functionality without a need for an external eyewear.

30. A non-transitory computer-readable storage medium having instructions stored therein that when executed by one or more hardware processors, cause the one or more hardware processors to execute operations of:

generating, by one or more light sources, one or more light signals, wherein the one or more light signals are transmitted to one or more directed physical pixels using one or more light transmission techniques, and wherein the one or more transmission techniques comprise at least one of: radiation and optical fibers and waveguides;

adjusting, by a light intensity modulator, an intensity of the one or more light signals by changing a voltage;

directing, by a beam steerer and guidance, the one or more light signals at one or more angles towards the one or more eyes of the one or more users for projecting a number of virtual pixels of the one or more virtual images onto a pupil of the one or more eyes of the one or more users; and directing, by a beam steerer and guidance, the one or more light signals from two or more directed physical pixels at one or more angles onto one or more sub-areas of a pupil for projecting a single virtual pixel on a retina, which causes changing a focal effort in lens muscles to simulate natural accommodation cues and mitigate vergence-accommodation conflict in virtual reality (VR) and augmented reality (AR) environments; and configuring the one or more directed physical pixels on one or more glasses, wherein each directed physical pixel of the one or more directed physical pixels is configured to scan a pre-defined area of the one or more virtual images covering a number of virtual pixels at a pre-determined rate per second, wherein the one or more glasses with the one or more directed physical pixels, are configured to be act as one or more prescription glasses for at least one of: providing one or more views of AR and VR images, and correcting at least one of: farsightedness, nearsightedness, astigmatism, strabismus, and one or more refractive errors, and wherein the one or more directed physical pixels are configured to be synchronized with the pre-defined area of the one or more virtual images using one or more processors to project the one or more virtual images onto the one or more eyes in near-eye displays by covering one or more areas corresponding to a position and size of, the pupil of the one or more eyes of the one or more users.

* * * * *